United States Patent [19]
Malhotra et al.

[11] Patent Number: 5,709,737
[45] Date of Patent: Jan. 20, 1998

[54] INK JET INKS AND PRINTING PROCESSES

[75] Inventors: Shadi L. Malhotra; Kirit N. Naik, both of Mississauga; David N. MacKinnon, Etobicoke; James D. Mayo, Mississauga; Yvan Gagnon, Mississauga; H. Bruce Goodbrand, Hamilton, all of Canada

[73] Assignee: Xerox Corporation, Stamford, Conn.

[21] Appl. No.: 603,516

[22] Filed: Feb. 20, 1996

[51] Int. Cl.⁶ .................................... C09D 11/02
[52] U.S. Cl. .................. 106/31.43; 106/31.36; 106/31.57; 106/31.58; 106/31.59; 106/31.68; 106/31.75; 106/31.86; 106/31.87; 106/31.89
[58] Field of Search ................ 106/31.43, 31.58, 106/31.75, 31.86, 31.57, 31.87, 31.59, 31.89, 31.36, 31.68

[56] References Cited

U.S. PATENT DOCUMENTS

| | | | |
|---|---|---|---|
| 3,991,124 | 11/1976 | Schellenbaum | 260/623 R |
| 5,053,078 | 10/1991 | Koike et al. | 106/22 |
| 5,062,893 | 11/1991 | Adamic et al. | 106/22 |
| 5,100,469 | 3/1992 | Pontes et al. | 106/20 |
| 5,120,361 | 6/1992 | Winnik et al. | 106/22 |
| 5,169,437 | 12/1992 | Yow | 106/20 D |
| 5,196,056 | 3/1993 | Prasad | 106/15.05 |
| 5,207,824 | 5/1993 | Moffatt et al. | 106/22 R |
| 5,220,346 | 6/1993 | Carreira et al. | 346/1.1 |
| 5,223,026 | 6/1993 | Schwarz, Jr. | 106/20 D |
| 5,268,027 | 12/1993 | Chan et al. | 106/20 R |
| 5,324,349 | 6/1994 | Sano et al. | 106/25 R |
| 5,354,369 | 10/1994 | Shimomura et al. | 106/22 H |
| 5,356,464 | 10/1994 | Hickman et al. | 106/20 R |
| 5,370,731 | 12/1994 | Yamashita et al. | 106/22 H |
| 5,389,132 | 2/1995 | Davulcu et al. | 106/20 R |
| 5,395,434 | 3/1995 | Tochihara et al. | 106/22 R |
| 5,397,386 | 3/1995 | Nakazawa et al. | 106/22 K |
| 5,431,720 | 7/1995 | Nagai et al. | 106/20 R |
| 5,431,724 | 7/1995 | Adamic et al. | 106/22 R |

OTHER PUBLICATIONS

CAS data sheet, June 1997.

*Primary Examiner*—Deborah Jones
*Attorney, Agent, or Firm*—Judith L. Byorick

[57] ABSTRACT

Disclosed is an ink composition which comprises an aqueous liquid vehicle, a colorant, and an additive material selected from the group consisting of (a) symmetric acetylenic bisester alcohols, (b) symmetric acetylenic bisalkyl alcohols and acetylenic bisalkoxy alcohols, (c) symmetric acetylenic bisamido alcohols, (d) symmetric bisamido alcohols, (e) mono amido alcohols, (f) trialkylhydroxy compounds, (g) derivatives of 1,2-diols and 1,3-diols, (h) thio diols, (i) aromatic diols, (j) heterocyclic diols, (k) imino alcohols, (l) salts of hydroxyl compounds, (m) saccharides and saccharide derivatives, and (n) mixtures thereof. Also disclosed is an ink jet process which comprises (1) incorporating into a thermal ink jet printing apparatus the aforementioned ink composition; and (2) causing droplets of the ink to be ejected from the printing apparatus in an imagewise pattern onto a substrate, thereby generating images on the substrate. Further disclosed is an ink jet printing process which comprises (1) incorporating into a thermal ink jet printing apparatus the aforementioned ink composition; (2) causing droplets of the ink to be ejected from the printing apparatus in an imagewise pattern onto a substrate, thereby generating images on the substrate; and (3) exposing the substrate to microwave radiation, thereby drying the images on the substrate.

22 Claims, 3 Drawing Sheets

INK JET INKS AND PRINTING PROCESSES

BACKGROUND OF THE INVENTION

The present invention is directed to aqueous ink compositions. More specifically, the present invention is directed to ink compositions particularly suitable for use in ink jet printing processes. In a particularly preferred embodiment, the ink compositions are particularly suitable for printing processes which employ microwave drying processes. One embodiment of the present invention is directed to an ink composition which comprises an aqueous liquid vehicle, a colorant, and an additive material selected from the group consisting of (a) symmetric acetylenic bisester alcohols of the general formulae

$$[HO(CH_2)]_3CCH_2OOC(R)_nC\equiv C(R)_nCOOCH_2C[(CH_2)OH]_3 \quad I.$$

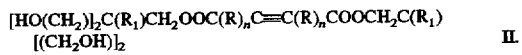

$$[HO(CH_2)]_2C(R_1)CH_2OOC(R)_nC\equiv C(R)_nCOOCH_2C(R_1)[(CH_2OH)]_2 \quad II.$$

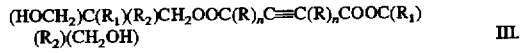

$$(HOCH_2)C(R_1)(R_2)CH_2OOC(R)_nC\equiv C(R)_nCOOC(R_1)(R_2)(CH_2OH) \quad III.$$

wherein R is $CH_2$, $CH_2OCH_2$, or $C_2H_5OC_2H_5$, $R_1$ and $R_2$ each, independently, are hydrogen atoms, alkyl groups, substituted alkyl groups, or alkoxy groups, and n is an integer of from 0 to 10; (b) symmetric acetylenic bisalkyl alcohols and acetylenic bisalkoxy alcohols of the general formula

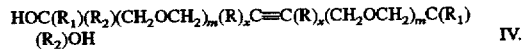

$$HOC(R_1)(R_2)(CH_2OCH_2)_m(R)_xC\equiv C(R)_x(CH_2OCH_2)_mC(R_1)(R_2)OH \quad IV.$$

wherein R is a straight chain alkyl group or a substituted straight chain alkyl group, $R_1$ and $R_2$ each, independently of the other, are hydrogen atoms, alkyl groups, substituted alkyl groups, or alkoxy groups, x is an integer of 0 or 1, and m is an integer of from 1 to about 100; (c) symmetric acetylenic bisamido alcohols of the general formulae

$$[HO(CH_2)_m]_3CNHCOC\equiv CCONHC[(CH_2)_mOH]_3 \quad V.$$

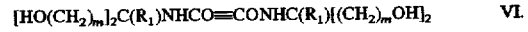

$$[HO(CH_2)_m]_2C(R_1)NHCO\equiv CONHC(R_1)[(CH_2)_mOH]_2 \quad VI.$$

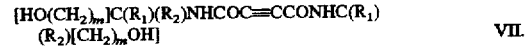

$$[HO(CH_2)_m]C(R_1)(R_2)NHCOC\equiv CCONHC(R_1)(R_2)[CH_2)_mOH] \quad VII.$$

wherein $R_1$ and $R_2$ each, independently of the other, are hydrogen atoms, alkyl groups, substituted alkyl groups, or alkoxy groups, and m is an integer of from 1 to about 10; (d) symmetric bisamido alcohols of the general formulae

$$[HO(CH_2)]_3CNHCO(R)_xCONHC[(CH_2)OH]_3 \quad VIII.$$

$$[HO(CH_2)]_2C(R_1)NHCO(R)_xCONHC(R_1)[(CH_2)OH]_2 \quad IX.$$

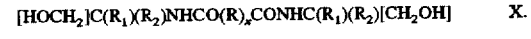

$$[HOCH_2]C(R_1)(R_2)NHCO(R)_xCONHC(R_1)(R_2)[CH_2OH] \quad X.$$

wherein R is a straight chain alkyl group or a substituted straight chain alkyl group, $R_1$ and $R_2$ each, independently of the other, are hydrogen atoms, alkyl groups, substituted alkyl groups, or alkoxy groups, and x is an integer of 0 or 1; (e) mono amido alcohols of the general formula

$$RCONR_1(CH_2)_nOH \quad XI.$$

wherein R is a hydrogen atom, an alkyl group, a substituted alkyl group, an aryl group, a substituted aryl group, an arylalkyl group, a substituted arylalkyl group, a pyridine group, a substituted pyridine group, a piperidine group, a substituted piperidine group, a piperazine group, a substituted piperazine group, a quinoline group, a substituted quinoline group, a pyrrolidine group, a substituted pyrroli- dine group, an imidazoline group, or a substituted imidazoline group, $R_1$ is H, $CH_2$, or $CH_2OCH_2$, and n is an integer of from 0 to about 5; (f) trialkylhydroxy compounds selected from the group consisting of N-[tris(hydroxymethyl)methyl] glycine, N-[tri (hydroxymethyl)methyl]acrylamide, 2-(bromomethyl)-2-(hydroxymethyl)-1,3-propane diol, 2-(nitro)-2-(hydroxymethyl)-1,3-propanediol, 1,3,5-tris(2-hydroxyethyl)cyanuric acid, nitromethane-trispropanol, amino tris propanol, and mixtures thereof; (g) derivatives of 1,2-diols and 1,3-diols selected from the group consisting of 1-phenyl-1,2-ethanediol; 1-(2-nitrophenyl)-1,2-ethanediol; 3-methoxy-1,2-propanediol; 3-ethoxy-1,2-propanediol; 3-allyloxy-1,2-propanediol ; 3-phenoxy-1,2-propanediol ; 3-(4-methoxy phenoxy)-1,2-propane diol; 3-(2-methyl phenoxy)-1,2-propanediol; 5-hexene-1,2-diol; 7-octene-1,2-diol; 2-phenyl-1,2-propanediol; 3-(diethylamino)-1,2-propanediol; 3-(diisopropyl amino)-1,2-propanediol; 3-(N-benzyl-N-methylamino)-1,2-propanediol; 3-pyrrolidino-1, 2-propanediol; 3-piperidino-1,2-propanediol; 3-morpholino-1,2-propanediol; 2,2-dimethyl-1-phenyl-1,3-propane diol; 2-benzyloxy-1,3-propanediol; 2-bromo-2-nitro-1,3-propanediol; and mixtures thereof; (h) thio diols selected from the group consisting of 2-hydroxyethyl disulfide; 3,6-dithia-1,8-octane diol; 2,2'-sulfonyl diethanol; 3,3'-thiodipropanol; bis(2-hydroxypropyl) sulfide; bis(2-hydroxypropyl)disulfide; and mixtures thereof; (i) aromatic and heterocyclic diols selected from the group consisting of 2,5-furandimethanol, 3-cyclohexene-1-1-dimethanol, 2'-(phenylene dioxy)diethanol, 4-8-bis(hydroxymethyl) tricyclo[5.2.1.0$^{2,6}$]decane, 5-nitro-m-xylene-α,α'-diol, 2,3, 5,6-tetramethyl-p-xylene-α,α'-diol, 2-hydroxybenzyl alcohol, 3,5-dihydroxybenzylalcohol, 4-hydroxy-3-methoxy benzylalcohol, 3-hydroxy-4-methoxybenzylalcohol, homo-vanillyl alcohol, hydroxyphenethyl alcohol, and mixtures thereof; (j) imino alcohols selected from the group consisting of 2,2'methyliminodiethanol; N,N-bis(2-hydroxyethyl)-2-amino ethane sulfonic acid; bicine; 1-[N,N-bis(2-hydroxyethyl)isopropanolamine; 3-[bis(2-hydroxyethyl) amino]-2-hydroxy-1-propane sulfonic acid; 2,2' (phenylamino)diethanol; 2,2'-(tolylimino)diethanol; bis(2-hydroxypropyl)amine(di-isopropanol amine); bis(3-hydroxypropyl)amine; N,N'-bis(2-hydroxyethyl) ethylenediamine; N,N-bis(2-hydroxypropyl)ethanolamine; triethanol amine ethoxylate; 1-4-bis(2-hydroxyethyl) piperazine; 1-[2-(2-hydroxyethoxy)ethyl]-piperazine; bis[ (2-hydroxyethoxy)ethyl]-piperazine; 1,4-bis(2-hydroxypropyl)piperazine; 1,4-bis(2-hydroxypropyl)2-methyl piperazine; bis(2-hydroxypropyl)-2,5-dimethyl-piperazine; 1-(2-N,N-bis(2-hydroxypropyl)amino)ethyl 4-(2hydroxpropyl piperazine; N,N-bis(3-hydroxypropyl) homopiperazine; 4,4'-trimethylene bis(1-piperidine ethanol); and mixtures thereof; (k) salts of hydroxyl compounds selected from the group consisting of pantothenic acid calcium salt hydrate; pantothenic acid sodium salt; 4-(2,3-dihydroxypropyl)-2-isononylsuccinate potassium salt; 4-(2,3-dihydroxypropyl)-2-(2-methylene-4,4-dimethylpentyl)succinate potassium salt; xylonic acid calcium salt; threonic acid calcium salt; and mixtures thereof; (I) saccharides and saccharide derivatives selected from the group consisting of ascorbic acid; isoascorbic acid; 5,6-isopropylidene ascorbic acid; gluconic γ-lactone; α-glucoheptonic γ-lactone; α,β-gluco octanoic-γ-lactone; δ-gluconolactone; glucono-1,5-lactone; 1,2-O-isopropylidene-glucofuranose; 1,2-O-isopropylidenexylofuranose; 1,2-O-isopropylidene-β-idofuranose; 2,5-O-methylenemannitol; 3,4-O-isopropylidene-mannitol; 1,2,5,6-di-O- isopropylidenemannitol; 4,6-O-ethylidene-α-glucose; hydrindantin dihydrate; ellagic acid dihydrate; rutin trihydrate; amygdalin; melezitose dihydrate; raffinose pentahydrate; α-galactosyl-α-galactosyl-α-glucosyl-β-fructose; inulin; and mixtures thereof; and (m) mixtures thereof. Another embodiment of the present invention is directed to an ink jet process which comprises (1) incorporating into a thermal ink jet printing apparatus an ink composition which comprises an aqueous liquid vehicle, a colorant, and an additive material selected from the group consisting of (a) symmetric acetylenic bisester alcohols of the general formulae

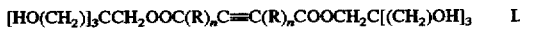
[HO(CH$_2$)]$_3$CCH$_2$OOC(R)$_n$C≡C(R)$_n$COOCH$_2$C[(CH$_2$)OH]$_3$   I.

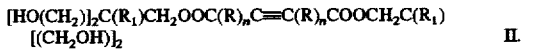
[HO(CH$_2$)]$_2$C(R$_1$)CH$_2$OOC(R)$_n$C≡C(R)$_n$COOCH$_2$C(R$_1$)[(CH$_2$OH)]$_2$   II.

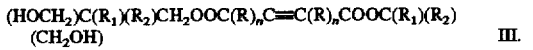
(HOCH$_2$)C(R$_1$)(R$_2$)CH$_2$OOC(R)$_n$C≡C(R)$_n$COOC(R$_1$)(R$_2$)(CH$_2$OH)   III.

wherein R is CH$_2$, CH$_2$OCH$_2$, or C$_2$H$_5$OC$_2$H$_5$, R$_1$ and R$_2$ each, independently, are hydrogen atoms, alkyl groups, substituted alkyl groups, or alkoxy groups, and n is an integer of from 0 to 10; (b) symmetric acetylenic bisalkyl alcohols and acetylenic bisalkoxy alcohols of the general formula

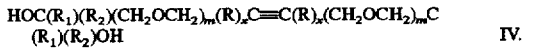
HOC(R$_1$)(R$_2$)(CH$_2$OCH$_2$)$_m$(R)$_x$C≡C(R)$_x$(CH$_2$OCH$_2$)$_m$C(R$_1$)(R$_2$)OH   IV.

wherein R is a straight chain alkyl group or a substituted straight chain alkyl group, R$_1$ and R$_2$ each, independently of the other, are hydrogen atoms, alkyl groups, substituted alkyl groups, or alkoxy groups, x is an integer of 0 or 1, and m is an integer of from 1 to about 100; (c) symmetric acetylenic bisamido alcohols of the general formulae

[HO(CH$_2$)$_m$]$_3$CNHCOC≡CCONHC[(CH$_2$)$_m$OH]$_3$   V.

[HO(CH$_2$)$_m$]$_2$C(R$_1$)NHCO≡CONHC(R$_1$)[(CH$_2$)$_m$OH]$_2$   VI.

[HO(CH$_2$)$_m$]C(R$_1$)(R$_2$)NHCOC≡CCONHC(R$_1$)(R$_2$)[CH$_2$)$_m$OH]   VII.

wherein R$_1$ and R$_2$ each, independently of the other, are hydrogen atoms, alkyl groups, substituted alkyl groups, or alkoxy groups, and m is an integer of from 1 to about 10; (d) symmetric bisamido alcohols of the general formulae

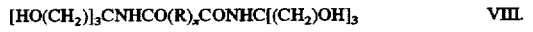
[HO(CH$_2$)]$_3$CNHCO(R)$_x$CONHC[(CH$_2$)OH]$_3$   VIII.

[HO(CH$_2$)]$_2$C(R$_1$)NHCO(R)$_x$CONHC(R$_1$)[(CH$_2$)OH]$_2$   IX.

[HOCH$_2$]C(R$_1$)(R$_2$)NHCO(R)$_x$CONHC(R$_1$)(R$_2$)[CH$_2$OH]   X.

wherein R is a straight chain alkyl group or a substituted straight chain alkyl group, R$_1$ and R$_2$ each, independently of the other, are hydrogen atoms, alkyl groups, substituted alkyl groups, or alkoxy groups, and x is an integer of 0 or 1; (e) mono amido alcohols of the general formula

RCONR$_1$(CH$_2$)$_n$OH   XI.

wherein R is a hydrogen atom, an alkyl group, a substituted alkyl group, an aryl group, a substituted aryl group, an arylalkyl group, a substituted arylalkyl group, a pyridine group, a substituted pyridine group, a piperidine group, a substituted piperidine group, a piperazine group, a substituted piperazine group, a quinoline group, a substituted quinoline group, a pyrrolidine group, a substituted pyrrolidine group, an imidazoline group, or a substituted imidazoline group, R$_1$ is H, CH$_2$, or CH$_2$OCH$_2$, and n is an integer of from 0 to about 5; (f) trialkylhydroxy compounds selected from the group consisting of N-[tris(hydroxymethyl)methyl] glycine, N-[tri(hydroxymethyl)methyl]acrylamide, 2-(bromomethyl)-2-(hydroxymethyl)-1,3-propane diol, 2-(nitro)-2-(hydroxymethyl)-1,3-propanediol, 1,3,5-tris(2-hydroxyethyl)cyanuric acid, nitromethane-trispropanol, amino tris propanol, and mixtures thereof; (g) derivatives of 1,2-diols and 1,3-diols selected from the group consisting of 1-phenyl-1,2-ethanediol; 1-(2-nitrophenyl)-1,2-ethanediol; 3-methoxy-1,2-propanediol; 3-ethoxy-1,2-propanediol; 3-allyloxy-1,2-propanediol; 3-phenoxy-1,2-propanediol; 3-(4-methoxy phenoxy)-1,2-propane diol; 3-(2-methyl phenoxy)-1,2-propanediol; 5-hexene-1,2-diol; 7-octene-1,2-diol; 2-phenyl-1,2-propanediol; 3-(diethylamino)-1,2-propanediol; 3-(diisopropyl amino)-1,2-propanediol; 3-(N-benzyl-N-methylamino)-1,2-propanediol; 3-pyrrolidino-1,2-propanediol; 3-piperidino-1,2-propanediol; 3-morpholino-1,2-propanediol; 2,2-dimethyl-1-phenyl-1,3-propane diol; 2-benzyloxy-1,3-propanediol; 2-bromo-2-nitro-1,3-propanediol; and mixtures thereof; (h) thio diols selected from the group consisting of 2-hydroxyethyl disulfide; 3,6-dithia-1,8-octane diol; 2,2'-sulfonyl diethanol; 3,3'-thiodipropanol; bis(2-hydroxypropyl) sulfide; bis(2-hydroxypropyl)disulfide; and mixtures thereof; (i) aromatic and heterocyclic diols selected from the group consisting of 2,5-furandimethanol, 3-cyclohexene-1-1-dimethanol, 2'-(phenylene dioxy)diethanol, 4-8-bis(hydroxymethyl) tricyclo[5.2.1.0$^{2,6}$]decane, 5-nitro-m-xylene-α,α'-diol, 2,3,5,6-tetramethyl-p-xylene-α,α'-diol, 2-hydroxybenzyl alcohol, 3,5-dihydroxybenzylalcohol, 4-hydroxy-3-methoxy benzylalcohol, 3-hydroxy-4-methoxybenzylalcohol, homovanillyl alcohol, hydroxyphenethyl alcohol, and mixtures thereof; (j) imino alcohols selected from the group consisting of 2,2'methyliminodiethanol; N,N-bis(2-hydroxyethyl)-2-amino ethane sulfonic acid; bicine; 1-[N,N-bis(2-hydroxyethyl)isopropanolamine; 3-[bis(2-hydroxyethyl)amino]-2-hydroxy-1-propane sulfonic acid; 2,2'(phenylamino)diethanol; 2,2'-(tolylimino)diethanol; bis(2-hydroxypropyl)amine(di-isopropanol amine); bis(3-hydroxypropyl)amine; N,N'-bis(2-hydroxyethyl) ethylenediamine; N,N-bis(2-hydroxypropyl)ethanolamine; triethanol amine ethoxylate; 1-4-bis(2-hydroxyethyl) piperazine; 1-[2-(2-hydroxyethoxy)ethyl]-piperazine; bis[(2-hydroxyethoxy)ethyl]-piperazine; 1,4-bis(2-hydroxypropyl)piperazine; 1,4-bis(2-hydroxypropyl)2-methyl piperazine; bis(2-hydroxypropyl)-2,5-dimethyl-piperazine; 1-(2-N,N-bis(2-hydroxypropyl)amino)ethyl 4-(2-hydroxypropyl piperazine; N,N-bis(3-hydroxypropyl) homopiperazine; 4,4'-trimethylene bis(1-piperidine ethanol); and mixtures thereof; (k) salts of hydroxyl compounds selected from the group consisting of pantothenic acid calcium salt hydrate; pantothenic acid sodium salt; 4-(2,3-dihydroxypropyl)-2-isononylsuccinate potassium salt; 4-(2,3-dihydroxypropyl)-2-(2-methylene-4,4-dimethylpentyl)succinate potassium salt; xylonic acid calcium salt; threonic acid calcium salt; and mixtures thereof; (l) saccharides and saccharide derivatives selected from the group consisting of ascorbic acid; isoascorbic acid; 5,6-isopropylidene ascorbic acid; gluconic γ-lactone; α-glucoheptonic γ-lactone; α, β-gluco octanoic-γ-lactone; δ-gluconolactone; glucono-1,5-lactone; 1,2-O-isopropylidene-glucofuranose; 1,2-O-isopropylidenexylofuranose; 1,2-O-isopropylidene-β-idofuranose; 2,5-O-methylenemannitol; 3,4-O-isopropylidene-mannitol; 1,2,5,6-di-O-isopropylidenemannitol; 4,6-O-ethylidene-α-glucose; hydrindantin dihydrate; ellagic acid dihydrate; rutin trihydrate; amygdalin; melezitose dihydrate; raffinose pentahydrate; α-galactosyl-α-galactosyl-α-glucosyl-β-fructose; inulin; and mixtures thereof; and (m) mixtures thereof; and (2) causing droplets of the ink to be ejected from the printing apparatus in an imagewise pattern onto a substrate, thereby generating images on the substrate. Yet another embodiment of the present invention is directed to an ink jet printing process which comprises (1) incorporating into a thermal ink jet printing apparatus an ink composition which comprises an aqueous liquid vehicle, a colorant, and an additive material selected from the group consisting of (a) symmetric acetylenic bisester alcohols of the general formulae $$[HO(CH_2)]_3CCH_2OOC(R)_nC\equiv C(R)_nCOOCH_2C[(CH_2)OH]_3 \quad I.$$

$$[HO(CH_2)]_2C(R_1)CH_2OOC(R)_nC\equiv C(R)_nCOOCH_2C(R_1)[(CH_2OH)_2] \quad II.$$

$$(HOCH_2)C(R_1)(R_2)CH_2OOC(R)_nC\equiv C(R)_nCOOC(R_1)(R_2)(CH_2OH) \quad III.$$

wherein R is $CH_2$, $CH_2OCH_2$, or $C_2H_5OC_2H_5$, $R_1$ and $R_2$ each, independently, are hydrogen atoms, alkyl groups, substituted alkyl groups, or alkoxy groups, and n is an integer of from 0 to 10; (b) symmetric acetylenic bisalkyl alcohols and acetylenic bisalkoxy alcohols of the general formula $$HOC(R_1)(R_2)(CH_2OCH_2)_m(R)_xC\equiv C(R)_x(CH_2OCH_2)_mC(R_1)(R_2)OH \quad IV.$$

wherein R is a straight chain alkyl group or a substituted straight chain alkyl group, $R_1$ and $R_2$ each, independently of the other, are hydrogen atoms, alkyl groups, substituted alkyl groups, or alkoxy groups, x is an integer of 0 or 1, and m is an integer of from 1 to about 100; (c) symmetric acetylenic bisamido alcohols of the general formulae $$[HO(CH_2)_m]_3CNHCOC\equiv CCONHC[(CH_2)_mOH]_3 \quad V.$$

$$[HO(CH_2)_m]_2C(R_1)NHCOC\equiv CCONHC(R_1)[(CH_2)_mOH]_2 \quad VI.$$

$$[HO(CH_2)_m]C(R_1)(R_2)NHCOC\equiv CCONHC(R_1)(R_2)[(CH_2)_mOH] \quad VII.$$

wherein $R_1$ and $R_2$ each, independently of the other, are hydrogen atoms, alkyl groups, substituted alkyl groups, or alkoxy groups, and m is an integer of from 1 to about 10; (d) symmetric bisamido alcohols of the general formulae $$[HO(CH_2)]_3CNHCO(R)_xCONHC[(CH_2)OH]_3 \quad VIII.$$

$$[HO(CH_2)]_2C(R_1)NHCO(R)_xCONHC(R_1)[(CH_2)OH]_2 \quad IX.$$

$$[HOCH_2]C(R_1)(R_2)NHCO(R)_xCONHC(R_1)(R_2)[CH_2OH] \quad X.$$

wherein R is a straight chain alkyl group or a substituted straight chain alkyl group, $R_1$ and $R_2$ each, independently of the other, are hydrogen atoms, alkyl groups, substituted alkyl groups, or alkoxy groups, and x is an integer of 0 or 1; (e) mono amido alcohols of the general formula $$RCONR_1(CH_2)_nOH \quad XI.$$

wherein R is a hydrogen atom, an alkyl group, a substituted alkyl group, an aryl group, a substituted aryl group, an arylalkyl group, a substituted arylalkyl group, a pyridine group, a substituted pyridine group, a piperidine group, a substituted piperidine group, a piperazine group, a substituted piperazine group, a quinoline group, a substituted quinoline group, a pyrrolidine group, a substituted pyrrolidine group, an imidazoline group, or a substituted imidazoline group, $R_1$ is H, $CH_2$, or $CH_2OCH_2$, and n is an integer of from 0 to about 5; (f) trialkylhydroxy compounds selected from the group consisting of N-[tris(hydroxymethyl)methyl] glycine, N-[tri(hydroxymethyl)methyl]acrylamide, 2-(bromomethyl)-2-(hydroxymethyl)-1,3-propane diol, 2-(nitro)-2-(hydroxymethyl)-1,3-propanediol, 1,3,5-tris(2-hydroxyethyl)cyanuric acid, nitromethane-trispropanol, amino tris propanol, and mixtures thereof; (g) derivatives of 1,2-diols and 1,3-diols selected from the group consisting of 1-phenyl-1,2-ethanediol; 1-(2-nitrophenyl)-1,2-ethanediol; 3-methoxy-1,2-propanediol; 3-ethoxy-1,2-propanediol; 3-allyloxy-1,2-propanediol; 3-phenoxy-1,2-propanediol; 3-(4-methoxy phenoxy)-1,2-propane diol; 3-(2-methyl phenoxy)-1,2-propanediol; 5-hexene-1,2-diol; 7-octene-1,2-diol; 2-phenyl-1,2-propanediol; 3-(diethylamino)-1,2-propanediol; 3-(diisopropyl amino)-1,2-propanediol; 3-(N-benzyl-N-methylamino)-1,2-propanediol; 3-pyrrolidino-1,2-propanediol; 3-piperidino-1,2-propanediol; 3-morpholino-1,2-propanediol; 2,2-dimethyl-1-phenyl-1,3-propane diol; 2-benzyloxy-1,3-propanediol; 2-bromo-2-nitro-1,3-propanediol; and mixtures thereof; (h) thio diols selected from the group consisting of 2-hydroxyethyl disulfide; 3,6-dithia-1,8-octane diol; 2,2'-sulfonyl diethanol; 3,3'-thiodipropanol; bis(2-hydroxypropyl sulfide; bis(2-hydroxypropyl)disulfide; and mixtures thereof; (i) aromatic and heterocyclic diols selected from the group consisting of 2,5-furandimethanol, 3-cyclohexene-1-1-dimethanol, 2'-(phenylene dioxy)diethanol, 4-8-bis(hydroxymethyl) tricyclo[5.2.1.0$^{2,6}$]decane, 5-nitro-m-xylene-α, α'-diol, 2,3,5,6-tetramethyl-p-xylene-α, α'-diol, 2-hydroxybenzyl alcohol, 3,5-dihydroxybenzylalcohol, 4-hydroxy-3-methoxy benzylalcohol, 3-hydroxy-4-methoxybenzylalcohol, homovanillyl alcohol, hydroxyphenethyl alcohol, and mixtures thereof; (j) imino alcohols selected from the group consisting of 2,2'methyliminodiethanol; N,N-bis(2-hydroxyethyl)-ing of 2,2'methyliminodiethanol; N,N-bis(2-hydroxyethyl)-2-amino ethane sulfonic acid; bicine; 1-[N,N-bis(2-hydroxyethyl)isopropanolamine; 3-[bis(2-hydroxyethyl) amino]-2-hydroxy-1-propane sulfonic acid; 2,2' (phenylamino)diethanol; 2,2'-(tolylimino)diethanol; bis(2-hydroxypropyl)amine(di-isopropanol amine); bis(3-hydroxypropyl)amine; N,N'-bis(2-hydroxyethyl) ethylenediamine; N,N-bis(2-hydroxypropyl)ethanolamine; triethanol amine ethoxylate; 1-4-bis(2-hydroxyethyl) piperazine; 1-[2-(2-hydroxyethoxy)ethyl]-piperazine; bis[(2-hydroxyethoxy)ethyl]-piperazine; 1,4-bis(2-hydroxypropyl)piperazine; 1,4-bis(2-hydroxypropyl)2-methyl piperazine; bis(2-hydroxypropyl)-2,5-dimethyl-piperazine; 1-(2-N,N-bis(2-hydroxypropyl)amino)ethyl 4-(2-hydroxpropyl piperazine; N,N-bis(3-hydroxypropyl) homopiperazine; 4,4'-trimethylene bis(1-piperidine ethanol); and mixtures thereof; (k) salts of hydroxyl compounds selected from the group consisting of pantothenic acid calcium salt hydrate; pantothenic acid sodium salt; 4-(2,3-dihydroxypropyl)-2-isononylsuccinate potassium salt; 4-(2,3-dihydroxypropyl)-2-(2-methylene-4,4-dimethylpentyl)succinate potassium salt; xylonic acid calcium salt; threonic acid calcium salt; and mixtures thereof; (l) saccharides and saccharide derivatives selected from the group consisting of ascorbic acid; isoascorbic acid; 5,6-isopropylidene ascorbic acid; gluconic γ-lactone; α-glucoheptonic γ-lactone; α,β-gluco octanoic-γ-lactone; δ-gluconolactone; glucono-1,5-lactone; 1,2-O-isopropylidene-glucofuranose; 1,2-O-isopropylidenexylofuranose; 1,2-O-isopropylidene-β-idofuranose; 2,5-O-methylene-mannitol; 3,4-O-isopropylidene-mannitol; 1,2,5,6-di-O-isopropylidene-mannitol; 4,6-O-ethylidene-α-glucose; hydrindantin dihydrate; ellagic acid dihydrate; rutin trihydrate; amygdalin; melezitose dihydrate; raffinose pentahydrate; α-galactosyl-α-galactosyl-α-glucosyl-β-fructose; inulin;

and mixtures thereof; and (m) mixtures thereof; (2) causing droplets of the ink to be ejected from the printing apparatus in an imagewise pattern onto a substrate, thereby generating images on the substrate; and (3) exposing the substrate to microwave radiation, thereby drying the images on the substrate.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, they are much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality prints or images. Drop-on-demand systems which use piezoelectric devices to expel the droplets also suffer the disadvantage of a slow printing speed.

The second type of drop-on-demand system is known as thermal ink jet, or bubble jet, and produces high velocity droplets and allows very close spacing of nozzles. The major components of this type of drop-on-demand system are an ink-filled channel having a nozzle on one end and a heat generating resistor near the nozzle. Printing signals representing digital information originate an electric current pulse in a resistive layer within each ink passageway near the orifice or nozzle causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described, for example, in U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," IBM Technical Disclosure Bulletin, Vol 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects.

As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also been discovered that the size of the individual pixels printed by such a printer can be varied over a significant range during operation, thereby accommodating, for example, the printing of variably shaded images. Furthermore, the known droplet ejector technology can be adapted to a variety of printhead configurations; including (1) single ejector embodiments for raster scan printing, (2) matrix configured ejector arrays for matrix printing, and (3) several different types of pagewidth ejector arrays, ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (1 May 1989) and references therein, the disclosure of which is totally incorporated herein by reference.

Inks for ink jet printing processes are known. For example, U.S. Pat. No. 5,431,724 (Adamic et al.), the disclosure of which is totally incorporated herein by reference, discloses that wet cockle is minimized in aqueous based, thermal ink-jet inks by adding to the ink at least one water-soluble substance, such as a solvent or salt, having a molecular weight of less than 200 grams/mole in an amount sufficient to reduce the mole fraction of water to a maximum value of about 0.5. Addition of the substance reduces wet paper cockle to a value that is less than the distance between the thermal ink-jet pen and the paper, thereby preventing a crash condition between the paper and the pen.

U.S. Pat. No. 5,431,720 (Nagai et al.), the disclosure of which is totally incorporated herein by reference, discloses an aqueous ink composition composed of water, a lubricant, a coloring agent dispersed or dissolved in water, and a compound of the formula $RO(CH_2CH_2O)_mCH_2COOM$, wherein R is an alkyl group having 6 to 14 carbon atoms which may be branched; M is a cation selected from the group consisting of alkali metal ion, quaternary ammonium cation, quaternary phosphonium cation, and alkanol amine cation; and m is an integer of 3 to 12.

U.S. Pat. No. 5,356,464 (Hickman et al.), the disclosure of which is totally incorporated herein by reference, discloses a process for reducing paper curl in plain paper printed elements consisting essentially of the step of applying an ink composition to a plain paper substrate, said ink composition comprising an aqueous carrier medium, a colorant, and at least one anti-curl agent in an amount sufficient to substantially eliminate curl in said plain paper substrate, wherein the anti-curl agent has a solubility in water of at least 4.5 percent at 25° C. and is selected from the group consisting of: (a) 1,3-diols, 1,3,5-triols, amino-1,3-diols, and polyoxyalkylene derivatives thereof having the following structure:

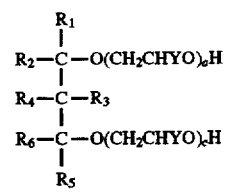

wherein $R_1$, $R_2$, $R_4$, $R_5$, and $R_6$ are independently H, $C_nH_{2n+1}$, where n=1 to 4, or $C_nH_{2n}O(CH_2CHYO)_bH$ where n=1 to 6 and b=0 to 25; $R_3$ is H, $C_nH_{2n+1}$ where n=1 to 4, $C_nH_{2n}O(CH_2CHYO)_bH$ where n=1 to 6 and b=0 to 25, or $(CH_2)_eNXZ$, where X and Z are independently H, $CH_3$, $C_2H_5$, or $C_2H_4O(CH_2CHYO)_dH$, where d=0 to 25 and e=0 to 3; Y is H or $CH_3$; a and c are independently 0 to 25; and wherein the total number of $CH_2CHYO$ units is 0 to 100; (b) polyols and oxyalkylene derivatives thereof having the following structure:

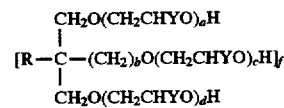

wherein R is independently H, $C_nH_{2n+1}$ where n=1 to 4 or $CH_2O(CH_2CHYO)_eH$, Y is H or $CH_3$, b=0 or 1, a, c, d, and e are independently 0 to 40, f=1 to 6, and wherein the total number of $CH_2CHYO$ units is 0 to 100; with the proviso that when a, b, c, and d=0, and f=1, R is not H and when a, c, and d =0 and b and f both are 1, R is $CH_2O(CH_2CHYO)_eH$ and e is not 0; (c) compounds having the following structure:

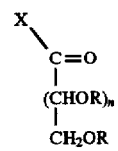

wherein X is H, OH, $CH_2O(CH_2CHYO)_aH$, $O(CH_2CHYO)_b$ H, or OM where M is a metal cation, n=2 to 7, R is $(CH_2CHYO)_cH$, where Y is H or $CH_3$, a, b, and c are independently 0 to 25, and wherein the total number of $CH_2CHYO$ units is 0 to 125; (d) pyranosides and polyalkoxyalkylene derivatives thereof having the following structure:

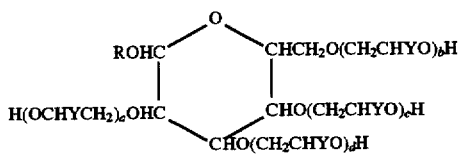

wherein R is H or $C_nH_{2n+1}$, where n=1 to 4, a, b, c, and d are independently 0 to 30, Y is H or $CH_3$, and wherein the total number of $CH_2CHYO$ units os 0 to 120; (e) poly (oxyalkylene) compounds having the following structure:

wherein Y is H or $CH_3$ and x is 3 to 20; and (f) polyoxyalkylene derivatives of aliphatic polyamines having the following structure:

wherein $Z_1$, $Z_2$, $Z_3$, or $Z_4$ are independently $(CH_2CHYO)_a$ wherein Y is H or $CH_3$, n=1 to 20, a is independently 0 to 20, and wherein the total number of $CH_2CHYO$ units is 3 to 200.

U.S. Pat. No. 5,207,824 (Moffatt et al.), the disclosure of which is totally incorporated herein by reference, discloses an improved thermal ink jet ink evidencing reduced medium cockle consisting essentially of (a) about 0.5 to 20 weight percent of at least one low vapor pressure solvent; (b) about 0.5 to 5 weight percent of at least one water soluble dye; (c) about 15 to 50 weight percent of an anti-cockle agent, based on the total ink composition, said anti-cockle agent comprising a compound selected from the group consisting of hexaethylene glycol and an organic compound having from four to eight carbon atoms and from two to three OH groups; and (d) water.

U.S. Pat. No. 5,397,386 (Nakazawa et al.), the disclosure of which is totally incorporated herein by reference, discloses a plastic ink jet head utilizing a water soluble ink comprising water soluble dye, an acetylene glycol surfactant in the range of 0.01 to 0.10 wt percent of the ink having the chemical structure of the formula:

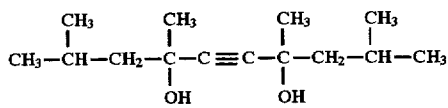

and an acetylene glycol-ethylene oxide adduct surfactant having the following chemical formula

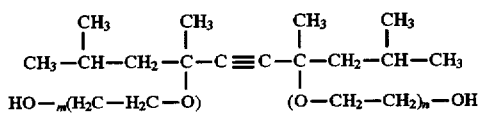

wherein m and n are each integers of at least 1. The acetylene glycolethylene oxide adduct is present from 0.01 to 10.0 wt. percent of the ink.

U.S. Pat. No. 5,395,434 (Tochihara et al.), the disclosure of which is totally incorporated herein by reference, discloses an ink for ink jet recording, comprising a dye, water, and the components (a) at least one surfactant selected from the group consisting of higher alcohol-ethylene oxide adducts of the formula: (1) $RO(CH_2CH_2O)_nH$ where R is alkyl and n is an integer; (2) alkylphenol-ethylene oxide adducts represented by the general formula:

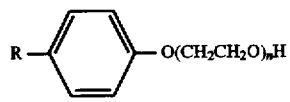

where R is alkyl, and n is an integer, (3) ethylene oxide-propylene oxide copolymers represented by the general formula:

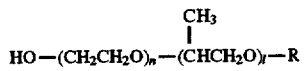

where R is alkyl or hydrogen and n and l are respectively an integer, and (4) acetylene glycol-ethylene oxide adducts having the formula

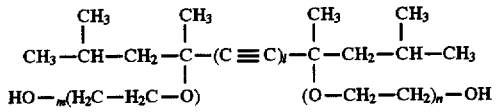

where m and n are integers and l is 2 or more; (b) thiodiglycol; and (c) urea or a derivative thereof. There is also disclosed in this reference an ink containing a dye, a water soluble organic solvent, and water, said ink further comprising a compound of the formula

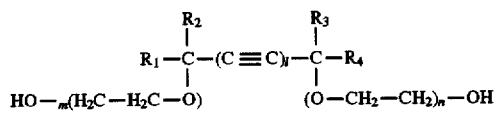

where $R_1$, $R_2$, $R_3$, and $R_4$ are respectively hydrogen, an alkyl or alkenyl group of 1 to 4 carbon atoms, or a substituted or unsubstituted phenyl group; and m+n is ranging from 0 to 50; and l is a number of 2 or more.

U.S. Pat. No. 5,389,132 (Davulcu et al.), the disclosure of which is totally incorporated herein by reference, discloses a composition for use as an ink in thermal ink-jet printers comprising water, a compatible colorant, and certain 2-substituted 1,3-propanediols as humectants, the compositions providing a substantially kogation-free ink.

U.S. Pat. No. 5,370,731 (Yamashita et al.), the disclosure of which is totally incorporated herein by reference, discloses a novel ink for thermal ink jet recording comprising at least water and a coloring material, characterized in that it also contains an amino compound represented by the following general formula:

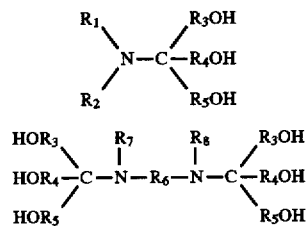

wherein $R_1$ represents a $C_{1-5}$ alkyl group having a hydroxyl group; $R_2$, $R_7$, and $R_8$ may be the same or different and each represents a hydrogen atom or $C_{1-5}$ alkyl group having a hydroxyl group; $R_3$, $R_4$, and $R_5$ may be the same or different and each represents a $C_{1-3}$ alkylene group; and $R_6$ represents a $C_{1-5}$ alkylene group. The content of said amino compound is in the range of 0.005 to 5.0% by weight.

U.S. Pat. No. 5,354,369 (Shimomura et al.), the disclosure of which is totally incorporated herein by reference, discloses an ink containing a recording agent and a liquid medium capable of dissolving or dispersing the recording agent, wherein said ink comprises a compound represented by the formula $R_1R_2NCONHCH_2CH_2OH$, wherein $R_1$ and $R_2$ each represent hydrogen or $C_nH_{2n}OH$, where n is 2 or 3, provided that $R_1$ and $R_2$ are not hydrogen at the same time, and has a pH of not less than 7 to less than 10.

U.S. Pat. No. 5,324,349 (Sano et al.), the disclosure of which is totally incorporated herein by reference, discloses an ink for ink jet printing comprising a pigment, a component selected from the group consisting of saccharides, derivatives thereof, and polyols having 5 or more hydroxyl groups, and a resin emulsion. This pigment-type ink is excellent in preservability, does not cause obstruction in a nozzle, and can evenly produce an image.

U.S. Pat. No. 5,196,056 (Prasad), the disclosure of which is totally incorporated herein by reference, discloses an ink jet composition useful in thermal, multi-color ink jet printers that has the properties of reduced color mixing between adjacent drops of different colors when the drops are impacted onto paper during printing. The ink composition comprises an aqueous solution that consists essentially of a color dye and a bleed retarding agent. A particularly preferred bleed retarding agent is 2-(2-butoxyethoxy)ethanol.

U.S. Pat. No. 5,169,437 (You), the disclosure of which is totally incorporated herein by reference, discloses aqueous ink compositions containing a specific humectant or a mixture of such humectants. The use of such humectants in aqueous ink compositions greatly mitigates the problems arising with the crusting and clogging of orifice plates in thermal ink jet printers associated with aqueous ink compositions not employing a humectant. Additionally, the use of such humectants in aqueous ink compositions greatly mitigates the kogation problems arising in thermal ink-jet printers from humectants heretofore employed in aqueous ink compositions.

U.S. Pat. No. 5,100,469 (Pontes et al.), the disclosure of which is totally incorporated herein by reference, discloses an ink composition which is especially useful for ink jet printing that contains a colorant, a liquid carrier, and at least one additive selected from the group consisting of meso-erythritol, $RC(CH_2OH)_3$, and salts thereof, wherein R is a member selected from the group consisting of $NH_2$ and alkyl.

U.S. Pat. No. 5,120,361 (Winnik et al.), the disclosure of which is totally incorporated herein by reference, discloses an ink composition comprising a solution which comprises a dendrimer and a dye or dyes.

U.S. Pat. No. 5,220,346 (Carreira et al.), the disclosure of which is totally incorporated herein by reference, discloses a printing process which comprises applying in imagewise fashion to a substrate an ink composition which comprises an aqueous liquid vehicle, a colorant, and an ionic compound at least partially ionizable in the liquid vehicle, said ink composition having a conductivity of at least about 10 milliSiemens per centimeter, and subsequently exposing the substrate to microwave radiation, thereby drying the images on the substrate. A specific embodiment of the invention is directed to a thermal ink jet printing process which comprises (1) incorporating into a thermal ink jet printing apparatus an ink composition which comprises an aqueous liquid vehicle, a colorant, and an ionic compound at least partially ionizable in the liquid vehicle, said ink composition having a conductivity of at least about 10 milliSiemens per centimeter; (2) heating the ink in an imagewise pattern to cause bubbles to form therein, thereby causing droplets of the ink to be ejected in an imagewise pattern onto a substrate, thereby generating images on the substrate; and (3) exposing the substrate to microwave radiation, thereby drying the images on the substrate.

Copending application U.S. Ser. No. 829,863 (Isganitis et al.), filed Feb. 3, 1992, entitled "Printing Processes With Microwave Drying," with the named inventors Louis V. Isganitis, Edward J. Radigan Jr., Arthur M. Gooray, Leonard M. Carreira, and William M. Schwarz Jr., the disclosure of which is totally incorporated herein by reference, discloses a printing process which comprises applying in imagewise fashion to a substrate an ink composition which comprises an aqueous liquid vehicle, a colorant, and a drying component selected from the group consisting of zwitterionic compounds, and subsequently exposing the substrate to microwave radiation, thereby drying the images on the substrate. In a preferred embodiment, the invention is directed to a thermal ink jet printing process which comprises (1) incorporating into a thermal ink jet printing apparatus an ink composition which comprises an aqueous liquid vehicle, a colorant, and a drying component selected from the group consisting of zwitterionic compounds; (2) heating the ink in an imagewise pattern to cause bubbles to form therein, thereby causing droplets of the ink to be ejected in an imagewise pattern onto a substrate, thereby generating images on the substrate; and (3) exposing the substrate to microwave radiation, thereby drying the images on the substrate.

Aqueous inks used in ink jet printing have water as a major component. Although water has the advantage of being non-toxic, environmentally friendly, and an excellent solvent for dyes, it has the disadvantage of interacting with paper to cause two major distortions known as paper cockle and paper curl. Paper cockle is a distortion in which bumps, indentations, and other irregularities produced on the printed paper give the paper a wrinkled appearance. Curl is a phenomenon in which the edges of the paper migrate towards the center of the paper. The direction of curl may be on the printed side of the paper or it may be on the non-printed side (reverse curl). Curl may appear immediately after printing or may take days to manifest, but in its final state the paper sheet takes the form of a tube. Curl is most prevalent in solid fill printing, and is therefore a more acute problem in graphics, which employs four color printing, as opposed to text areas. The use of heating elements commonly used to increase the rate of ink drying are known to accelerate paper curl. Various mechanical devices to reduce curl, such as heated rolls and tension applicators, have been tried but are only marginally effective. It is also known to reduce curl by using coated papers. This approach, however, is expensive and not very popular since consumers have an overwhelming preference for printers that can use a wide variety of office papers, especially those sold in the xerographic plain-paper copier/printer market. There is thus a need in the art for aqueous ink compositions containing anti-curl agents which can be employed in printing processes which use microwave drying without producing paper curl, thus eliminating the need for expensive, ineffective and cumbersome mechanical devices or special substrates.

Thus, while known compositions and processes are suitable for their intended purposes, a need remains for improved ink jet ink compositions. There is also a need for ink compositions which can be jetted at high frequencies, thereby enabling high printing speeds. In addition, there is a need for improved ink compositions suitable for printing processes employing microwave drying. Further, a need remains for ink compositions which are both jettable at high frequencies and suitable for microwave drying application. Additionally, there is a need for ink compositions that prevent imaged substrates from curling as they exit the printer. There is also a need for ink compositions which enable jetting at high frequencies and use in microwave drying systems which also reduce or prevent curling of the substrate. A need further remains for ink compositions which reduce curl when employed in microwave drying systems that further exhibit high optical density, acceptable thermal and storage stability, and compatibility with plain papers, coated papers, treated papers, and transparency materials, and which do not induce clogging of the printheads in ink jet printers.

SUMMARY OF THE INVENTION

It is an object of the present invention to provide ink jet printing processes with the above advantages.

It is another object of the present invention to provide ink jet printing processes which employ improved ink compositions.

It is yet another object of the present invention to provide ink jet printing processes with high frequencies and high printing speeds.

It is still another object of the present invention to provide ink jet printing processes which employ microwave drying and which enable reduced or eliminated substrate curling.

Another object of the present invention to provide ink jet printing processes which employ microwave drying and enable reduced or eliminated substrate curling, and which also enable the formation of high quality, high optical density images on a variety of substrate materials.

These and other objects of the present invention (or specific embodiments thereof) can be achieved by providing an ink composition which comprises an aqueous liquid vehicle, a colorant, and an additive material selected from the group consisting of (a) symmetric acetylenic bisester alcohols of the general formulae $$[HO(CH_2)]_3CCH_2OOC(R)_nC\equiv C(R)_nCOOCH_2C[(CH_2)OH]_3 \quad \text{I.}$$

$$[HO(CH_2)]_2C(R_1)CH_2OOC(R)_nC\equiv C(R)_nCOOCH_2C(R_1)[(CH_2OH)]_2 \quad \text{II.}$$

$$(HOCH_2)C(R_1)(R_2)CH_2OOC(R)_nC\equiv C(R)_nCOOC(R_1)(R_2)(CH_2OH) \quad \text{III.}$$

wherein R is $CH_2$, $CH_2OCH_2$, or $C_2H_5OC_2H_5$, $R_1$ and $R_2$ each, independently, are hydrogen atoms, alkyl groups, substituted alkyl groups, or alkoxy groups, and n is an integer of from 0 to 10; (b) symmetric acetylenic bisalkyl alcohols and acetylenic bisalkoxy alcohols of the general formula $$HOC(R_1)(R_2)(CH_2OCH_2)_m(R)_nC\equiv C(R)_n(CH_2OCH_2)_mC(R_1)(R_2)OH \quad \text{IV.}$$

wherein R is a straight chain alkyl group or a substituted straight chain alkyl group, $R_1$ and $R_2$ each, independently of the other, are hydrogen atoms, alkyl groups, substituted alkyl groups, or alkoxy groups, x is an integer of 0 or 1, and m is an integer of from 1 to about 100; (c) symmetric acetylenic bisamido alcohols of the general formulae $$[HO(CH_2)_m]_3CNHCOC\equiv CCONHC[(CH_2)_mOH]_3 \quad \text{V.}$$

$$[HO(CH_2)_m]_2C(R_1)NHCO\equiv CONHC(R_1)[(CH_2)_mOH]_2 \quad \text{VI.}$$

$$[HO(CH_2)_m]C(R_1)(R_2)NHCOC\equiv CCONHC(R_1)(R_2)[CH_2)_mOH] \quad \text{VII.}$$

wherein $R_1$ and $R_2$ each, independently of the other, are hydrogen atoms, alkyl groups, substituted alkyl groups, or alkoxy groups, and m is an integer of from 1 to about 10; (d) symmetric bisamido alcohols of the general formulae $$[HO(CH_2)]_3CNHCO(R)_xCONHC[(CH_2)OH]_3 \quad \text{VIII.}$$

$$[HO(CH_2)]_2C(R_1)NHCO(R)_xCONHC(R_1)[(CH_2)OH]_2 \quad \text{IX.}$$

$$[HOCH_2]C(R_1)(R_2)NHCO(R)_xCONHC(R_1)(R_2)[CH_2OH] \quad \text{X.}$$

wherein R is a straight chain alkyl group or a substituted straight chain alkyl group, $R_1$ and $R_2$ each, independently of the other, are hydrogen atoms, alkyl groups, substituted alkyl groups, or alkoxy groups, and x is an integer of 0 or 1; (e) mono amido alcohols of the general formula $$RCONR_1(CH_2)_nOH \quad \text{XI.}$$

wherein R is a hydrogen atom, an alkyl group, a substituted alkyl group, an aryl group, a substituted aryl group, an arylalkyl group, a substituted arylalkyl group, a pyridine group, a substituted pyridine group, a piperidine group, a substituted piperidine group, a piperazine group, a substituted piperazine group, a quinoline group, a substituted quinoline group, a pyrrolidine group, a substituted pyrrolidine group, an imidazoline group, or a substituted imidazoline group, $R_1$ is H, $CH_2$, or $CH_2OCH_2$, and n is an integer of from 0 to about 5; (f) trialkylhydroxy compounds selected from the group consisting of N-[tris(hydroxymethyl)methyl] glycine, N-[tri(hydroxymethyl)methyl]acrylamide, 2-(bromomethyl)-2-(hydroxymethyl)-1,3-propane diol, 2-(nitro)-2-(hydroxymethyl)-1,3-propanediol, 1,3,5-tris(2-hydroxyethyl)cyanuric acid, nitromethane-trispropanol, amino tris propanol, and mixtures thereof; (g) derivatives of 1,2-diols and 1,3-diols selected from the group consisting of 1-phenyl-1,2-ethanediol; 1-(2-nitrophenyl)-1,2-ethanediol; 3-methoxy-1,2-propanediol; 3-ethoxy-1,2-propanediol; 3-allyloxy-1,2-propanediol; 3-phenoxy-1,2-propanediol; 3-(4-methoxy phenoxy)-1,2-propane diol; 3-(2-methyl phenoxy)-1,2-propanediol; 5-hexene-1,2-diol; 7-octene-1,2-diol; 2-phenyl-1,2-propanediol; 3-(diethylamino)-1,2-propanediol; 3-(diisopropyl amino)-1,2-propanediol; 3-(N-benzyl-N-methylamino)-1,2-propanediol; 3-pyrrolidino-1,2-propanediol; 3-piperidino-1,2-propanediol; 3-morpholino-1,2-propanediol; 2,2-dimethyl-1-phenyl-1,3-propane diol; 2-benzyloxy-1,3-propanediol; 2-bromo-2-nitro-1,3-propanediol; and mixtures thereof; (h) thio diols selected from the group consisting of 2-hydroxyethyl disulfide; 3,6-dithia-1,8-octane diol; 2,2'-sulfonyl diethanol; 3,3'-thiodipropanol; bis(2-hydroxypropyl sulfide; bis(2-hydroxypropyl)disulfide; and mixtures thereof; (i) aromatic and heterocyclic diols selected from the group consisting of 2,5-furandimethanol, 3-cyclohexene-1-1-dimethanol, 2'-(phenylene dioxy)diethanol, 4-8-bis(hydroxymethyl) tricyclo[$5.2.1.0^{2,6}$]decane, 5-nitro-m-xylene-$\alpha,\alpha'$-diol, 2,3,5,6-tetramethyl-p-xylene-$\alpha,\alpha'$-diol, 2-hydroxybenzyl alcohol, 3,5-dihydroxybenzylalcohol, 4-hydroxy-3-methoxy benzylalcohol, 3-hydroxy-4-methoxybenzylalcohol, homovanillyl alcohol, hydroxyphenethyl alcohol, and mixtures thereof; (j) imino alcohols selected from the group consisting of 2,2'methyliminodiethanol; N,N-bis(2-hydroxyethyl)-2-amino ethane sulfonic acid; bicine; 1-[N,N-bis(2-hydroxyethyl)isopropanolamine; 3-[bis(2-hydroxyethyl) amino]-2-hydroxy-1-propane sulfonic acid; 2,2'(phenylamino)diethanol; 2,2'-(tolylimino)diethanol; bis(2-hydroxypropyl)amine(di-isopropanol amine); bis(3-hydroxypropyl)amine; N,N'-bis(2-hydroxyethyl) ethylenediamine; N,N-bis(2-hydroxypropyl)ethanolamine;

triethanol amine ethoxylate; 1-4-bis(2-hydroxyethyl) piperazine; 1-[2-(2-hydroxyethoxy)ethyl]-piperazine; bis[(2-hydroxyethoxy)ethyl]-piperazine; 1,4-bis(2-hydroxypropyl)piperazine; 1,4-bis(2-hydroxypropyl)2-methyl piperazine; bis(2-hydroxypropyl)-2,5-dimethyl-piperazine; 1-(3-N,N-bis(2-hydroxypropyl)amino)ethyl 4-(2-hydroxpropyl piperazine; N,N-bis(3-hydroxypropyl) homopiperazine; 4,4'-trimethylene bis(1-piperidine ethanol); and mixtures thereof; (k) salts of hydroxyl compounds selected from the group consisting of pantothenic acid calcium salt hydrate; pantothenic acid sodium salt; 4-(2,3-dihydroxypropyl)-2-isononylsuccinate potassium salt; 4-(2,3-dihydroxypropyl)-2-(2-methylene-4,4-dimethylpentyl)succinate potassium salt; xylonic acid calcium salt; threonic acid calcium salt; and mixtures thereof; (l) saccharides and saccharide derivatives selected from the group consisting of ascorbic acid; isoascorbic acid; 5,6-isopropylidene ascorbic acid; gluconic γ-lactone; α-glucoheptonic γ-lactone; α,β-gluco octanoic-γ-lactone; δ-gluconolactone; glucono-1,5-lactone; 1,2-O-isopropylidene-glucofuranose; 1,2-O-isopropylidene-xylofuranose; 1,2-O-isopropylidene-β-idofuranose; 2,5-O-methylene-mannitol; 3,4-O-isopropylidene-mannitol; 1,2,5,6-di-O-isopropylidene-mannitol; 4,6-O-ethylidene-α-glucose; hydrindantin dihydrate; ellagic acid dihydrate; rutin trihydrate; amygdalin; melezitose dihydrate; raffinose pentahydrate; α-galactosyl-α-galactosyl-α-glucosyl-β-fructose; inulin; and mixtures thereof; and (m) mixtures thereof. Another embodiment of the present invention is directed to an ink jet process which comprises (1) incorporating into a thermal ink jet printing apparatus an ink composition which comprises an aqueous liquid vehicle, a colorant, and an additive material selected from the group consisting of (a) symmetric acetylenic bisester alcohols of the general formulae

  I.

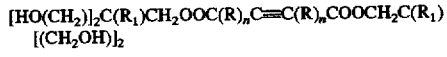  II.

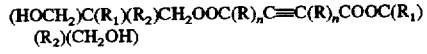  III.

wherein R is $CH_2$, $CH_2OCH_2$, or $C_2H_5OC_2H_5$, $R_1$ and $R_2$ each, independently, are hydrogen atoms, alkyl groups, substituted alkyl groups, or alkoxy groups, and n is an integer of from 0 to 10; (b) symmetric acetylenic bisalkyl alcohols and acetylenic bisalkoxy alcohols of the general formula

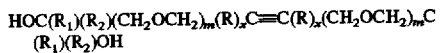  IV.

wherein R is a straight chain alkyl group or a substituted straight chain alkyl group, $R_1$ and $R_2$ each, independently of the other, are hydrogen atoms, alkyl groups, substituted alkyl groups, or alkoxy groups, x is an integer of 0 or 1, and m is an integer of from 1 to about 100; (c) symmetric acetylenic bisamido alcohols of the general formulae

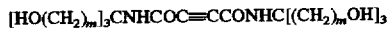  V.

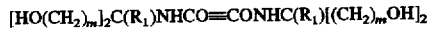  VI.

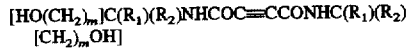  VII.

wherein $R_1$ and $R_2$ each, independently of the other, are hydrogen atoms, alkyl groups, substituted alkyl groups, or alkoxy groups, and m is an integer of from 1 to about 10; (d) symmetric bisamido alcohols of the general formulae

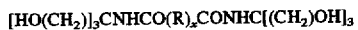  VIII.

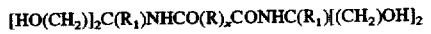  IX.

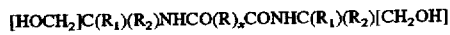  X.

wherein R is a straight chain alkyl group or a substituted straight chain alkyl group, $R_1$ and $R_2$ each, independently of the other, are hydrogen atoms, alkyl groups, substituted alkyl groups, or alkoxy groups, and x is an integer of 0 or 1; (e) mono amido alcohols of the general formula

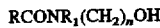

wherein R is a hydrogen atom, an alkyl group, a substituted alkyl group, an aryl group, a substituted aryl group, an arylalkyl group, a substituted arylalkyl group, a pyridine group, a substituted pyridine group, a piperidine group, a substituted piperidine group, a piperazine group, a substituted piperazine group, a quinoline group, a substituted quinoline group, a pyrrolidine group, a substituted pyrrolidine group, an imidazoline group, or a substituted imidazoline group, $R_1$ is H, $CH_2$, or $CH_2OCH_2$, and n is an integer of from 0 to about 5; (f) trialkylhydroxy compounds selected from the group consisting of N-[tris(hydroxymethyl)methyl]glycine, N-[tri(hydroxymethyl)methyl]acrylamide, 2-(bromomethyl)-2-(hydroxymethyl)-1,3-propane diol, 2-(nitro)-2-(hydroxymethyl)-1,3-propanediol, 1,3,5-tris(2-hydroxyethyl)cyanuric acid, nitromethane-trispropanol, amino tris propanol, and mixtures thereof; (g) derivatives of 1,2-diols and 1,3-diols selected from the group consisting of 1-phenyl-1,2-ethanediol; 1-(2-nitrophenyl)-1,2-ethanediol; 3-methoxy-1,2-propanediol; 3-ethoxy-1,2-propanediol; 3-allyloxy-1,2-propanediol; 3-phenoxy-1,2-propanediol; 3-(4-methoxy phenoxy)-1,2-propane diol; 3-(2-methyl phenoxy)-1,2-propanediol; 5-hexene-1,2-diol; 7-octene-1,2-diol; 2-phenyl-1,2-propanediol; 3-(diethylamino)-1,2-propanediol; 3-(diisopropyl amino)-1,2-propanediol; 3-(N-benzyl-N-methylamino)-1,2-propanediol; 3-pyrrolidino-1,2-propanediol; 3-piperidino-1,2-propanediol; 3-morpholino-1,2-propanediol; 2,2-dimethyl-1-phenyl-1,3-propane diol; 2-benzyloxy-1,3-propanediol; 2-bromo-2-nitro-1,3-propanediol; and mixtures thereof; (h) thio diols selected from the group consisting of 2-hydroxyethyl disulfide; 3,6-dithia-1,8-octane diol; 2,2'-sulfonyl diethanol; 3,3'-thiodipropanol; bis(2-hydroxypropyl sulfide; bis(2-hydroxypropyl)disulfide; and mixtures thereof; (i) aromatic and heterocyclic diols selected from the group consisting of 2,5-furandimethanol, 3-cyclohexene-1-1-dimethanol, 2'-(phenylene dioxy) diethanol, 4-8-bis(hydroxymethyl)tricyclo[5.2.1.0$^{2,6}$]decane, 5-nitro-m-xylene-α,α'-diol, 2,3,5,6-tetramethyl-p-xylene-α,α'-diol, 2-hydroxybenzyl alcohol, 3,5-dihydroxybenzylalcohol, 4-hydroxy-3-methoxy benzylalcohol, 3-hydroxy-4-methoxybenzylalcohol, homovanillyl alcohol, hydroxyphenethyl alcohol, and mixtures thereof; (j) imino alcohols selected from the group consisting of 2,2'methyliminodiethanol; N,N-bis(2-hydroxyethyl)-2-amino ethane sulfonic acid; bicine; 1-[N,N-bis(2-hydroxyethyl)isopropanolamine; 3-[bis(2-hydroxyethyl)amino]-2-hydroxy-1-propane sulfonic acid; 2,2'(phenylamino)diethanol; 2,2'-(tolylimino)diethanol; bis(2-hydroxypropyl)amine(di-isopropanol amine); bis(3-hydroxypropyl)amine; N,N'-bis(2-hydroxyethyl) ethylenediamine; N,N-bis(2-hydroxypropyl)ethanolamine; triethanol amine ethoxylate; 1-4-bis(2-hydroxyethyl) piperazine; 1-[2-(2-hydroxyethoxy)ethyl]-piperazine; bis[(2-hydroxyethoxy)ethyl]-piperazine; 1,4-bis(2-hydroxypropyl)piperazine; 1,4-bis(2-hydroxypropyl)2-methyl piperazine; bis(2- hydroxypropyl)-2,5-dimethyl-piperazine; 1-(2-N,N-bis(2-hydroxypropyl)amino)ethyl 4-(2-hydroxpropyl piperazine; N,N-bis(3-hydroxypropyl)

homopiperazine; 4,4'-trimethylene bis(1-piperidine ethanol); and mixtures thereof; (k) salts of hydroxyl compounds selected from the group consisting of pantothenic acid calcium salt hydrate; pantothenic acid sodium salt; 4-(2,3-dihydroxypropyl)-2-isononylsuccinate potassium salt; 4-(2,3-dihydroxypropyl)-2-(2-methylene-4,4-dimethylpentyl)succinate potassium salt; xylonic acid calcium salt; threonic acid calcium salt; and mixtures thereof; (l) saccharides and saccharide derivatives selected from the group consisting of ascorbic acid; isoascorbic acid; 5,6-isopropylidene ascorbic acid; gluconic γ-lactone; α-glucoheptonic γlactone; α,β-gluco octanoic-γ-lactone; δ-gluconolactone; glucono-1,5-lactone; 1,2-O-isopropylidene-glucofuranose; 1,2-O-isopropylidenexylofuranose; 1,2-O-isopropylidene-β-idofuranose; 2,5-O-methylenemannitol; 3,4-O-isopropylidene-mannitol; 1,2,5,6-di-O-isopropylidenemannitol; 4,6-O-ethylidene-α-glucose; hydrindantin dihydrate; ellagic acid dihydrate; rutin trihydrate; amygdalin; melezitose dihydrate; raffinose pentahydrate; α-galactosyl-α-galactosyl-α-glucosyl-β-fructose; inulin; and mixtures thereof; and (m) mixtures thereof; and (2) causing droplets of the ink to be ejected from the printing apparatus in an imagewise pattern onto a substrate, thereby generating images on the substrate. Yet another embodiment of the present invention is directed to an ink jet printing process which comprises (1) incorporating into a thermal ink jet printing apparatus an ink composition which comprises an aqueous liquid vehicle, a colorant, and an additive material selected from the group consisting of (a) symmetric acetylenic bisester alcohols of the general formulae

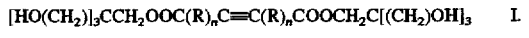

$[HO(CH_2)]_3CCH_2OOC(R)_nC\equiv C(R)_nCOOCH_2C[(CH_2)OH]_3$     I.

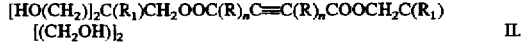

$[HO(CH_2)]_2C(R_1)CH_2OOC(R)_nC\equiv C(R)_nCOOCH_2C(R_1)$
$[(CH_2OH)]_2$     II.

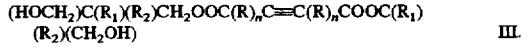

$(HOCH_2)C(R_1)(R_2)CH_2OOC(R)_nC\equiv C(R)_nCOOC(R_1)$
$(R_2)(CH_2OH)$     III.

wherein R is $CH_2$, $CH_2OCH_2$, or $C_2H_5OC_2H_5$, $R_1$ and $R_2$ each, independently, are hydrogen atoms, alkyl groups, substituted alkyl groups, or alkoxy groups, and n is an integer of from 0 to 10; (b) symmetric acetylenic bisalkyl alcohols and acetylenic bisalkoxy alcohols of the general formula

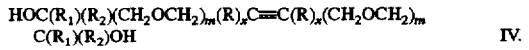

$HOC(R_1)(R_2)(CH_2OCH_2)_m(R)_xC\equiv C(R)_x(CH_2OCH_2)_m$
$C(R_1)(R_2)OH$     IV.

wherein R is a straight chain alkyl group or a substituted straight chain alkyl group, $R_1$ and $R_2$ each, independently of the other, are hydrogen atoms, alkyl groups, substituted alkyl groups, or alkoxy groups, x is an integer of 0 or 1, and m is an integer of from 1 to about 100; (c) symmetric acetylenic bisamido alcohols of the general formulae

$[HO(CH_2)_m]_3CNHCOC\equiv CCONHC[(CH_2)_mOH]_3$     V.

$[HO(CH_2)_m]_2C(R_1)NHCO\equiv CONHC(R_1)[(CH_2)_mOH]_2$     VI.

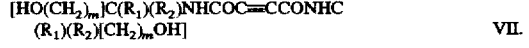

$[HO(CH_2)_m]C(R_1)(R_2)NHCOC\equiv CCONHC$
$(R_1)(R_2)[CH_2)_mOH]$     VII.

wherein $R_1$ and $R_2$ each, independently of the other, are hydrogen atoms, alkyl groups, substituted alkyl groups, or alkoxy groups, and m is an integer of from 1 to about 10; (d) symmetric bisamido alcohols of the general formulae

$[HO(CH_2)]_3CNHCO(R)_xCONHC[(CH_2)OH]_3$     VIII.

$[HO(CH_2)]_2C(R_1)NHCO(R)_xCONHC(R_1)[(CH_2)OH]_2$     IX.

$[HOCH_2]C(R_1)(R_2)NHCO(R)_xCONHC(R_1)(R_2)[CH_2OH]$     X.

wherein R is a straight chain alkyl group or a substituted straight chain alkyl group, $R_1$ and $R_2$ each, independently of the other, are hydrogen atoms, alkyl groups, substituted alkyl groups, or alkoxy groups, and x is an integer of 0 or 1; (e) mono amido alcohols of the general formula

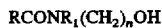

$RCONR_1(CH_2)_nOH$     XI.

wherein R is a hydrogen atom, an alkyl group, a substituted alkyl group, an aryl group, a substituted aryl group, an arylalkyl group, a substituted arylalkyl group, a pyridine group, a substituted pyridine group, a piperidine group, a substituted piperidine group, a piperazine group, a substituted piperazine group, a quinoline group, a substituted quinoline group, a pyrrolidine group, a substituted pyrrolidine group, an imidazoline group, or a substituted imidazoline group, $R_1$ is H, $CH_2$, or $CH_2OCH_2$, and n is an integer of from 0 to about 5; (f) trialkylhydroxy compounds selected from the group consisting of N-[tris(hydroxymethyl)methyl] glycine, N-[tri(hydroxymethyl)methyl]acrylamide, 2-(bromomethyl)-2-(hydroxymethyl)-1,3-propane diol, 2-(nitro)-2-(hydroxymethyl)-1,3-propanediol, 1,3,5-tris(2-hydroxyethyl)cyanuric acid, nitromethane-trispropanol, amino tris propanol, and mixtures thereof; (g) derivatives of 1,2-diols and 1,3-diols selected from the group consisting of 1-phenyl-1,2-ethanediol; 1-(2-nitrophenyl)-1,2-ethanediol; 3-methoxy-1,2-propanediol; 3-ethoxy-1,2-propanediol; 3-allyloxy-1,2-propanediol; 3-phenoxy-1,2-propanediol; 3-(4-methoxy phenoxy)-1,2-propane diol; 3-(2-methyl phenoxy)-1,2-propanediol; 5-hexene-1,2-diol; 7-octene-1,2-diol; 2-phenyl-1,2-propanediol; 3-(diethylamino)-1,2-propanediol; 3-(diisopropyl amino)-1,2-propanediol; 3-(N-benzyl-N-methylamino)-1,2-propanediol; 3-pyrrolidino-1,2-propanediol; 3-piperidino-1,2-propanediol; 3-morpholino-1,2-propanediol; 2,2-dimethyl-1-phenyl-1,3-propane diol; 2-benzyloxy-1,3-propanediol; 2-bromo-2-nitro-1,3-propanediol; and mixtures thereof; (h) thio diols selected from the group consisting of 2-hydroxyethyl disulfide; 3,6-dithia-1,8-octane diol; 2,2'-sulfonyl diethanol; 3,3'-thiodipropanol; bis(2-hydroxypropyl sulfide; bis(2-hydroxypropyl)disulfide; and mixtures thereof; (i) aromatic and heterocyclic diols selected from the group consisting of 2,5-furandimethanol, 3-cyclohexene-1-1-dimethanol, 2'-(phenylene dioxy)diethanol, 4-8-bis(hydroxymethyl) tricyclo[5.2.1.0$^{2,6}$]decane, 5-nitro-m-xylene-α, α'-diol, 2,3, 5,6-tetramethyl-p-xylene-α,α'-diol, 2-hydroxybenzyl alcohol, 3,5-dihydroxybenzylalcohol, 4-hydroxy-3-methoxy benzylalcohol, 3-hydroxy-4-methoxybenzylalcohol, homovanillyl alcohol, hydroxyphenethyl alcohol, and mixtures thereof; (j) imino alcohols selected from the group consisting of 2,2'methyliminodiethanol; N,N-bis(2-hydroxyethyl)-2-amino ethane sulfonic acid; bicine; 1-[N,N-bis(2-hydroxyethyl)isopropanolamine; 3-[bis(2-hydroxyethyl) amino]-2-hydroxy-1-propane sulfonic acid; 2,2' (phenylamino)diethanol; 2,2'-(tolylimino)diethanol; bis(2-hydroxypropyl)amine(di-isopropanol amine); bis(3-hydroxypropyl)amine; N,N'-bis(2-hydroxyethyl) ethylenediamine; N,N-bis(2-hydroxypropyl)ethanolamine; triethanol amine ethoxylate; 1-4-bis(2-hydroxyethyl) piperazine; 1-[2-(2-hydroxyethoxy)ethyl]-piperazine; bis[ (2-hydroxyethoxy)ethyl]-piperazine; 1,4-bis(2-hydroxypropyl)piperazine;1,4-bis(2-hydroxypropyl)2-methyl piperazine; bis(2-hydroxypropyl)-2,5-dimethyl-piperazine; 1-(2-N,N-bis(2-hydroxypropyl)amino) ethyl4-(2-hydroxpropyl piperazine; N,N-bis(3-hydroxypropyl) homopiperazine; 4,4'-trimethylene bis(1-piperidine ethanol); and mixtures thereof; (k) salts of hydroxyl compounds selected from the group consisting of pantothenic acid calcium salt hydrate; pantothenic acid sodium salt; 4-(2,3-dihydroxypropyl)-2-isononylsuccinate potassium salt; 4-(2,3-dihydroxypropyl)-2-(2-methylene-4,4-dimethylpentyl)succinate potassium salt; xylonic acid calcium salt; threonic acid calcium salt; and mixtures thereof; (1) saccharides and saccharide derivatives selected from the group consisting of ascorbic acid; isoascorbic acid; 5,6-isopropylidene ascorbic acid; gluconic γ-lactone; α-glucoheptonic γ-lactone; α,β-gluco octanoic-γ-lactone; δ-gluconolactone; glucono-1,5-lactone; 1,2-O-isopropylidene-glucofuranose; 1,2-O-isopropylidenexylofuranose; 1,2-O-isopropylidene-β-idofuranose; 2,5-O-methylenemannitol; 3,4-O-isopropylidene-mannitol; 1,2,5,6-di-O-isopropylidenemannitol; 4,6-O-ethylidene-α-glucose; hydrindantin dihydrate; ellagic acid dihydrate; rutin trihydrate; amygdalin; melezitose dihydrate; raffinose pentahydrate; α-galactosyl-α-galactosyl-α-glucosyl-β-fructose; inulin; and mixtures thereof; and (m) mixtures thereof; (2) causing droplets of the ink to be ejected from the printing apparatus in an imagewise pattern onto a substrate, thereby generating images on the substrate; and (3) exposing the substrate to microwave radiation, thereby drying the images on the substrate.

DETAILED DESCRIPTION OF THE INVENTION

Figure 1A:
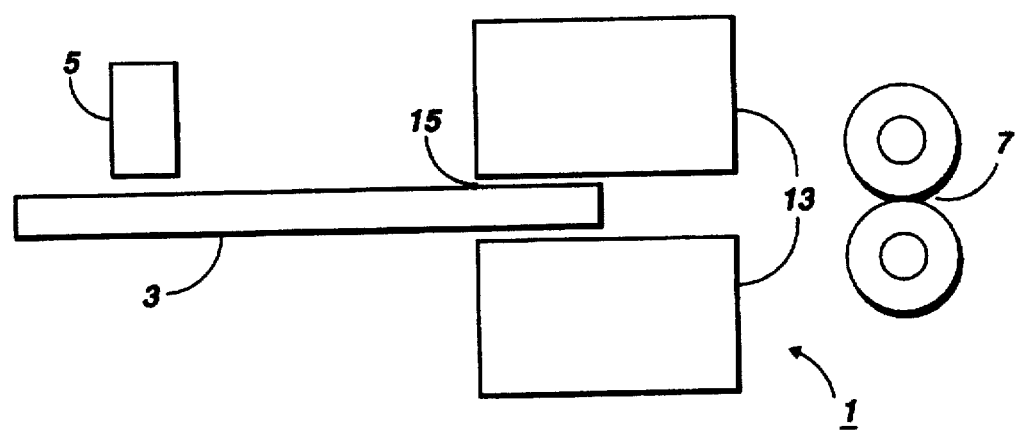
FIGS. 1A, 1B, and 1C illustrate schematically one printing system with a microwave drying apparatus suitable for the process of the present invention.

The liquid vehicle of the inks employed for the process of the present invention may consist of water, or it may comprise a mixture of water and a miscible organic component, such as ethylene glycol, propylene glycol, diethylene glycol, glycerine, dipropylene glycol, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolves, ether derivatives, amino alcohols, ketones, and other water miscible materials, as well as mixtures thereof. When mixtures of water and water miscible organic liquids are selected as the liquid vehicle, the water to organic ratio may be in any effective range, and typically is from about 100:0 to about 30:70, preferably from about 97:3 to about 50:50, although the ratio can be outside these ranges. The non-water component of the liquid vehicle generally serves as a humectant which has a boiling point higher than that of water (100° C.). The ink liquid vehicle components, i.e., the water and the humectants, generally possess absorption characteristics on paper and evaporation properties allowing for the desired ink jet printing speed when the ink is to be used in an ink jet printing process. With the inks of the present invention, the liquid vehicle can be present in any effective amount, typically from about 50 to about 99.5 percent by weight, and preferably from about 70 to about 99 percent by weight, although the amount can be outside these ranges.

Particularly preferred humectants for microwave drying include dimethylamino ethanol (Aldrich D15,740-6), 2-(2-aminoethylamino)ethanol (Aldrich 12,758-2), 2-amino-2-methyl-1-propanol (Aldrich A6,518-2), 3-amino-1,2-propanediol (Aldrich A7,600-1), 3-morpholino-1,2-propanediol (Aldrich 21,848-0), 2-amino-3-methyl-1-butanol (Aldrich 18,483-7), 1,2,4-butanetriol (Aldrich B8,580-3), ethanol amine (Aldrich 39,813-6), triethanol amine (Aldrich T5,830-0), N-(3-aminopropyl) diethanolamine (Texaco Chemical Co.), 2,2'-thiodiethanol (Aldrich 16,678-2), 3,3'-thiodipropanol (Aldrich 20,534-6), 2-aminoethanethiol (Fluka Chemie A.G.), 2,2'-sulfonyldiethanol (Aldrich 18,008-4), (±)-pantothenol (Aldrich 29,578-7), pantothenic acid calcium salt hydrate (Aldrich 25,972-1), 1,3,5-tris-(2-hydroxyethyl)cyanuric acid (Aldrich 30,900-1), 1,4-bis(2-hydroxyethoxy)-2-butyne (Aldrich B4,470-8), benzyl alcohol (Aldrich 10,800-6), 4-fluorobenzyl alcohol (Aldrich F740-7), 2-fluoropyridine (PCR, Inc. 18050-5), 4-fluoroaniline (PCR, Inc. 10680-7), 2,2,3,3-tetrafluoro-1-propanol (PCR, Inc. 16150-5), 1H,1H-pentafluoro propanol (PCR, Inc. 16230-5), hexafluoro isopropanol (PCR, Inc. 16470-7), 1H,1H,-perfluoro-1-heptanol (PCR, Inc. 17518-2), 1H,1H,2H,2H-perfluorooctanol (PCR, Inc. 17112-4), and the like, as well as mixtures thereof. In the inks employed for the process of the present invention, the liquid vehicle is generally present in an amount of from about 50 to about 99.5 percent by weight, and preferably from about 60 to about 90 percent by weight, although the amount can be outside these ranges.

The colorant for the inks employed for the process of the present invention can be a dye. Examples of suitable dyes include 5,10,15,20-tetrakis-(1-methyl-4-pyridyl)-21H,23H-porphine tetra-p-tosylate salt, available from Aldrich Chemical, 5,10,15,20-tetrakis-(1-methyl-4-pyridyl)-21H,23H-porphine tetra-chloride salt, 5,10,15,20-tetrakis-(1-methyl-4-pyridyl-21H,23H-porphine tetra-bromide salt, 5,10,15,20-tetrakis-(1-methyl-4-pyridyl)-21H,23H-porphine tetra-acetate salt, 5,10,15,20-tetrakis-(1-methyl-4-pyridyl)-21H,23H-porphine tetra-perchlorate salt, 5,10,15,20-tetrakis-(1-methyl-4-pyridyl)-21H,23H-porphine tetra-fluoroborate salt, 5,10,15,20-tetrakis-(1-methyl-4-pyridyl)-21H,23H-porphine tetra-perchlorate salt, 5,10,15,20-tetrakis-(1-methyl-4-pyridyl)-21H,23H-porphine tetra-triflate salt, 5,10,15,20-tetrakis-(1-hydroxymethyl-4-pyridyl)-21H,23H-porphine tetra-p-tosylate salt, 5,10,15,20-tetrakis-[1-(2-hydroxyethyl)-4-pyridyl]-21H,23H-porphine tetra-chloride salt, prepared as described, for example, by V. N. Madakyan, *Chemistry of Heterocyclic Compound*, 1986, pages 167 to 171, the disclosure of which is totally incorporated herein by reference, 5,10,15,20-tetrakis-[1-(3-hydroxypropyl)-4-pyridyl]-21H,23H-porphine porphine tetra-p-tosylate salt, 5,10,15,20-tetrakis-[1-(2-hydroxypropyl)-4-pyridyl]-21H,23H-porphine tetra-p-tosylate salt, 5,10,15,20-tetrakis-[1-(2-hydroxyethoxyethyl)-4-pyridyl]-21H,23H-porphine tetra-p-tosylate salt, 5,10,15,20-tetrakis-[1-(2-hydroxyethoxypropyl)-4-pyridyl]-21H,23H-porphine tetra-p-tosylate salt, 5,10,15,20-tetrakis-[4-(trimethylammonio) phenyl]-21H,23H-porphine tetra-p-tosylate salt, available from Aldrich Chemical, 5,10,15,20-tetrakis-[4-(trimethylammonio)phenyl]-21H,23H-porphine tetra-chloride salt, 5,10,15,20-tetrakis-[4-(trimethylammonio) phenyl]-21H,23H-porphine tetrabromide salt, 5,10,15,20-tetrakis-[4-(trimethylammonio)phenyl]-21H,23H-porphine tetra-acetate salt, 5,10,15,20-tetrakis-[4-(trimethylammonio)phenyl]-21H,23H-porphine tetra-perchlorate salt, 5,10,15,20-tetrakis-[4-(trimethylammonio) phenyl]-21H,23H-porphine tetra-fluoroborate salt, 5,10,15, 20-tetrakis-[4-(trimethylammonio)phenyl]-21H,23H-porphine tetra-triflate salt, meso-(N-methyl-X-pyridinium)$_n$-(phenyl)4-n-21H,23H-porphine tetra-p-tosylate salt, where n is an integer of value 0, 1, 2, or 3, and where X=4-(para), 3-(meta), or 2-(ortho) refers to the position of the nitrogen in the pyridinium substituent, prepared as described, for example, by M. A. Sari et al. in *Biochemistry*, 1990, 29, 4205 to 4215, the disclosure of which is totally incorporated herein by reference, meso-tetrakis-[o-(N-methylnicotinamido)phenyl]-21H,23H-porphine tetramethyl sulfonate salt, prepared as described, for example, by G. M. Miskelly et al. in *Inorganic Chemistry*, 1988, 27, 3773 to 3781, the disclosure of which is totally incorporated herein by reference, 5,10,15,20-tetrakis-(2-sulfonatoethyl-4-pyridyl)-21H,23H-porphine chloride salt, prepared as described by, for example, S. Igarashi and T. Yotsuyanagi in *Chemistry Letters*, 1984, 1871, the disclosure of which is totally incorporated herein by reference, 5,10,15,20-tetrakis-(carboxymethyl-4-pyridyl)-21H,23H-porphine chloride salt, 5,10,15,20-tetrakis-(carboxyethyl-4-pyridyl)-21H,23H-porphine chloride salt, 5,10,15,20-tetrakis-(carboxyethyl-4-pyridyl)-21H,23H-porphine bromide salt, 5,10,15,20-tetrakis-(carboxylate-4-pyridyl)-21H,23H-porphine bromide salt, prepared as described by, for example, D. P. Arnold in *Australian Journal of Chemistry*, 1989, 42, 2265 to 2274, the disclosure of which is totally incorporated herein by reference, 2,3,7,8,12,13,17,18-octa-(2-hydroxyethyl)-21H-23H-porphine, 2,3,7,8,12,13,17,18-octa-(2-hydroxyethoxyethyl)-21H-23H-porphine, 2,3,7,8,12,13,17,18-octa-(2-aminoethyl)-21H-23H-porphine, 2,3,7,8,12,13,17,18-octa-(2-hydroxyethoxypropyl)-21H-23H-porphine, Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinones, monoazo dyes, disazo dyes, phthalocyanines, aza[18]annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-(Knolls); Aizen Spilon Red C-BH (Hodagaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); (orasol Blue GN (CibaGeigy); Savinyl Blue GLS (Sandoz); Luxol Blue MBSN (Morton-Thiokol); Sevron Blue 5GMF (ICI); Basacid Blue 750 (BASF); Bernacid Red, available from Berncolors, Poughkeepsie, N.Y.; Pontamine Brilliant Bond Blue; Berncolor A. Y. 34; Telon Fast Yellow 4GL-175; BASF Basacid Black SE 0228; the Pro-Jet series of dyes available from ICI, including Pro-Jet Yellow I (Direct Yellow 86), Pro-Jet Magenta I (Acid Red 249), Pro-Jet Cyan I (Direct Blue 199), Pro-Jet Black I (Direct Black 168), Pro-Jet Yellow 1-G (Direct Yellow 132), Aminyl Brilliant Red F-B, available from Sumitomo Chemical Co. (Japan), the Duasyn line of "salt-free" dyes available from Hoechst, such as Duasyn Direct Black HEF-SF (Direct Black 168), Duasyn Black RL-SF (Reactive Black 31), Duasyn Direct Yellow 6G-SF VP216 (Direct Yellow 157), Duasyn Brilliant Yellow GL-SF VP220 (Reactive Yellow 37), Duasyn Acid Yellow XX-SF VP413 (Acid Yellow 23), Duasyn Acid Yellow XX-SF LP 413 (Acid Yellow 23), Duasyn Brilliant Red F3B-SF VP218 (Reactive Red 180), Duasyn Rhodamine B-SF VP353 (Acid Red 52), Duasyn Direct Turquoise Blue FRL-SF VP368 (Direct Blue 199), Duasyn Acid Blue AE-SF VP344 (Acid Blue 9), various Reactive dyes, including Reactive Black dyes, Reactive Blue dyes, Reactive Red dyes, Reactive yellow dyes, and the like, as well as mixtures thereof. These dyes are available from various sources, and many of them can also be prepared by known means, such as by following the general synthesis described in *Organic Synthesis*, A. I. Meyers, Editor, Volume 70, pp. 68 to 72 (1991) and the references included therein, the disclosures of which are totally incorporated herein by reference. The dye is present in the ink composition in any effective amount, typically from about 0.5 to about 15 percent by weight, preferably from about 1 to about 10 percent by weight, more preferably from about 2 to about 7 percent by weight, and even more preferably from about 3 to about 5 percent by weight, although the amount can be outside these ranges.

In addition, the colorant for the ink compositions of the present invention can be a pigment, or a mixture of one or more dyes and/or one or more pigments. The pigment can be black, cyan, magenta, yellow, red, blue, green, brown, mixtures thereof, and the like. Examples of suitable black pigments include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as CI 60710, CI Dispersed Red 15, a diazo dye identified in the Color Index as CI 26050, CI Solvent Red 19, and the like. Illustrative examples of suitable cyan pigments include copper tetra-4-(octadecyl sulfonamido) phthalocyanine, X-copper phthalocyanine pigment, listed in the color index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy aceto-acetanilide, Permanent Yellow FGL, and the like. Additional examples of pigments include Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG 1 (Hoechst), Permanent Yellow YE 305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Co.), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Additional suitable commercially available pigment dispersions include the Hostafines available from Hoechst, including Hostafine Black T, Hostafine Black TS, Hostafine Yellow HR, Hostafine Yellow GR, Hostafine Red FRLL, Hostafine Rubine F6B, and Hostafine Blue B2G, as well as dispersions available from BASF, including Disperse Black 00-6607, Luconyl Yellow 1250, Basoflex Pink 4810, Luconyl Blue 7050, and the like. Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.1 to about 1 microns, although the particle size can be outside these ranges. The pigment is present in the ink composition in any effective amount, generally from about 1 to about 20 percent by weight and preferably from about 4 to about 8 percent by weight, although the amount can be outside of these ranges.

Other additives can also be present in the inks employed in the process of the present invention. For example, surfactants or wetting agents can be added to the ink. These additives may be of the cationic, anionic, or nonionic types. Suitable surfactants and wetting agents include Tamol® SN, Tamol® LG, those of the Triton® series available from Rohm and Haas Co., those of the Marasperse® series, those of the Igepal® series available from GAF Co., those of the Tergitol® series, those of the Duponol® series available from E. I. Du Pont de Nemours & Co., Emulphor ON 870 and ON 877, available from GAF, and other commercially available surfactants. These surfactants and wetting agents are present in effective amounts, generally from 0 to about 15 percent by weight, and preferably from about 0.01 to about 8 percent by weight, although the amount can be outside these ranges.

Polymeric additives can also be added to the inks employed in the process of the present invention to enhance the viscosity of the ink, including water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethyleneimines derivatized with polyethylene oxide and polypropylene oxide, such as the Discole series available from DKS International, Tokyo, Japan, the Jeffamine® series available from Texaco, Bellaire, Tex., and the like. Polymeric additives may be present in the ink of the present invention in amounts of from 0 to about 10 percent by weight, and preferably from about 0.01 to about 5 percent by weight, although the amount can be outside these ranges.

Other optional additives to the inks employed in the process of the present invention include biocides such as Dowicil 150, 200, and 75, benzoate salts, sorbate salts, and the like, present in any effective amount, typically from about 0.0001 to about 4 percent by weight, and preferably from about 0.01 to about 2.0 percent by weight, although the amount can be outside these ranges, humectants or penetration control additives such as ethylene glycol, diethylene glycol, propylene glycol, hydroxy ethers, ethers, amides, N-methylpyrrolidinone, sulfoxides, ketones, lactones, esters, alcohols, butyl carbitol, benzyl alcohol, cyclohexylpyrrolidinone, 1,2-hexanediol, and the like, present in an amount of from 0 to about 50 percent by weight, and preferably from about 5 to about 40 percent by weight, although the amount can be outside these ranges, pH controlling agents such as acids or bases, phosphate salts, carboxylates salts, sulfite salts, amine salts, and the like, present in an amount of from 0 to about 1 percent by weight and preferably from about 0.01 to about 1 percent by weight, although the amount can be outside these ranges, or the like.

The ink composition further contains an additive compound. Examples of suitable additive compounds include (1) acetylenic alcohols, such as (a) symmetric acetylenic bis-ester alcohols of the general formulae

[HO(CH$_2$)]$_3$CCH$_2$OOC(R)$_n$C≡C(R)$_n$COOCH$_2$C[(CH$_2$)OH]$_3$    I.

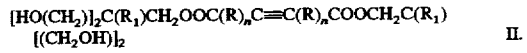

[HO(CH$_2$)]$_2$C(R$_1$)CH$_2$OOC(R)$_n$C≡C(R)$_n$COOCH$_2$C(R$_1$)
[(CH$_2$OH)]$_2$    II.

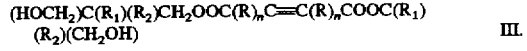

(HOCH$_2$)C(R$_1$)(R$_2$)CH$_2$OOC(R)$_n$C≡C(R)$_n$COOC(R$_1$)
(R$_2$)(CH$_2$OH)    III.

wherein R is CH$_2$, CH$_2$OCH$_2$, or C$_2$H$_5$OC$_2$H$_5$, R$_1$ and R$_2$ each, independently, are hydrogen atoms, alkyl groups, preferably with from 1 to 20 carbon atoms and more preferably with from 1 to 5 carbon atoms, including straight chain, branched, and cyclic alkyl groups, substituted alkyl groups, preferably with from 1 to 20 carbon atoms and more preferably with from 1 to 5 carbon atoms, including straight chain, branched, and cyclic substituted alkyl groups, or alkoxy groups, preferably with from 1 to about 10 carbon atoms and more preferably with from 1 to about 5 carbon atoms, and n is an integer of from 0 to 10, wherein the substituents on the substituted alkyl groups can be (but are not limited to) hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, halogen atoms, nitro groups, sulfone groups, acyl groups, acid anhydride groups, azide groups, and the like.

In formula I, when n is 0, the material is bis[(trishydroxymethyl)methyl]-2-butyne-1,4-dicarboxylate, which can be synthesized as follows:

Dimethylacetylene dicarboxylate (13.7 g, 96 mmol), pentaerythritol (26.14 g, 192 mmol) and potassium carbonate (41.5 g, 300 mmol) were added to 300 ml of dimethyl sulfoxide and stirred overnight. A dark colour developed immediately. Potassium carbonate was removed by filtration and the mixture was concentrated by vacuum distillation. The resulting viscous oil was taken up in the minimum amount of deionized water, frozen, and freeze dried over two days to yield the product as a viscous oil.

In formula II, when n is 0 and $R_1$ is H, the material is bis[(bishydroxymethyl)methyl]-2-butyne-1,4-dicarboxylate, which can be synthesized by the same method as used to prepare bis[(trishydroxymethyl)methyl]-2-butyne-1,4-dicarboxylate, with the exception that tris(hydroxymethyl)methane is employed as the polyhydroxy component.

In formula III, when n is 0, $R_1$ is H, and $R_2$ is H, the material is bis(2-hydroxyethyl)-2-butyne-1,4-dicarboxylate, which can be synthesized by the same method as used to prepare bis[(trishydroxymethyl)methyl]-2-butyne-1,4-dicarboxylate, with the exception that ethylene glycol is employed as the starting material instead of pentaerythritol. Alternatively, acid catalyzed Fischer esterification may be employed in this instance.

Other suitable acetylenic alcohols include (b) symmetric acetylenic bisalkyl alcohols and acetylenic bisalkoxy alcohols of the general formula

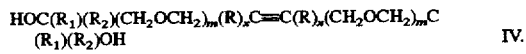

IV.

wherein R is a straight chain alkyl group, preferably with from 1 to about 10 carbon atoms, and more preferably with from 1 to about 5 carbon atoms, or a substituted straight chain alkyl group, preferably with from 1 to about 10 carbon atoms, and more preferably with from 1 to about 5 carbon atoms, wherein $R_1$ and $R_2$ each, independently of the other, are hydrogen atoms, alkyl groups, preferably with from 1 to 20 carbon atoms and more preferably with from 1 to 5 carbon atoms, including straight chain, branched, and cyclic alkyl groups, substituted alkyl groups, preferably with from 1 to 20 carbon atoms and more preferably with from 1 to 5 carbon atoms, including straight chain, branched, and cyclic substituted alkyl groups, or alkoxy groups, preferably with from 1 to about 10 carbon atoms and more preferably with from 1 to about 5 carbon atoms, wherein the substituents on the substituted alkyl groups can be (but are not limited to) hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, halogen atoms, nitro groups, sulfone groups, acyl groups, acid anhydride groups, azide groups, and the like, wherein x is an integer of 0 or 1, and wherein m is an integer of from 1 to about 100, and preferably from 1 to about 10. When x is 0, $R_1$ and $R_2$ are both H, and m is 0, the material is 2-butyne-1,4-diol (Aldrich B10,320-9), $HOCH_2C{\equiv}CCH_2OH$. When x is 0, $R_1$ is H, $R_2$ is $CH_3$, and m is 0, the material is 3-hexyne-2,5-diol (Aldrich 25,039-2), $HOCH(CH_3)C{\equiv}CCH(CH_3)OH$. When x is 0, $R_1$ and $R_2$ are both $CH_3$, and m is 0, the material is 2,5-dimethyl-3-hexyne-2,5-diol (Aldrich 22,262-3), $HOC(CH_3)_2C{\equiv}CC(CH_3)_2OH$. When x is 0, $R_1$ is $CH_3$, $R_2$ is $C_2H_5$, and m is 0, the material is 2,5-dimethyl-4-octyne-3,6-diol (Aldrich 27,840-8), $C_2H_5(CH_3)C(OH)C{\equiv}CC(OH)(CH_3)C_2H_5$. When x is 0, $R_1$ and $R_2$ are both H, and m is 1, the material is 1,4-bis(2-hydroxyethoxy)-2-butyne (Aldrich B4,470-8), $HO(CH_2)_2OCH_2C{\equiv}CCH_2O(CH_2)_2OH$.

Other suitable acetylenic alcohols include (c) symmetric acetylenic bisamido alcohols of the general formulae

 V.

 VI.

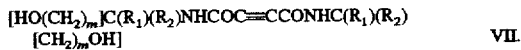 VII.

wherein $R_1$ and $R_2$ each, independently of the other, are hydrogen atoms, alkyl groups, preferably with from 1 to 20 carbon atoms and more preferably with from 1 to 5 carbon atoms, including straight chain, branched, and cyclic alkyl groups, substituted alkyl groups, preferably with from 1 to 20 carbon atoms and more preferably with from 1 to 5 carbon atoms, including straight chain, branched, and cyclic substituted alkyl groups, or alkoxy groups, preferably with from 1 to about 10 carbon atoms and more preferably with from 1 to about 5 carbon atoms, and m is an integer of from 0 to 10, wherein the substituents on the substituted alkyl groups can be (but are not limited to) hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, halogen atoms, nitro groups, sulfone groups, acyl groups, acid anhydride groups, azide groups, and the like, wherein m is an integer of from 1 to about 10, and preferably from 1 to about 5.

In formula V, when m is

In formula V, when m is 1, the material is N,N'-bis[(trishydroxymethyl)methyl]-2-butyne-1,4-diamide, $(HOCH_2)_3CNHCOC{\equiv}COCHNC(CH_2OH)_3$, which can be synthesized as follows:

Dimethylacetylene dicarboxylate (13.7 g, 96 mmol), trishydroxyaminomethane (23.35 g, 193 mmol), and potassium carbonate (41.5 g, 300 mmol) were added to 300 ml of dimethyl sulfoxide and stirred overnight. An intense colour developed immediately on mixing. After filtering off the base, the reaction mixture was concentrated by vacuum distillation to give a viscous oil. The oil was dissolved in the minimum amount of deionized water, frozen, and freeze dried over the course of two days to yield the product.

In formula VI, when $R_1$ is H and m is 1, the material is bis[bis(hydroxymethyl)methyl]-2-butyne-1,4-diamide, which can be synthesized by the same method as used to prepare N,N'-bis[(trishydroxymethyl)methyl]-2-butyne-1,4-diamide, with the exception that serinol (2-amino-1,3-propanediol) is employed as the polyhydroxy reaction component.

In formula VII, when $R_1$ is $CH_3$, $R_2$ is H, and m is 1, the material is bis(1-methyl-3-hydroxypropyl)-2-butyne-1,4-diamide, which can be synthesized by the same method as used to prepare N,N'-bis[(trishydroxymethyl)methyl]-2-butyne-1,4-diamide, with the exception that DL-alaninol (2-hydroxymethyl)-ethylamine) is employed as the hydroxyl containing reaction component.

Also suitable as additives to the ink composition are (2) amido alcohols, including (a) symmetric bisamido alcohols of the general formulae

[HO(CH₂)]₃CNHCO(R)ₓCONHC[(CH₂)OH]₃    VIII.

[HO(CH₂)]₂C(R₁)NHCO(R)ₓCONHC(R₁)[(CH₂)OH]₂    IX.

[HOCH₂]C(R₁)(R₂)NHCO(R)ₓCONHC(R₁)(R₂)[CH₂OH]    X.

wherein R is a straight chain alkyl group, preferably with from 1 to about 10 carbon atoms, and more preferably with from 1 to about 5 carbon atoms, or a substituted straight chain alkyl group, preferably with from 1 to about 10 carbon atoms, and more preferably with from 1 to about 5 carbon atoms, wherein R₁ and R₂ each, independently of the other, are hydrogen atoms, alkyl groups, preferably with from 1 to 20 carbon atoms and more preferably with from 1 to 5 carbon atoms, including straight chain, branched, and cyclic alkyl groups, substituted alkyl groups, preferably with from 1 to 20 carbon atoms and more preferably with from 1 to 5 carbon atoms, including straight chain, branched, and cyclic substituted alkyl groups, or alkoxy groups, preferably with from 1 to about 10 carbon atoms and more preferably with from 1 to about 5 carbon atoms, and wherein x is an integer of 0 or 1, wherein the substituents on the substituted alkyl groups can be (but are not limited to) hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, halogen atoms, nitro groups, sulfone groups, acyl groups, acid anhydride groups, azide groups, and the like.

In formula VII, when x is 0, the material is N,N'-bis[(trishydroxymethyl)methyl]oxamide, which can be synthesized as follows:

Diethyl oxalate (14.6 g, 100 mmol), trishydroxyaminomethane (24.22 g,200 mmol), and potassium carbonate (43.2 g, 312 mmol) were added to 300 ml of dimethyl sulfoxide and stirred overnight. After filtering, the solvent was removed by vacuum distillation to give a viscous oil which was taken up in the minimum amount of deionized water. The product was precipitated with a large excess of cold acetone and isolated by vacuum filtration to give the product as a white solid.

In formula VIII, when x is 1 and R is —CH₂—CH₂—, the material is N,N'-bis(trishydroxymethyl)methyl] succinamide, which can be synthesized as follows:

Dimethyl succinate (14.61 g, 100 mmol), trishydroxyaminomethane (24.22 g, 200 mmol), and potassium carbonate (43.19 g, 312 mmol) were added to 300 ml of dimethyl sulfoxide and stirred overnight. The reaction became very thick. After filtration, the solvent was removed by vacuum filtration to give a viscous oil. The oil was taken up in the minimum amount of deionized water and the product precipitated by the addition of a large volume of cold acetone. The product was secured by vacuum filtration as a white powder.

In formula IX, when x is 1 and R is —CH₂—CH₂— and R₁ is H, the material is N,N'-bis[(bishydroxymethyl)methyl] succinamide, which can be synthesized by the same method as used to prepare N,N'-bis(trishydroxymethyl)methyl] succinamide, with the exception that serinol is employed as the hydroxyl component.

In formula X, when x is 1 and R is —CH₂—CH₂—, R₁ is H, and R₂ is H, the material is N,N'-bis(1-methyl-3-hydroxypropyl)oxamide, which can be synthesized by the same method as used to prepare N,N'-bis(trishydroxymethyl)methyl]succinamide, with the exception that alaninol is employed as the hydroxyl component.

In formula X, when x is 1, R is CH₂CH₂, R₁ is CH₃, and R₂ is H, the material is N,N'-bis(1-methyl-2-hydroxyethyl) succinamide, which can be synthesized by the same method as used to prepare N,N'-bis(trishydroxymethyl)methyl] succinamide, with the exception that alaninol is employed as the hydroxyl component.

Other suitable amido alcohols include (b) mono amido alcohols, of the general formula

RCONR₁(CH₂)ₙOH    XI.

wherein R is a hydrogen atom, an alkyl group, including straight chain, branched, and cyclic alkyl groups, preferably with from 1 to about 10 carbon atoms, and more preferably with from 1 to about 5 carbon atoms, a substituted alkyl group, including straight chain, branched, and cyclic substituted alkyl groups, preferably with from 1 to about 10 carbon atoms, and more preferably with from 1 to about 5 carbon atoms, an aryl group, preferably with about 6 carbon atoms, a substituted aryl group, preferably with about 6 carbon atoms, an arylalkyl group, preferably with from 7 to about 17 carbon atoms, a substituted arylalkyl group, preferably with from 7 to about 17 carbon atoms, a pyridine group, a substituted pyridine group, a piperidine group, a substituted piperidine group, a piperazine group, a substituted piperazine group, a quinoline group, a substituted quinoline group, a pyrrolidine group, a substituted pyrrolidine group, an imidazoline group, or a substituted imidazoline group, wherein the substituents on the substituted groups can be (but are not limited to) hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, halogen atoms, nitro groups, sulfone groups, acyl groups, acid anhydride groups, azide groups, and the like, wherein R₁ is H, CH₂, or CH₂OCH₂, and wherein n is an integer of from 0 to about 5.

In formula XI, when R is C₆H₅CH(OH), R₁ is H, and n is 0, the material is mandelo hydroxamic acid (Aldrich 37,373-7), C₆H₅CH(OH)CONH(OH). When R is pyridine, R₁ is H, and n is 2, the material is N-(2-hydroxyethyl) isonicotinamide (Aldrich 34,486-9).

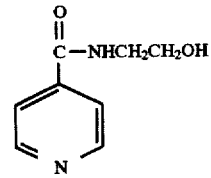

When R is pyridine, R₁ is H, and n is 1, the material is N-(hydroxymethyl)nicotine amide (Aldrich 27,927-7).

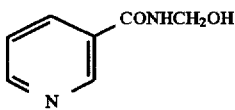

When R is pyridine, R₁ is CH₂CH₂OH, and n is 2, the material is N,N-bis(2-hydroxyethyl)isonicotinamide (Aldrich 34,481-8).

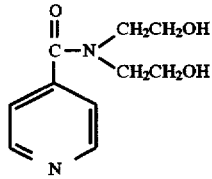

When R is C₆H₄OH, R₁ is H, and n is 2, the material is N-(2-hydroxyethyl)salicylamide (Aldrich 28,061-5), 2-(OH)C₆H₃CONHCH₂CH₂OH. When R is C₆H₃(OH)₂, R₁ is H, and n is 2, the material is 2,5-dihydroxy-N-(2-hydroxy ethyl)benzamide (Aldrich 36, 599-8), (OH)₂C₆H₃CONHCH₂CH₂OH. When R is HOCH₂—C(CH₃)₂—CH(OH), R₁ is H, and n is 3, the material is pantothenol (Aldrich 29,578-7).

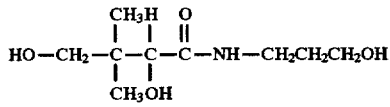

Also suitable are (3) selected trialkylhydroxy compounds. Examples of suitable trialkylhydroxy compounds include (a) N-[tris(hydroxymethyl)methyl]glycine (Aldrich 16,378-3), HOOC CH₂NHC(CH₂OH)₃; (b) N-[tri(hydroxymethyl)methyl]acrylamide (Aldrich 36,495-9), H₂C=CHCONHC(CH₂OH)₃; (c) 2-(bromomethyl)-2-(hydroxymethyl)-1,3-propane diol (Aldrich 38,017-2), BrCH₂C(CH₂OH)₃; (d) 2-(nitro)-2-(hydroxymethyl)-1,3-propanediol (Aldrich 10,818-9), NO₂C(CH₂OH)₃; (e) 1,3,5-tris(2-hydroxyethyl) cyanuric acid (Aldrich 30 9001).

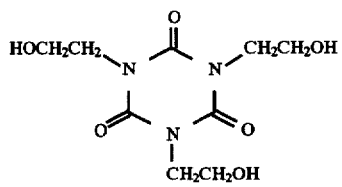

(f) nitromethane-trispropanol (Aldrich 36,153-4), NO₂C(CH₂CH₂CH₂OH)₃; (g) amino tris propanol (also called bis-homotris) (Aldrich 36,154-2), H₂N—C(CH₂CH₂CH₂OH)₃; and the like, as well as mixtures thereof.

Also suitable as ink additives are selected derivatives of 1,2-diols and 1,3-diols. Examples include (a) 1-phenyl-1,2-ethanediol (Aldrich 30,215-5; P2 405-5), HOH₂HC—CHOHC₆H₅; (b) 1-(2-nitrophenyl)-1,2-ethanediol (Aldrich 27,452-6), O₂NC₆H₄(CHOH)CH₂OH; (c) 3-methoxy-1,2-propanediol (Aldrich 26,040-1), CH₃OCH₂(CHOH)CH₂OH; (d) 3-ethoxy-1,2-propanediol (Aldrich 26,042-8), C₂H₅OCH₂CH(OH)CH₂OH; (e) 3-allyloxy-1,2-propanediol (Aldrich 25,173-9), H₂C=CHCH₂OCH₂CH(OH)CH₂OH; (f) 3-phenoxy-1,2-propanediol (Aldrich 25,781-8), C₆H₅OCH₂CH(OH)CH₂OH; (g) 3-(4-methoxy phenoxy)-1, 2-propane diol (Aldrich 21,024-2), CH₃OC₆H₄OCH₂CH(OH)CH₂OH; (h) mephensin [3-(2-methyl phenoxy)-1,2-propanediol] (Aldrich 28,656-7), CH₃C₆H₄OCH₂CH(OH)CH₂OH; (i) 5-hexene-1,2-diol (Aldrich 26,036-3), H₂C=CHCH₂CH₂CH(OH)CH₂OH; (j) 7-octene-1,2-diol (Aldrich 26,039-8), H₂C=CH(CH₂)₄CH(OH)CH₂OH; (k) 2-phenyl-1,2-propanediol (Aldrich 21,376-4), CH₃C(C₆H₅)(OH)CH₂OH; (l) 3-(diethylamino)-1,2-propanediol (Aldrich 21,849-9), (C₂H₅)NCH₂CH(OH)CH₂OH; (m) 3-(diisopropyl amino)-1,2-propanediol (Aldrich 25,766-4), [(CH₃)₂CH]₂NCH₂CH(OH)CH₂OH; (n) 3-(N-benzyl-N-methylamino)-1,2-propanediol (Aldrich 21,850-2), C₆H₅CH₂N(CH₃)CH₂CH(OH)CH₂OH; (o) 3-pyrrolidino-1, 2-propanediol (Aldrich 21,851-0),

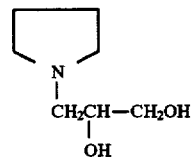

(p) 3-piperidino-1,2-propanediol (Aldich 21, 849-9),

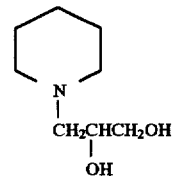

(q) 3-morpholino-1,2-propanediol (Aldrich 21, 848-0),

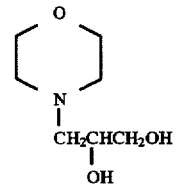

(r) 2,2-dimethyl-1-phenyl-1,3-propane diol (Aldrich 40,873-5), HOCH₂C(CH₃)₂CH(C₆H₅)OH; (s) 2-benzyloxy-1,3-propanediol (Aldrich 36,744-3), C₆H₅CH₂OCH(CH₂OH); (t) 2-bromo-2-nitro-1,3-propanediol (Aldrich 13,470-8), HOCH₂C(Br)(NO₂)CH₂OH; and the like, as well as mixtures thereof.

Also suitable as ink additives are selected thio diols. Examples include (a) 2-hydroxyethyl disulfide (Aldrich 38,047-4), S₂(CH₂CH₂OH)₂; (b) 3,6-dithia-1,8-octane diol (Aldrich 23533-4), [S(CH₂)]₂(CH₂CH₂OH)₂; (c) 2,2'-sulfonyl diethanol (Aldrich 18,008-4), SO₂(CH₂CH₂OH)₂; (d) 3,3'-thiodipropanol (Aldrich 20,534-6), S(CH₂CH₂CH₂OH)₂; (e) bis(2-hydroxypropyl sulfide (KNKUS), (K & K Rare and Fine Chemicals), CH₃CH(OH)CH₂-S-CH₂CH(OH)CH₃; (f) bis(2-hydroxypropyl)disulfide (BYI), (Biosynth International), CH₃CH(OH)CH₂-S-S-CH₂CH(OH)CH₃; and the like, as well as mixtures thereof.

Also suitable as ink additives are selected aromatic diols and heterocyclic diols. Examples of suitable aromatic and heterocyclic diols include (a) 2,5-furandimethanol (Aldrich 19,461-1),

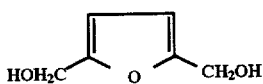

(b) 3-cyclohexene-1-1-dimethanol (Aldrich 16,215-9), $C_6H_8(CH_2OH)_2$; (c) 2'-(phenylenedioxy)diethanol (Aldrich 37,468-7), $C_6H_4O_2(CH_2CH_2OH)_2$; (d) 4-8-bis(hydroxymethyl)tricyclo[$5.2.1.0^{2.6}$]decane (Aldrich B4,590-9),

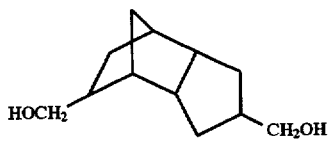

(e) 5-nitro-m-xylene-α,α'-diol (Aldrich 18,479-9), $ON_2C_6H_3(CH_2OH)_2$; (f) 2,3,5,6-tetramethyl-p-xylene-α,α'-diol (Aldrich 16,220-5), $(CH_3)_4C_6(CH_2OH)_2$; (g) 2-hydroxybenzyl alcohol (Aldrich 16,695-2), $HOC_6H_4CH_2OH$; (h) 3,5-dihydroxybenzylalcohol (Aldrich 39,620-8), $(HO)_2C_6H_3CH_2OH$; (i) 4-hydroxy-3-methoxybenzylalcohol (vanillyl alcohol) (Aldrich 17,553-6), $HOC_6H_3(OCH_3)CH_2OH$; (j) 3-hydroxy-4-methoxybenzylalcohol (isovanillyl alcohol) (Aldrich 18,843-3), $HOC_6H_3(OCH_3)CH_2OH$; (k) homovanillyl alcohol (Aldrich 14,883-0), $HOC_6H_3(OCH_3)CH_2CH_2OH$; (l) hydroxyphenethyl alcohol (Aldrich 18,824-7; 19,902-8; 18,825-5), $HOC_6H_4CH_2CH_2OH$; and the like, as well as mixtures thereof.

Also suitable as ink additives are selected imino alcohols. Examples of suitable imino alcohols include (a) 2,2'methyliminodiethanol (Aldrich m4,220-3), $CH_3N(CH_2CH_2OH)_2$; (b) N,N-bis(2-hydroxyethyl)-2-amino ethane sulfonic acid (Aldrich 16,372-4), $HSO_3CH_2CH(OH)CH_2N(CH_2CH_2OH)_2$; (c) bicine [(N,N-bis-2-hydroxyethyl) glycine] (Aldrich 16,379-1), $HOOCCH_2N(CH_2CH_2OH)_2$; (d) 1-[N,N-bis(2-hydroxyethyl)isopropanolamine (Aldrich 23,375-7), $CH_3CH(OH)N(CH_2CH_2OH)_2$; (e) 3-[bis(2-hydroxyethyl)amino]-2-hydroxy-1-propane sulfonic acid (Aldrich 34,004-9), $HSO_3CH_2CH(OH)CH_2N(CH_2CH_2OH)_2$; (f) 2,2'(phenylamino)diethanol (Aldrich P2,240-0), $C_6H_5N(CH_2CH_2OH)_2$; (g) 2,2'-(tolylimino)diethanol (Aldrich 16,412-7), $CH_3C_6H_4N(CH_2CH_2OH)_2$; (h) bis(2-hydroxypropyl)amine (di-isopropanol amine) (Aldrich 13,301-9),

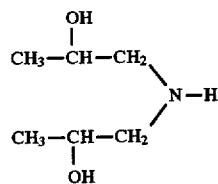

(i) bis(3-hydroxypropyl)amine (KNKUS, KRL) (Karl Industries, K & K Rare and Fine Chemicals),

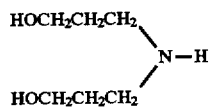

(j) materials of the generic formula

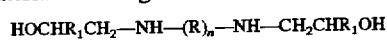

wherein n is an integer of from 2 to 10, R is an alkyl group, preferably with from 1 to about 10 carbon atoms, and $R_1$ is H, an alkyl group, preferably with from 1 to about 10 carbon atoms, a substituted alkyl group, preferably with from 1 to about 10 carbon atoms, an aryl group, preferably with from 6 to about 12 carbon atoms, a substituted aryl group, preferably with from 6 to about 12 carbon atoms, an arylalkyl group, preferably with from 7 to about 13 carbon atoms, or a substituted arylalkyl group, preferably with from 7 to about 13 carbon atoms. When n is 1, R is $CH_2CH_2$, and $R_1$ is H, the material is N,N'-bis(2-hydroxyethyl) ethylenediamine (Aldrich 26,887-9). $HOCH_2CH_2NHCH_2CH_2NHCH_2CH_2OH$; (k) N,N-bis(2-hydroxypropyl)ethanolamine (Karl Industries),

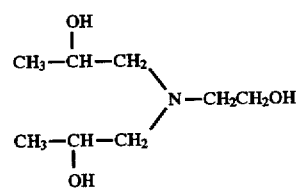

(l) triethanol amine ethoxylate $N(CH_2CH_2(OCH_2CH_2)_nOH)_3$, wherein n is an integer of from 1 to about 10; when n is 1, the material is $N(CH_2CH_2OCH_2CH_2OH)_3$ (Aldrich 41,658-4); (m) 1-4-bis(2-hydroxyethyl)piperazine (Aldrich B4,540-2)

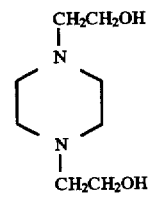

(n) 1-[2-(2-hydroxyethoxy)ethyl]-piperazine (Aldrich 33,126-0)

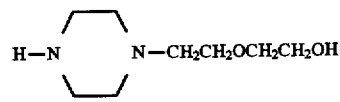

(o) bis[(2-hydroxyethoxy)ethyl]-piperazine

(p) 1,4-bis(2-hydroxypropyl)piperazine (KKL, ATo) (Ken Selka Corporation) (Atomergic Chemetals Corporation)

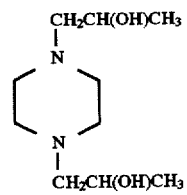

(q) 1,4-bis(2-hydroxypropyl)2-methyl piperazine (ATOAtomergic Chemetals Corporation)

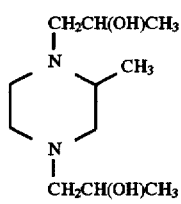

(r) bis(2-hydroxypropyl)-2.5-dimethyl-piperazine (BYI) (Biosynth International)

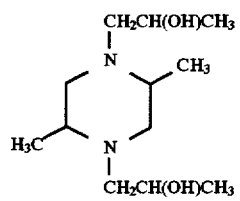

(s) 1-(2-N,N-bis(2-hydroxypropyl)amino) ethyl 4-(2-hydroxpropyl piperazine (Bisoynth International, Davos Chemical Corporation)

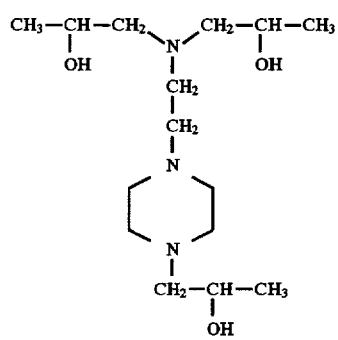

(t) N,N-bis(3-hydroxypropyl)homopiperazine (Dav) (Davos Chemical Corporation) (JNSBE) (Jensen Chimica Spectrum Chemicals)

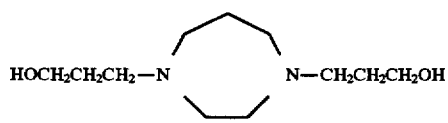

(u) 4.4'-trimethylene bis(1-piperidine ethanol) (Aldrich 12, 122-3)

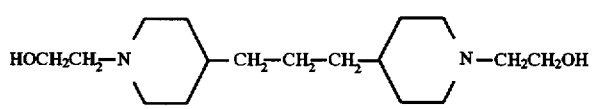

and the like mixtures thereof.

Also suitable as additives are selected salts of hydroxyl compounds. Examples include (a) pantothenic acid calcium salt hydrate (Aldrich 25, 972-1) (Aldrich 29, 185-4), [HOCH$_2$C(CH$_3$)$_2$CH(OH)CONHCH$_2$CH$_2$COO]$_2$CaX.H$_2$O; (b) pantothenic acid sodium salt (Aldrich 28,316-9), HOCH$_2$C(CH$_3$)$_2$CH(OH)CONHCH$_2$CH$_2$COONa; (c) 4-(2, 3-dihydroxypropyl)-2-isononylsuccinate potassium salt (Aldrich 38.590-5); (d) 4-(2,3-dihydroxypropyl)-2-(2-methylene-4,4-dimethylpentyl)succinate potassium salt (Aldrich 38.588-3), HOH$_2$CCH(OH)CHOOCCH$_2$CH(C$_9$H$_{17}$)COOK; (e) D-xylonic acid calcium salt; (f) L-threonic acid calcium salt; and the like, as well as mixtures thereof.

Also suitable as additives are selected saccharides and modified saccharides. Examples include (a) L-ascorbic acid (Aldrich A9,290-2), of the formula:

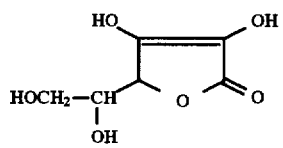

(b) D-isoascorbic acid (Aldrich 85,606-1), of the formula:

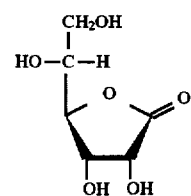

c) 5,6-isopropylidene-L-ascorbic acid (Aldrich 30,136-1), of the formula:

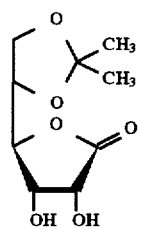

(d) L-gluconic γ-lactone (Aldrich 31,030-1), of the formula:

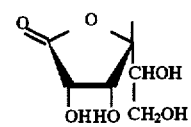

(e) D-gluconic γ-lactone (Aldrich 21,935-5), of the formula:

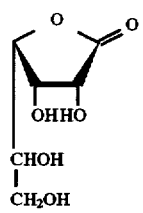

(f) α-D-glucoheptonic γ-lactone (Aldrich 12,564-4), of the formula:

(g) α,β-gluco octanoic-γ-lactone (Aldrich 20,664-4), of the formula:

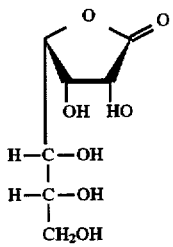

(h) δ-gluconolactone (Aldrich G200-1), of the formula:

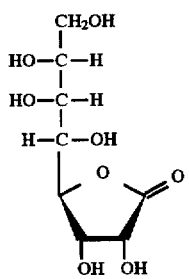

(i) L-glucono-1,5-lactone (Aldrich 33,232-10), of the formula:

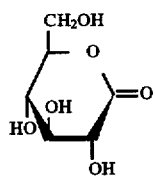

wherein R = CH₂OH (j) 1,2-O-isopropylidene-D-glucofuranose (Aldrich I-2,290-0), of the formula:

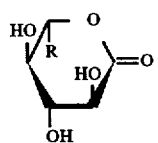

(k) 1,2-O-isopropylidene-D-xylofuranose (Aldrich 29,636-8), of the formula:

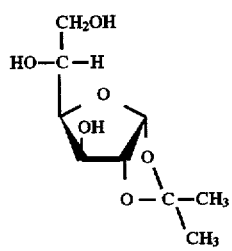

(l) 1,2-O-isopropylidene-β-L-idofuranose (Aldrich 30,225-2), of the formula:

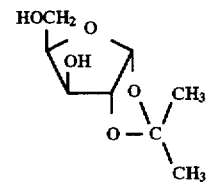

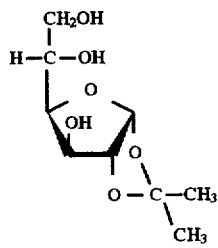

(m) 2,5-O-methylene-D-mannitol (Aldrich 20,665-2), of the formula:

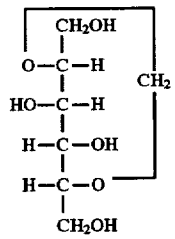

(n) 3,4-O-isopropylidene-D-mannitol (Aldrich 33,817-6), of the formula:

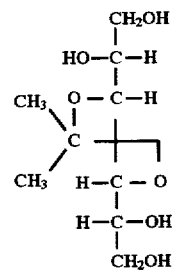

(o) 1,2,5,6-di-O-isopropylidene-D-mannitol (Aldrich 29,640-6), of the formula:

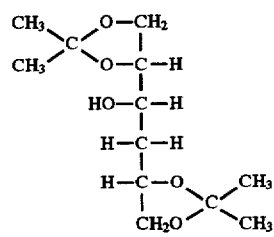

(p) 4,6-O-ethylidene-α-D-glucose (Aldrich E3,275-4), of the formula:

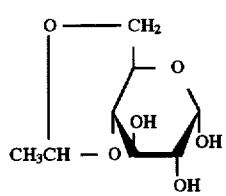

(q) aromatic alcohols, such as hydrindantin dihydrate (Aldrich 13,563-1), of the formula:

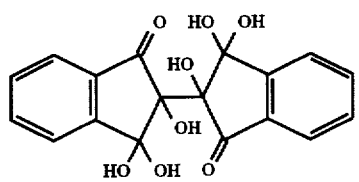

(r) ellagic acid dihydrate (Aldrich E40-1), of the formula:

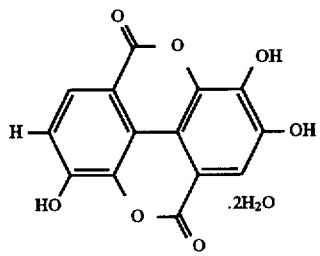

(s) (+)-rutin trihydrate (Aldrich R230-3), of the formula:

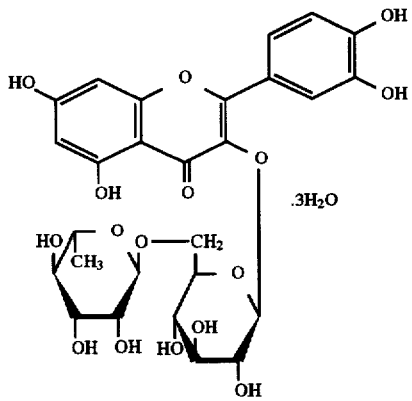

(t) D-amygdalin (Aldrich A8,320-2), of the formula:

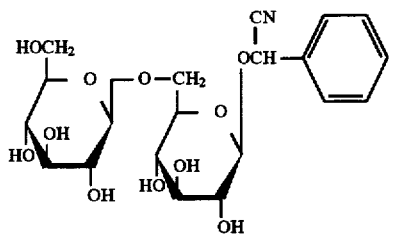

(u) melezitose dihydrate (Aldrich 85,037-3), of the formula:

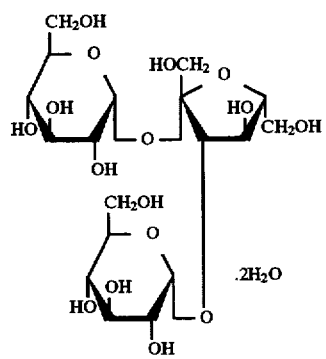

(v) D-raffinose pentahydrate (Aldrich 20,667-9), of the formula:

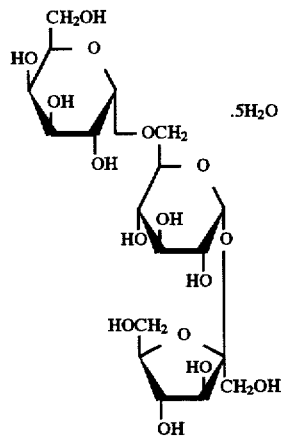

(w) stachyose tetrahydrate ($\alpha$-D-galactosyl-$\alpha$-D-galactosyl-$\alpha$-D-glucosyl-$\beta$-D-fructose) (Aldrich 85,178-7), of the formula:

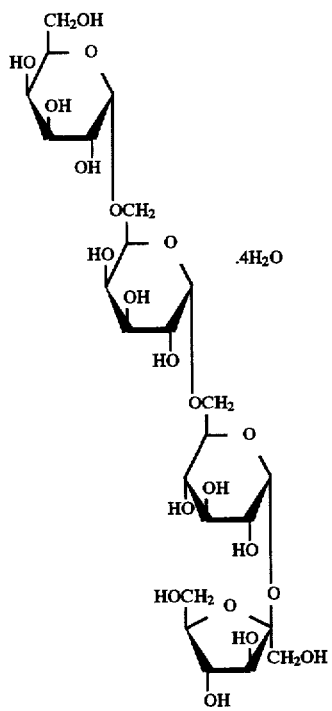

(x) inulin (Kodak 545, available from Eastman Kodak Co.), of the formula:

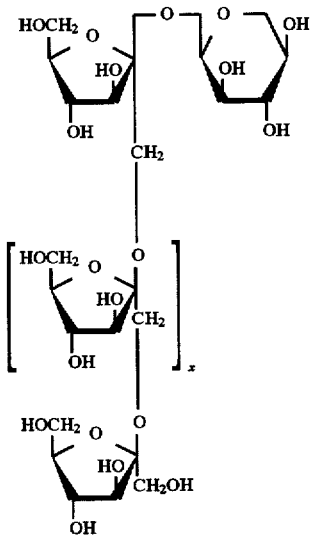

and the like, as well as mixtures thereof.

Inks suitable for the present invention can be prepared by any process suitable for preparing aqueous-based inks. For example, the ink ingredients can be mixed in the desired amounts and stirred until a uniform ink composition results (typically about 30 minutes, although the mixing/stirring time can be either greater or less than this period). While not required, the ink ingredients can be heated during mixing if desired. Subsequent to mixing and stirring, the ink composition generally is filtered to remove any solid or particulate matter. The additive component of the ink can be added with the other ink ingredients during preparation of the ink; alternatively, the additive can be added to an ink composition subsequent to mixing and stirring of the other ingredients. Any other suitable processes for preparing the inks can also be employed. One specific process embodiment entails mixing all of the ink ingredients together and filtering the mixture to obtain an ink. Optionally, the mixture obtained after mixing all the ingredients can be heated to a temperature of from about 40° C. to about 55° C. for a period of from about 2 to about 3 hours, subsequently cooling the mixture to room temperature (typically from about 10 to about 35° C.), and filtering the mixture to obtain an ink. More specifically, the inks of the present invention can be prepared by (1) adding a solution in water of the dye to a magnetically stirred solution in water of a microwaveable compound, a biocide and the additive, resulting in a solution containing a dye in an amount of from about 1.0 to about 10.0 percent by weight, and preferably from about 1.0 to about 5.0 percent by weight, an additive in an amount of from about 0 to about 95 percent by weight, and preferably from about 3 to about 50 percent by weight, a biocide in an amount of from about 0.0001 to about 4 percent by weight, and preferably from about 0.01 to about 2 percent by weight, and water in an amount of from about 29.5 to about 90.0 percent by weight, and preferably from about 49.5 to about 90.0 percent by weight, this solution being kept at a temperature ranging from 10° to 30° C., and preferably from 20° to 25° C.; (2) stirring the resulting mixture at a temperature ranging from about 20° to about 25° C. for a period of from about 2 to about 24 hours, and preferably from about 10 to about 15 hours; optionally the mixture can be heated to a temperature ranging from about 30° to about 60° C. for a period time ranging from about 30 minutes to about 2 hours; (3) filtering the resulting mixture through a 0.45 micron filter; and (4) adjusting the ink pH, measured with an Omega pH-meter, to a value ranging from about 6.5 to about 10.5 by dropwise addition of an aqueous solution of an acid, such as for example ethylenediaminetetraacetic acid (EDTA).

The ink is applied to a suitable substrate in imagewise fashion. Application of the ink to the substrate can be by any suitable process compatible with aqueous-based inks, such as flexographic printing, pen plotters, continuous stream ink jet printing, drop-on-demand ink jet printing (including both piezoelectric and thermal ink jet processes), or the like. The substrate employed can be any substrate compatible with aqueous-based inks, including plain paper, such as Xerox® series 10 paper, Xerox® 4024 paper, or the like, coated papers, such as those available from Jujo, transparency materials suitable for aqueous inks or ink jet printing processes, or the like.

Figure 1B:
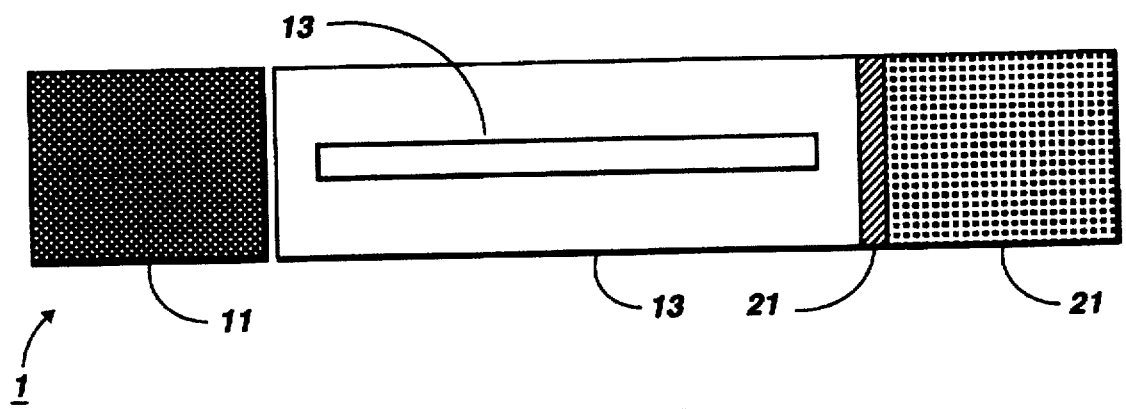
Figure 1C:
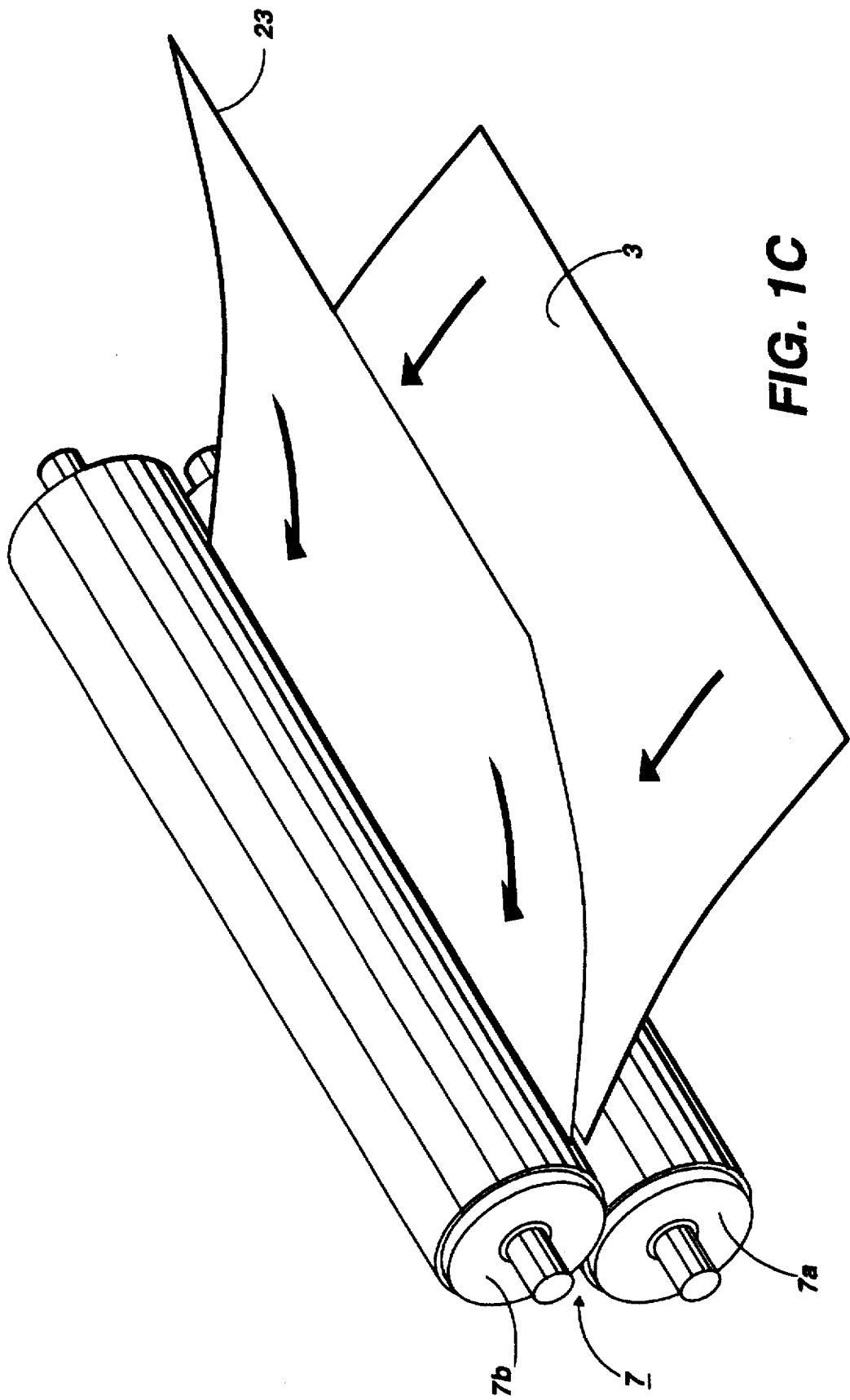
Figure 2:
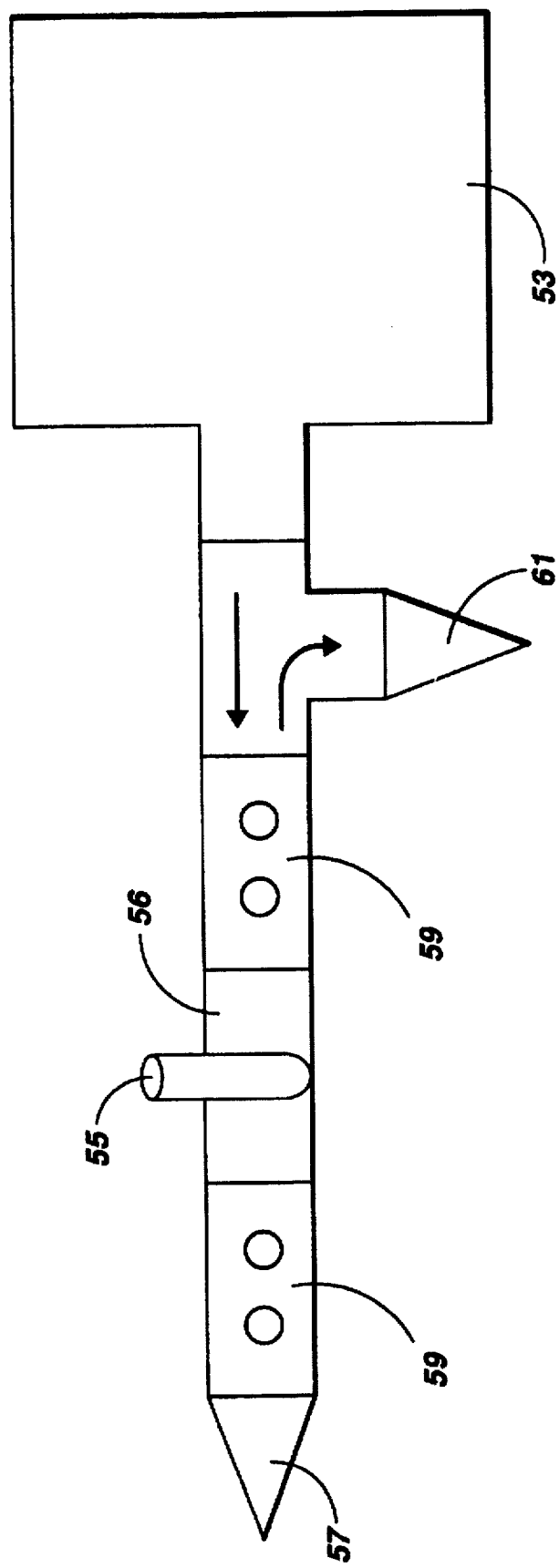

Any suitable microwave apparatus can be employed for the ink drying step of the present invention. One example of a printing system including a suitable microwave apparatus for drying ink on substrates and an optional method of testing the degree of drying is illustrated schematically in FIGS. 1A, 1B, and 1C. FIG. 1A represents a schematic side view of the apparatus wherein the paper path is from left to right. FIG. 1B represents a schematic side view of the apparatus viewed down the paper path. FIG. 1C represents a schematic view of the testing apparatus for determining the degree of drying. As illustrated schematically in FIGS. 1A, 1B, and 1C, microwave drying apparatus 1 is situated so that printing substrate 3, which can be paper, transparency material, or the like, is first printed with print head 5, passes through drying apparatus 1, and then exits drying apparatus 1 and passes through optional offset nip 7 which comprises two rollers, which preferably are a soft driver roll 7a (of a material such as rubber, for example) and a rigid idler roll 7b (coated with a material such as Teflon®, for example). Apparatus 1 comprises magnetron 11 connected to rectangular wave guide 13 equipped with slot 15. One example of a suitable magnetron is the Gerling GL 116, available from John Gerling Co., Modesto, Calif. One example of a suitable waveguide is the WR 284, available from Microwave Development Lab, Natick, Mass. Slot 15 permits the printing substrate 3 to be passed through apparatus 1. At the terminal point of the wave guide 13 is a water cooled terminating dummy load 19 which absorbs any unused energy. Situated between wave guide 13 and terminating load 19 is a resonating iris 21 which generates high intensity traveling waves, which result in localized "hot spots" where the electric field is at a maximum. The print head 5 is aligned to coincide with a "hot spot." After print head 5 prints an image on printing substrate 3, printing substrate 3 passes through slot 15 in wave guide 13, whereupon a fixed amount of microwave power, generally from about 100 to about 1,000 watts, although the amount can be outside of this range, is supplied to the wave guide 13. Printing substrate 3 is passed through apparatus 1 at any suitable speed, typically from about 1.5 to about 40 inches per second. Optionally, after exiting apparatus 1 and wave guide 13, printing substrate 3 can be placed into contact with a blank sheet of paper 23 and the "sandwich" thus created can be passed through offset nip 7 to evaluate the effectiveness of the drying step. The nip pressure is set at the minimum to achieve the greatest level of offset. For example, with 14.25 inch rollers, an appropriate pressure would be about 0.25 pounds as measured at each end of the rollers, or about 14 pounds exerted on the entire roller. After exiting the nip, the sheets are separated and the offset density that is transferred to the blank sheet is measured. For comparison purposes, the process is repeated by passing the printed sheet through slot 15 with the microwave power off, and the degree of offset obtained with and without microwave drying are compared.

Any other suitable microwave drying apparatus can also be employed.

Specific embodiments of the invention will now be described in detail. These examples are intended to be illustrative, and the invention is not limited to the materials, conditions, or process parameters set forth in these embodiments. All parts and percentages are by weight unless otherwise indicated.

The surface tension values recited in the tables were measured at 25° C. using a Kruss Digital Tensiometer K10T available from Kruss Gambh Hamburg. The viscosity values recited in the tables were measured at 25° C. using a Brookfield Digital viscometer.

Latency values recited in the tables are measured as follows. Latency is described as the longest waiting time (seconds) that a printhead can sit idle without firing a drop and, upon firing, produces a drop having a specified transit time. Ink latency values were measured in a 384 jet experimental test fixture (600 spi) operated in an environment of 15% relative humidity and 35° C. The testing was done at 1 kHz heater pulse frequency. Pass criterion is first drop transit time ≦80 microseconds over a 0.50 millimeter distance for an idle time equal or greater than the indicated number of seconds.

Maximum Frequency (Fmax) values recited in the tables are measured as follows. The transit times and their standard deviations were measured at 20 frequencies, ranging from 100 to 12 kHz. Two hundred fifty drops (250) were observed at each frequency. The Fmax was measured in a 384 jet experimental test fixture (600 spi) operated in a controlled environment of 15% relative humidity and 35° C. The transit times were measured and plotted at each of the 20 frequencies. A horizontal line was then drawn to give a best fit to the resulting data points. The Fmax value is the highest frequency at which the standard deviation bar intersects the drawn line. Only those points having a standard deviation of less than 1.00 microsecond were considered.

The temperature rise due to microwave coupling of the compounds recited in the Table was measured as follows. Into a polystyrene test tube was placed 1.75 grams of the material being measured. In the case of solids, a 20 percent by weight solution in water was used for the measurement. Ambient temperature was measured by placing a thermocouple in a beaker of water which had equilibrated to room temperature for at least one hour. The sample was placed in the test tube coupling apparatus, and microwave energy of 2.44 GHz was applied for 3.25 seconds. The tube was quickly removed from the apparatus, inverted once to ensure mixing, and the net temperature increase measured by placing a thermocouple probe into the solution.

The curl data recited herein were obtained with ink compositions comprising additive materials (20% by weight) and 80% by weight of one of the following stock compositions:

Cyan 1 15.785 percent by weight sulfolane, 10.0 percent by weight butyl carbitol, 2.0 percent by weight ammonium bromide, 2.0 percent by weight N-cyclohexylpyrrolidinone (obtained from Aldrich Chemical Company), 0.5 percent by weight tris(hydroxymethyl)aminomethane (obtained from Aldrich Chemical Company), 0.35 percent by weight EDTA (ethylenediamine tetra acetic acid) (obtained from Aldrich Chemical Company), 0.05 percent by weight Dowicil 150 biocide (obtained from Dow Chemical Co., Midland, Mich.), 0.03 percent by weight polyethylene oxide (molecular weight 18,500, obtained from Union Carbide Co.), 35 percent by weight Projet Cyan 1 dye (obtained from ICI), and 34.285 percent by weight deionized water.

Magenta 15.785 percent by weight sulfolane, 10.0 percent by weight butyl carbitol, 2.0 percent by weight ammonium bromide, 2.0 percent by weight N-cyclohexylpyrrolidinone (obtained from Aldrich Chemical Company), 0.5 percent by weight tris(hydroxymethyl)aminomethane (obtained from Aldrich Chemical Company), 0.35 percent by weight EDTA (ethylenediamine tetra acetic acid) (obtained from Aldrich Chemical Company), 0.05 percent by weight Dowicil 150 biocide (obtained from Dow Chemical Co., Midland, Mich.), 0.03 percent by weight polyethylene oxide (molecular weight 18,500, obtained from Union Carbide Co.), 25 percent by weight Projet magenta 1T dye (obtained from ICI), 4.3 percent by weight Acid Red 52 (obtained from Tricon Colors), and 39.985 percent by weight deionized water.

Yellow 15.785 percent by weight sulfolane, 10.0 percent by weight butyl carbitol, 2.0 percent by weight ammonium bromide, 2.0 percent by weight N-cyclohexylpyrrolidinone (obtained from Aldrich Chemical Company), 0.5 percent by weight tris(hydroxymethyl)aminomethane (obtained from Aldrich Chemical Company), 0.35 percent by weight EDTA (ethylenediamine tetra acetic acid) (obtained from Aldrich Chemical Company), 0.05 percent by weight Dowicil 150 biocide (obtained from Dow Chemical Co., Midland, Mich.), 0.03 percent by weight polyethylene oxide (molecular weight 18,500, obtained from Union Carbide Co.), 27.0 percent by weight Projet yellow 1G dye (obtained from ICI), 20.0 percent by weight Acid Yellow 17 (obtained from Tricon Colors), and 22.285 percent by weight deionized water.

These inks were incorporated into a Hewlett Packard 560 C inkjet printer and printed on 100 micron thick commercial papers (length 28 cm, width 21.5 cm) such as Hammermill Tidal DP, Xerox 4200DP, Rank Xerox Premier ECF3R91781, Rank Xerox Premier TCF3R91805, Champion Courtland, Rank Xerox Business 3R91820, Rank Xerox Exclusive 3R90208, Rank Xerox Premier 3R91854, Xerox 4024, Cascade Xerographic Paper, Spectrum DP, Husky Xerocopy, Xerox Image Elite, Xerox Image Series LX, Fuji Xerox "L," and Recycled Bond Paper. The area coverage in each printing was selected at 80% (unprinted border of 1.2 cm, 1.2 cm, 1.3 cm, and 1.7 cm). Measurements of absolute curl were made at 50 percent relative humidity and 23° C. by comparing the hanging sheets to a template with measured curl values. Measurements of Flat Surface Curl (which is more practical and realistic) were also measured under identical conditions. The Flat Surface Curl was found to be always lower than that in the hanging position, primarily because of the weight of the paper in the former case. All measurements were made after a constant time of 7 days. It was assumed that a 7 day period was of sufficient duration to obtain a fair comparison for the performance of various materials.

EXAMPLE I

Cyan, magenta, and yellow ink compositions containing pantothenol (20 percent by weight pantothenol, 80 percent by weight stock compositions as indicated above) were prepared by simple mixing of the ingredients. The inks thus prepared were incorporated into a 300 spots per inch resolution Hewlett Packard 560C inkjet printer and images were generated on paper. All papers yielded hanging curl values of within ±5 mm of 50 min. These results indicate that when prints are made on paper with ink compositions containing additive materials according to the present invention, paper curl was in most cases independent of (a) the particular paper used, and (b) the colorant of the ink.

EXAMPLE II

Hanging curl data measured on Champion Courtland paper for inks containing additive materials according to the present invention are shown in Table 1 and Flat Surface Curl data are shown in Table 2. In Table 3 are shown the comparative curl data obtained with some materials disclosed and claimed in U.S. Pat. No. 5,356,464 and U.S. Pat. No. 5,207,824. The results indicate that ink compositions containing additive materials in accordance with the present invention reduce curl to the same extent as or to a greater extent than ink compositions containing anti-curl agents as disclosed and claimed in these patents.

TABLE 1

| No | Compound | Aldrich # | Curl (mm) |
|---|---|---|---|
| 1 | 4-amino-4-(3-hydroxypropyl)-1,7-heptanediol (bis-homotris) | 36,154-2 | 0 |
| 2 | N,N-Bis(2-hydroxyethyl) ethylenediamine | 26,887-9 | 10 |
| 3 | 1-[N,N-bis(2-hydroxyethyl)-amino]-2-propanol | 23,375-7 | 10 |
| 4 | nitromethanetrispropanol | 36,153-4 | 20 |
| 5 | N-methyl-D-glucamine | M4,700-0 | 45 |
| 6 | (±)-pantothenol | 29,578 | 50 |
| 7 | N,N-bis(2-hydroxyethyl) isonicotinamide | 34,581-8 | 60 |
| 8 | N-(2-hydroxyethyl) isonicotinamide | 34,486-9 | 65 |
| 9 | 1,3,5-tris(2-hydroxyethyl) cyanuric acid | 30,900-1 | 65 |
| 10 | 1,4-bis(2-hydroxyethoxy)-2-butyne | B4,470-8 | 70 |
| 11 | N-phenyldiethanolamine | P2,240-0 | 96 |
| 12 | homovanillyl alcohol | 14,883-0 | 109 |
| — | none (comparative) | — | >127 |

TABLE 2

| No | Compound | Aldrich # | Curl (mm) |
|---|---|---|---|
| 1 | (±)pantothenol | 29,578-7 | 0 |
| 2 | 4-amino-4-(3-hydroxypropyl)-1,7-heptanediol (bis-homotris) | 36,154-2 | 0 |
| 3 | triethanolamine ethoxylate | 41,658-4 | 0 |
| 4 | N,N-bis(2-hydroxyethyl) ethylene diamine | 26,887-9 | 0 |
| 5 | 1[N,N-bis(2-hydroxyethyl)-amino]2-propanol | 23,375-7 | 0 |
| 6 | N-methyl-D-glucamine | M4,700-0 | 0 |
| 7 | N,N-bis(2-hydroxyethyl) isonicotinamide | 34,581-8 | 5 |
| 8 | N-(2-hydroxyethyl) isonicotinamide | 34,486-9 | 5 |
| 9 | 1,3-bis-[tris(hydroxymethyl) methyl amino]propane | 21,701-8 | 10 |
| 10 | 1,3,5-tris(2-hydroxyethyl) cyanuric acid | 30,900-1 | 15 |
| 11 | N-phenyl diethanolamine | P2,240-0 | 30 |
| 12 | homovanillyl alcohol | 14,883-0 | 30 |
| 13 | BES | 16,372-4 | 30 |
| 14 | 1,4-bis(2-hydroxyethoxy)-2-butyne | B4,470-8 | 30 |
| 15 | nitromethanetrispropanol | 36,153-4 | 30 |
| 16 | N,N,N',N'-tetrakis(2-hydroxy propyl)ethylenediamine | 12,226-2 | 35 |
| 17 | α-D-glucoheptonic γ-lactone | 12,564-4 | 35 |
| 18 | 3,6-dithia-1,8-octanediol | 23,533-4 | 50 |
| 19 | 3-(N-benzyl-N-methylamino)-1,2-propanediol | 21,850-2 | 50 |
| 20 | [tris(hydroxymethyl)methyl] acrylamide | 36,495-9 | 50 |
| 21 | L-ascorbic acid | A9,290-2 | 50 |
| — | none (comparative) | — | >127 |

TABLE 3

| | | 7 day, curl (mm) | |
|---|---|---|---|
| Compound | Aldrich # | Flat surface | Hanging |
| glycerol propoxylate | 41,0128-4 | 0 | 0 |
| trimethylol propane ethoxylate | 41,616-9 | 0 | 0 |
| trimethylol propane | 14,808-3 | 10 | 70 |
| neopentyl glycol ethoxylate | 41,027-6 | 15 | 96 |
| neopentyl glycol propoxylate | 40,987-1 | 40 | >127 |
| xylitol | 85,158-2 | 50 | >127 |
| D-gluconic acid sodium salt | 18,633-3 | 50 | >127 |
| neopentyl glycol | 12,658-6 | >127 | >127 |

EXAMPLE III

Various ink vehicles are listed in the table below along with their temperature rise values after having been subjected to microwave energy. The results indicate that the liquid ink vehicles of the present application are suitable for printing processes employing microwave drying and further show that some of the ink additives disclosed herein respond to microwaves and are thus useful in raising the temperature of the inks, thereby enabling faster drying of microwaved images.

| Material | Supplier # | ΔT (C.°) |
|---|---|---|
| 1,4-bis(2-hydroxyethoxy)-2-butyne | Aldrich B4,470-8 | 43 |
| pantothenol (20% solution in H$_2$O) | Aldrich 29,578-7 | 13 |
| 1,3,5-tris-(2-hydroxyethyl)cyanuric acid | Aldrich 30,900-1 | 11 |
| 3-amino-1,2-propanediol | Aldrich A7,600-1 | 37 |
| 3-morpholino-1,2-propanediol | Aldrich 21,848-0 | 14 |
| 2,2'-thiodiethanol | Aldrich 16,678-2 | 49 |
| 3,3'-thiodipropanol | Aldrich 20,534-6 | 49 |
| 2-aminoethanethiol (20% solution in H$_2$O) | Fluka Chemie A.G. | 24 |
| benzyl alcohol | Aldrich 10,800-6 | 39 |
| 4-fluorobenzyl alcohol | Aldrich F740-7 | 34 |
| 2-amino-2-methyl-1-propanol | Aldrich A6,518-2 | 48 |
| N-(3-aminopropyl) diethanol amine | Texaco Chemical Co. | 55 |
| dimethylaminoethanol | Aldrich D15,740-6 | 33 |
| ethanolamine | Aldrich 39,813-6 | 42 |
| 2-(2-aminoethylamino) ethanol | Aldrich 12,758-2 | 44 |
| 2-amino-3-methyl-1-butanol | Aldrich 18,483-7 | 44 |
| 1,2,4-butanetriol | Aldrich B8,580-3 | 49 |
| pantothenic acid calcium salt hydrate (20% solution in H$_2$O) | Aldrich 25,972-1 | 25 |
| triethanolamine | Aldrich T5,830-0 | 46 |
| 1H,1H,-perfluoro-1-Heptanol | PCR, Inc. 17518-2 | 15 |
| 2-fluoropyridine | PCR, Inc. 18050-5 | 24 |
| hexafluoroisopropanol | PCR, Inc. 16470-7 | 26 |
| 4-fluoroaniline | PCR, Inc. 10680-7 | 31 |
| 1H,1H-pentafluoropropanol | PCR, Inc. 16230-5 | 35 |
| 2,2,3,3-tetrafluoro-1-propanol | PCR, Inc. 16150-5 | 32 |
| 1H,1H,2H,2H-perfluorooctanol | PCR, Inc. 17112-4 | 20 |
| 2,2'-sulfonyldiethanol (65% solution in water) | Aldrich 18,008-4 | 59 |

EXAMPLE IV

In the table below are presented fast drying yellow, cyan, and magenta colored ink compositions containing additive materials, such as 1,4-bis(2-hydroxyethoxy)-2-butyne (Aldrich B4,470-8), according to the present invention. These inks were incorporated into a 600 SPI resolution ink jet print fixture fitted with a microwave dryer, and images were printed on 100 micron thick commercial Champion Courtland Paper (length 28 cm, width 21.5 cm). The area coverage in each printing was selected at 80% (unprinted border of 1.2 cm, 1.2 cm, 1.3 cm, 1.7 cm). After having been dried in the microwave fixture, these images were placed in a constant temperature room set at 23° C. and 50% relative humidity for 7 days. After that period these imaged papers were tested for curl by comparing the hanging sheets to a template with measured curl values. As shown in the table, the curl values were all within acceptable levels of within ±5.0 mm of 25 mm. The colored ink compositions in the table were microwave compatible as indicated by the temperature rise from 23° C. [in the absence of microwaveable compounds] to within ±1 of 46° C. The colored ink compositions in the table have high frequency, making them ideal for high speed printing.

| | Yellow | Cyan | Magenta |
|---|---|---|---|
| Projet Yellow 1G dye | 27.00 | — | — |
| Acid Yellow 17 dye | 20.00 | — | — |
| Projet Cyan 1 dye | — | 35.00 | — |
| Projet Magenta 1T dye | — | — | 25.00 |
| Acid Red 52 sodium solution dye | — | — | 4.30 |
| sulfolane | 7.28 | 7.28 | 7.28 |
| butyl carbitol | 10.97 | 10.97 | 10.97 |
| 1,4-bis(2-hydroxyethoxy)-2-butyne | 11.67 | 11.67 | 11.67 |
| water | 22.15 | 34.15 | 39.85 |
| tris(hydroxymethyl) amino methane | 0.5 | 0.5 | 0.5 |
| EDTA | 0.35 | 0.35 | 0.35 |
| polyethylene oxide (MW = 18,500) | 0.03 | 0.03 | 0.03 |
| Dowicil 150/200 | 0.05 | 0.05 | 0.05 |
| pH at 21° C. | 6.74 | 6.84 | 6.73 |
| viscocity (cps) at 25° C. | 2.84 | 2.73 | 2.75 |
| conductivity (mmhos) | 3.34 | 2.46 | 3.09 |
| surface tension (dynes/cm) | 36.2 | 34.8 | 34.1 |
| temp. raised to °C. | 46.7 | 45.4 | 46.9 |
| frequency Fmax (KHz) | 7.4 | 6.0 | 6.0 |
| flat curl mm (±5.0 mm) | 25 | 25 | 25 |
| latency (seconds) | 75 | 40 | 75 |

EXAMPLE V

In the table below are presented fast drying yellow colored ink compositions containing additive materials in accordance with the present invention, such as 1,4-bis(2-hydroxyethoxy)-2-butyne (Aldrich B4,470-8), and preferred microwave driable humectants, such as 2,2'-sulfonyldiethanol (Aldrich 18,008-4), in various proportions. These inks were incorporated into a 600 SPI resolution ink jet print fixture fitted with a microwave dryer, and images were printed on 100 micron thick commercial Champion Courtland Paper (length 28 cm, width 21.5 cm). The area coverage in each printing was selected at 80% (unprinted border of 1.2 cm, 1.2 cm, 1.3 cm, 1.7 cm). After having been dried in the microwave fixture, these images were placed in a constant temperature room set at 23° C. and 50% relative humidity for 7 days. After that period these imaged papers were tested for curl by comparing the hanging sheets to a template with measured curl values. As shown in the Table, the curl values were all within acceptable levels of within ±5.0 mm of 10 min. The results further show that in the presence of a preferred microwaveable ink vehicle the amount of additive required to achieve comparable curl values was reduced. The ink compositions in the table were microwave compatible as indicated by the temperature rise from 23° C. [in the absence of microwave-preferred compounds such as 2,2'-sulfonyldiethanol (Aldrich 18,008-4)] to within ±2 of 49° C. The ink compositions in the table have high frequency, especially ink #4 and ink #5, making them ideal for high speed printing.

| INK # | 1 | 2 | 3 | 4 | 5 |
|---|---|---|---|---|---|
| Yellow 1G dye (7.5%) | 27 | 27 | 27 | 27 | 27 |
| Acid Yellow 17 dye (10%) | 20 | 20 | 20 | 20 | 20 |
| 2,2-sulfonyldiethanol | 39.6 | 34 | 37.6 | 47.6 | 42.6 |
| butyl carbitol | 8 | 8 | 5 | — | — |
| 1,4-bis(2-hydroxy ethoxy)-2-butyne | 5 | 5 | 10 | 5 | 10 |
| EDTA | 0.05 | 0.05 | 0.05 | 0.05 | 0.05 |
| tris(hydroxymethyl) amino methane | 0.26 | 0.26 | 0.26 | 0.26 | 0.26 |
| Dowcil | 0.05 | 0.05 | 0.05 | 0.05 | 0.05 |
| polyethylene oxide (MW = 18,500) | 0.03 | 0.04 | 0.03 | 0.04 | 0.04 |
| H$_2$O (distilled) | — | 5.6 | — | — | — |
| pH at 21° C. | 7.09 | 7.08 | 7.11 | 6.98 | 7.02 |
| viscocity (cps) at 25° C. | 3.17 | 2.97 | 3.24 | 2.49 | 2.76 |
| conductivity (milliSiemens/cm) | 12.38 | 12.14 | 11.66 | 17.67 | 14.73 |
| surface tension (dynes/cm) | 35.8 | 36.3 | 37.1 | 38.4 | 39.1 |
| temp. raised to °C. | 49 | 48 | 51 | 51 | 50 |
| frequency Fmax (KHz) | 5.0 | 5.0 | 5.0 | 10.0 | 10.0 |
| flat curl mm (±5.0 mm) | 15 | 15 | 10 | 10 | 10 |

EXAMPLE VI

In the table below are presented fast drying yellow colored ink compositions containing additive materials in accordance with the present invention, such as 1,4-bis(2-hydroxyethoxy)-2-butyne (Aldrich B4,470-8), (±) pantothenol (Aldrich 29,578-7), 1,3,5-tris-(2-hydroxyethyl) cyanuric acid (Aldrich 30,900-1), and triethanol amine ethoxylate (Aldrich 41,658-4), and preferred microwave driable humectants, such as 2,2'-sulfonyldiethanol (Aldrich 18,008-4), in various proportions. These inks were incorporated into a 600 SPI resolution ink jet print fixture fitted with a microwave dryer, and images were printed on 100 micron thick commercial Champion Courtland Paper (length 28 cm, width 21.5 cm ). The area coverage in each printing was selected at 80% (unprinted border of 1.2 cm, 1.2 cm, 1.3 cm, 1.7 cm). After having been dried in the microwave fixture, these images were placed in a constant temperature room set at 23° C. and 50% relative humidity for 7 days. After that period these imaged papers were tested for curl by comparing the hanging sheets to a template with measured curl values. As shown in the table below, the curl values were all within acceptable levels of within ±5.0 mm of 20 mm, and some ink compositions, such as ink #70 yielded curl values as low as 5 mm. The ink compositions in the table were microwave compatible, as indicated by the temperature rise from 23° C. [in the absence of microwave-preferred compounds such as 2,2'sulfonyldiethanol (Aldrich 18,008-4), (±) pantothenol (Aldrich 29,578-7), 1,3,5-tris-(2-hydroxyethyl) cyanuric acid (Aldrich 30,900-1), or 1,4-bis(2-hydroxyethoxy)-2-butyne (Aldrich B4,470-8)] to within ±2 of 49° C. The ink compositions in the table have high frequency, making them ideal for high speed printing.

| INK # | 6 | 7 | 8 | 9 | 10 | 11 |
|---|---|---|---|---|---|---|
| Yellow 1G dye (7.5%) | 27 | 27 | 27 | 27 | 27 | 27 |
| Acid Yellow 17 dye (10%) | 20 | 20 | 20 | 20 | 20 | 20 |
| 2,2-sulfonyldiethanol | 27 | 27.2 | 34.2 | 39.8 | 27 | 34 |
| butyl carbitol | 6 | 6 | 8 | 8 | 6 | 8 |
| (±)pantothenol | — | 10 | 5 | 5 | — | — |
| 1,4-bis(2-hydroxy ethoxy)-2-butyne | 10 | — | — | — | — | — |
| triethanolamine ethoxylate | — | — | — | — | — | 5 |
| 1,3,5-tris(2-hydroxyethyl)- | — | — | — | — | 10 | — |
| cyanuric acid | | | | | | |
| EDTA | 0.05 | — | — | — | — | 1.1 |
| tris(hydroxymethyl) amino methane | 0.26 | 0.1 | 0.1 | 0.1 | 0.1 | — |
| Dowcil | 0.05 | 0.05 | 0.05 | 0.05 | 0.05 | 0.05 |
| polyethylene oxide (MW = 18,500) | 0.04 | 0.04 | 0.04 | 0.04 | 0.04 | 0.04 |
| H$_2$O (distilled) | 9.6 | 9.6 | 5.6 | — | 9.6 | 4.8 |
| pH at 21° C. | 7.1 | 7.1 | 7.1 | 7.1 | 7.11 | 7.25 |
| viscocity (cps) at 25° C. | 2.77 | 3.09 | 2.91 | 3.26 | 2.82 | 3.00 |
| conductivity (milliSiemens/cm) | 10.43 | 9.66 | 11.94 | 12.26 | 12.09 | 13.96 |
| surface tension (dynes/cm) | 36.6 | 38.2 | 36.6 | 35.3 | 37.41 | 35.4 |
| temp. raised to °C. | 47 | 50 | 49 | 51 | 48 | 51 |
| frequency Fmax (KHz) | 4.0 | 6.0 | 5.0 | 4.0 | 5.0 | 5.0 |
| flat curl mm (±5.0 mm) | 15 | 5 | 10 | 15 | 15 | 10 |

EXAMPLE VII

In the table below are presented black ink compositions containing additive materials in accordance with the present invention, such as 1,4-bis(2-hydroxyethoxy)-2-butyne (Aldrich B4,470-8), in various proportions. These inks were incorporated into a 600 SPI resolution ink jet print fixture fitted with a microwave dryer, and images were printed on 100 micron thick commercial Champion Courtland Paper (length 28 cm, width 21.5 cm). The area coverage in each printing was selected at 80% (unprinted border of 1.2 cm, 1.2 cm, 1.3 cm, 1.7 cm). After having been dried in the microwave fixture, these images were placed in a constant temperature room set at 23° C. and 50% relative humidity for 7 days. After that period these imaged papers were tested for curl by comparing the hanging sheets to a template with measured curl values. As shown in the table, the curl values were all within acceptable levels of within ±5.0 mm of 20 mm, and some ink compositions, such as ink #13, ink #15, and ink #17, yielded curl values as low as 0 mm. The ink compositions in the table were microwave compatible, as indicated by the temperature rise from 23° C. to within ±2 of 49° C. in the presence of 1,4-bis(2-hydroxyethoxy)-2-butyne (Aldrich B4,470-8). The ink compositions in the table have high frequency, especially ink #12, ink #13, ink #14, and ink #15, making them ideal for high speed printing.

| INK # | 12 | 13 | 14 | 15 | 16 | 17 |
|---|---|---|---|---|---|---|
| X-34-Black dye (35%) | 21 | 25 | 25 | 21 | 17 | 21 |
| ethylene glycol | 15 | 5 | 15 | 5 | 25 | 15 |
| benzyl alcohol | 1.25 | 2.5 | 0 | 1.25 | 2.5 | 0 |
| 1,4-bis(2-hydroxy ethoxy)-2-butyne | 10 | 20 | 10 | 20 | 10 | 20 |
| EDTA | 0.35 | 0.35 | 0.35 | 0.35 | 0.35 | 0.35 |
| tris(hydroxymethyl) amino methane | 0.5 | 0.5 | 0.5 | 0.5 | 0.5 | 0.5 |
| Dowcil | 0.05 | 0.05 | 0.05 | 0.05 | 0.05 | 0.05 |
| polyethylene oxide (MW = 18,500) | 0.03 | 0.04 | 0.03 | 0.04 | 0.04 | 0.04 |
| H$_2$O (distilled) | 51.8 | 46.6 | 49.1 | 51.8 | 43.6 | 43.1 |
| pH at 21° C. | 7.38 | 7.41 | 7.42 | 7.40 | 7.35 | 7.40 |
| viscocity (cps) at 25° C. | 2.75 | 3.51 | 3.06 | 3.16 | 3.72 | 4.14 |
| conductivity(milliSiemens/cm) | 5.64 | 5.76 | 6.33 | 5.44 | 3.64 | 4.03 |
| surface tension (dynes/cm) | 39.2 | 38.3 | 40.8 | 38.6 | 41.7 | 41.6 |
| temp. raised to °C. | 46 | 46 | 46 | 44 | 45 | 47 |
| frequency Fmax (KHz) | 10.0 | 10.0 | 10.0 | 10.0 | 8.0 | 8.5 |
| flat curl mm (±5.0 mm) | 25.0 | 0.0 | 25 | 0.0 | 25.0 | 0.0 |

Other embodiments and modifications of the present invention may occur to those skilled in the art subsequent to

51 a review of the information presented herein, these embodiments and modifications, as well as equivalents thereof, are also included within the scope of this invention.

What is claimed is:

1. An ink composition which comprises an aqueous liquid vehicle, a colorant, and an additive material selected from the group consisting of (a) symmetric acetylenic bisester alcohols of the general formulae

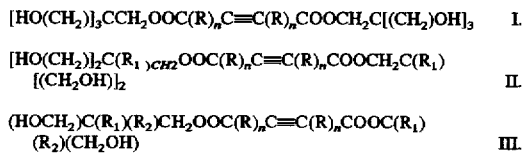

wherein R is $CH_2$, $CH_2OCH_2$, or $C_2H_5OC_2H_5$, $R_1$ and $R_2$ each, independently, are hydrogen atoms, alkyl groups, substituted alkyl groups, or alkoxy groups, end n is an integer of from 0 to 10; (b) symmetric acetylenic bisalkyl alcohols and acetylenic bisalkoxy alcohols of the general formula

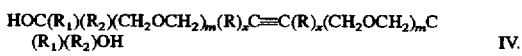

wherein R is a straight chain alkyl group or a substituted straight chain alkyl group, $R_1$ and $R_2$ each, independently of the other, are hydrogen atoms, alkyl groups, substituted alkyl groups, or alkoxy groups, x is an integer of 0 or 1, and m is an integer of from 1 to about 100; (c) symmetric acetylenic bisamido alcohols of the general formulae

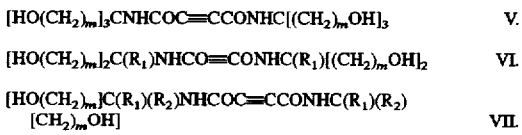

wherein $R_1$ and $R_2$ each, independently of the other, are hydrogen atoms, alkyl groups, substituted alkyl groups, or alkoxy groups, and m is an integer of from 1 to about 10; (d) symmetric bisamido alcohols of the general formulae

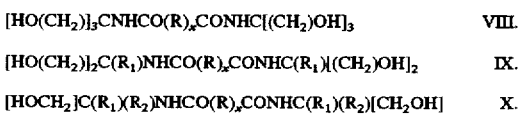

wherein R is a straight chain alkyl group or a substituted straight chain alkyl group, $R_1$ and $R_2$ each, independently of the other, are hydrogen atoms, alkyl groups, substituted alkyl groups, or alkoxy groups, and x is an integer of 0 or 1; (e) mono amido alcohols of the general formula

wherein R is an aryl group, a substituted alkyl group, an arylalkyl group, a substituted arylalkyl group, a pyridine group, a substituted pyridine group, a piperidine group, a substituted piperidine group, a piperazine group, a substituted piperazine group, a quinoline group, a substituted quinoline group, a pyrrolidine group, a substituted pyrrolidine group, an imidazoline group, or a substituted imidazoline group, $R_1$ is H, $CH_2$, or $CH_2OCH_2$, and n is an integer of from 0 to about 5; (f) trialkylhydroxy compounds selected from the group consisting of N-[tris(hydroxymethyl)methyl] glycine, N-tri(hydroxymethyl)methyl]acrylamide, 2-(bromomethyl)-2-(hydroxymethyl)-1,3-propane diol, 2-(nitro)-2-(hydroxymethyl)-1,3-propanediol, 1,3,5-tris(2-hydroxyethyl)cyanuric acid, nitromethane-trispropanol,

52 amino tris propanol, and mixtures thereof; (g) derivatives of 1,2-diols and 1,3-diols selected from the group consisting of 1-phenyl-1,2-ethanediol; 1-(2-nitrophenyl)-1,2-ethanediol; 3-methoxy-1,2-propanediol; 3-ethoxy-1,2-propanediol; 3-phenoxy-1,2-propanediol; 3-(4-methoxy phenoxy)-1,2-propane diol; 3-(2-methyl phenoxy)-1,2-propanediol; 5-hexene-1,2-diol; 7-octene-1,2-diol; 2-phenyl-1,2-propanediol; 3-(diethylamino)-1,2propanediol; 3-diisopropyl amino)-1,2-propanediol; 3-(N-benzyl-N-methylamino)-1,2-propanediol; 3-pyrrolidino-1,2-propanediol; 3-piperidino-1,2-propanediol; 3-morpholino-1,2-propanediol; 2,2-dimethyl-1-phenyl-1,3-propane diol; 2-benzyloxy-1,3-propanediol; 2-bromo-2-nitro-1,3-propanediol and mixtures thereof; (h) thio diols selected from the group consisting of 2-hydroxyethyl disulfide; 3,6-dithia-1,8-octane diol; 2,2'-sulfonyl diethanol; 3,3'-thiodipropanol; bis(2-hydroxypropyl sulfide; bis(2-hydroxypropyl)disulfide; and mixtures thereof; (i) aromatic and heterocyclic diols selected from the group consisting of 2,5-furandimethanol, 3-cyclohexene-1-1-dimethanol, 2'-phenylene -dioxy)diethanol, 4-8-bis(hydroxymethyl) tricyclo[5.2.1.0$^{2.6}$]decane, 5-nitro-m-xylene-α,α'-diol, 2,3, 5,6-tetramethyl-p-xylene-α,α'- diol, 2-hydroxybenzyl alcohol, 3,5-dihydroxybenzylalcohol, 4-hydroxy-3-methoxy benzylalcohol, 3-hydroxy-4-methoxybenzylalcohol, homovanillyl alcohol, hydroxyphenethyl alcohol, and mixtures thereof; (j) imino alcohols selected from the group consisting of 2,2'methyliminodiethanol; N,N-bis(2-hydroxyethyl)-2-amino ethane sulfonic acid; 1-[N,N-bis(2-hydroxyethyl) isopropanolamine; 3-[bis(2-hydroxyethyl)amino]-2-hydroxy-1-propane sulfonic acid; 2,2'(phenylamino) diethanol; 2,2'-(tolylimino)diethanol; bis(2-hydroxypropyl) amine (di-isopropanol amine); bis(3-hydroxypropyl)amine; N,N'-bis(2-hydroxyethyl)ethylenediamine; N,N-bis(2-hydroxypropyl)ethanolamine; triethanol amine ethoxylate; 1-4-bis(2-hydroxyethyl)piperazine; 1-[2(2-hydroxyethoxy) ethyl]-piperazine; bis[(2-hydroxyethoxy)ethyl]-piperazine; 1,4-bis(2-hydroxypropyl)piperazine; 1,4-bis(2-hydroxypropyl)2-methyl piperazine; bis(2-hydroxypropyl)-2,5-dimethyl-piperazine; 1-(2-N,N-bis(2-hydroxypropyl) amino)ethyl 4-(2-hydroxpropyl piperazine; N,N-bis(3-hydroxypropyl)homopiperazine; 4,4'-trimethylene bis(1-piperidine ethanol); and mixtures thereof; (k) salts of hydroxyl compounds selected from the group consisting of pantothenic acid calcium salt hydrate; pantothenic acid sodium salt; 4-(2,3-dihydroxypropyl)-2-isononylsuccinate potassium salt; 4-(2,3-dihydroxypropyl)-2-(2-methylene-4, 4-dimethylpentyl)succinate potassium salt; xylonic acid calcium salt; threonic acid calcium salt; and mixtures thereof; (l) saccharides and saccharide derivatives selected from the group consisting of 5,6-isopropylidene ascorbic acid; gluconic γ-lactone; α-glucoheptonic γ-lactone; α,β-gluco octanoic-γ-lactone; δ-gluconolactone; glucono-1,5-lactone; 1,2-O-isopropylidene-glucofuranose; 1,2-O-isopropylidene-xylofuranose; 1,2-O-isopropylidene-β-idofuranose; 2,5-O-methylene-mannitol; 3,4-O-isopropylidene-mannitol; 1,2,5, 6-di-O-isopropylidene-mannitol; 4,6-O-ethylidene-α-glucose; hydrindantin dihydrate; ellagic acid dihydrate; rutin trihydrate; amygdalin; melezitose dihydrate; raffinose pentahydrate; α-galactosyl-α-galactosyl-α-glucosyl-β-fructose; inulin; and mixtures thereof; and (m) mixtures thereof.

2. An ink composition according to claim 1 wherein the aqueous vehicle comprises a material selected from the group consisting of dimethylamino ethanol, 2-(2-aminoethylamino)ethanol, 2-amino-2-methyl-1-propanol, 3-amino-1,2-propanediol, 3-morpholino-1,2-propanediol, 2-amino-3-methyl-1-butanol, 1,2,4-butanetriol, ethanol amine, triethanol amine, N-(3-aminopropyl)diethanolamine, 2,2'-thiodiethanol, 3,3'-thiodipropanol, 2-aminoethanethiol, 2,2'-sulfonyldiethanol, pantothenol, pantothenic acid calcium salt hydrate, 1,3,5-tris-(2-hydroxyethyl)cyanuric acid, 1,4-bis(2-hydroxyethoxy)-2-butyne, benzyl alcohol, 4-fluorobenzyl alcohol, 2-fluoropyridine, 4-fluoroaniline, 2,2,3,3-tetrafluoro-1-propanol, 1H,1H-pentafluoro propanol, hexafluoro isopropanol, 1H,1H,-perfluoro-1-heptanol, 1H,1H,2H,2H-perfluorooctanol, and mixtures thereof.

3. An ink composition which comprises an aqueous liquid vehicle, a colorant, and an additive material selected from the group consisting of symmetric acetylenic bisester alcohols of the general formulae

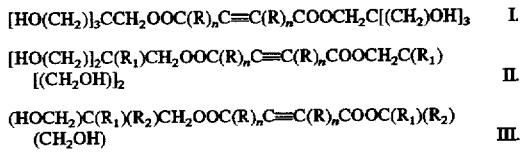

wherein R is $CH_2$, $CH_2OCH_2$, or $C_2H_5OC_2H_5$, $R_1$ and $R_2$ each, independently, are hydrogen atoms, alkyl groups, substituted alkyl groups, or alkoxy groups, and n is an integer of from 0 to 10, and mixtures thereof.

4. An ink composition which comprises an aqueous liquid vehicle, a colorant, and an additive material selected from the group consisting of bis[(trishydroxymethyl)methyl]-2-butyne-1,4-dicarboxylate, bis[(bishydroxymethyl)methyl]-2-butyne-1,4-dicarboxylate, bis(2-hydroxyethyl)-2-butyne-1,4-dicarboxylate, and mixtures thereof.

5. An ink composition which comprises an aqueous liquid vehicle, a colorant, and an additive material selected from the group consisting of symmetric acetylenic bisalkyl alcohols and acetylenic bisalkoxy alcohols of the general formula

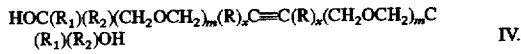

wherein R is a straight chain alkyl group or a substituted straight chain alkyl group, $R_1$ and $R_2$ each, independently of the other, are hydrogen atoms, alkyl groups, substituted alkyl groups, or alkoxy groups, x is an integer of 0 or 1, and m is an integer of from 1 to about 100, and mixtures thereof.

6. An ink composition which comprises an aqueous liquid vehicle, a colorant, and an additive material selected from the group consisting of 2-butyne-1,4-diol, 3-hexyne-2,5-diol, 2,5-dimethyl-3-hexyne-2,5-diol, 2,5-dimethyl-4-octyne-3,6-diol, 1,4-bis(2-hydroxyethoxy)-2-butyne, and mixtures thereof.

7. An ink composition which comprises an aqueous liquid vehicle, a colorant, and an additive material selected from the group consisting of symmetric acetylenic bisamido alcohols of the general formulae

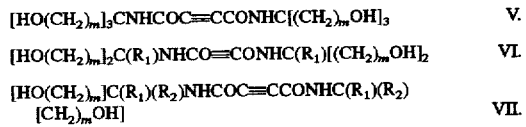

wherein $R_1$ and $R_2$ each, independently of the other, are hydrogen atoms, alkyl groups, substituted alkyl groups, or alkoxy groups, and m is an integer of from 1 to about 10, and mixtures thereof.

8. An ink composition which comprises an aqueous liquid vehicle, a colorant, and an additive material selected from the group consisting of N,N'-bis[(trishydroxymethyl) methyl]-2-butyne-1,4-diamide, bis[bis(hydroxymethyl) methyl]-2-butyne-1,4-diamide, bis(1-methyl-3-hydroxypropyl)-2-butyne-1,4-diamide, and mixtures thereof.

9. An ink composition which comprises an aqueous liquid vehicle, a colorant, and an additive material selected from the group consisting of symmetric bisamido alcohols of the general formulae

wherein R is a straight chain alkyl group or a substituted straight chain alkyl group, $R_1$ and $R_2$ each, independently of the other, are hydrogen atoms, alkyl groups, substituted alkyl groups, or alkoxy groups, and x is an integer of 0 or 1, and mixtures thereof.

10. An ink composition according to claim 1 wherein the additive is selected from the group consisting of N,N'-bis[ (trishydroxymethyl)methyl]oxamide, N,N'-bis (trishydroxymethyl)methyl]succinamide, N,N'-bis [(bishydroxymethyl)methyl]succinamide, N,N'-bis(1-methyl-3-hydroxypropyl)oxamide, N,N'-bis(1-methyl-2-hydroxyethyl)succinamide, and mixtures thereof.

11. An ink composition according to claim 1 wherein the additive is selected from the group consisting of mono amido alcohols of the general formula

wherein R is an aryl group, a substituted aryl group, an arylalkyl group, a substituted arylalkyl group, a pyridine group, a substituted pyridine group, a piperidine group, a substituted piperidine group, a piperazine group, a substituted piperazine group, a quinoline group, a substituted quinoline group, a pyrrolidine group, a substituted pyrrolidine group, an imidazoline group, or a substituted imidazoline group, $R_1$ is H, $CH_2$, or $CH_2OCH_2$, and n is an integer of from 0 to about 5.

12. An ink composition according to claim 1 wherein the additive is selected from the group consisting of mandelo hydroxamic acid, N-(2-hydroxyethyl)isonicotinamide, N-(hydroxymethyl)nicotine amide, N,N-bis(2-hydroxyethyl)isonicotinamide, N-(2-hydroxyethyl) salicylamide, 2,5-dihydroxy-N-(2-hydroxy ethyl) benzamide, pantothenol, and mixtures thereof.

13. An ink composition according to claim 1 wherein the additive is selected from the group consisting of N-[tris (hydroxymethyl)methyl]glycine, N-[tri(hydroxymethyl) methyl]acrylamide, 2-(bromomethyl)-2-(hydroxymethyl)-1, 3-propane diol, 2-(nitro)-2-(hydroxymethyl)-1,3-propanediol, 1,3,5-tris(2-hydroxyethyl)cyanuric acid, nitromethane-trispropanol, amino tris propanol, and mixtures thereof.

14. An ink composition according to claim 1 wherein the additive is selected from the group consisting of 1-phenyl-1,2-ethanediol; 1-(2-nitrophenyl)-1,2-ethanediol; 3-methoxy-1,2-propanediol; 3-ethoxy-1,2-propanediol; 3-phenoxy-1,2-propanediol; 3-(4-methoxy phenoxy)-1,2-propane diol; 3-(2-methyl phenoxy)-1,2-propanediol; 5-hexene-1,2-diol; 7-octene-1,2-diol; 2-phenyl-1,2-propanediol; 3-(diethylamino)-1,2-propanediol; 3-(diisopropyl amino)-1,2-propanediol; 3-N-benzyl-N-methylamino)-1,2-propanediol; 3-pyrrolidino-1,2-propanediol; 3-piperidino-1,2-propanediol; 3-morpholino-1, 2propanediol; 2,2-dimethyl-1-phenyl-1,3-propane diol; 2-benzyloxy-1,3-propanediol; 2-bromo-2-nitro-1,3-propanediol; and mixtures thereof.

15. An ink composition which comprises an aqueous liquid vehicle, a colorant, and an additive material selected from the group consisting of 2-hydroxyethyl disulfide; 3,6-dithia-1,8-octane diol; 2,2'-sulfonyl diethanol; 3,3'-thiodipropanol; bis(2-hydroxypropyl sulfide; bis(2-hydroxypropyl)disulfide; and mixtures thereof.

16. An ink composition according to claim 1 wherein the additive is selected from the group consisting of 2,5-furandimethanol, 3-cyclohexene-1-1-dimethanol, 2'-(phenylene dioxy)diethanol, 4-8-bis(hydroxymethyl) tricyclo[5.2.1.0$^{2,6}$]decane, 5-nitro-m-xylene-α,α'-diol, 2,3, 5,6-tetramethyl-p-xylene-α,α'-diol, 2-hydroxybenzyl alcohol, 3,5-dihydroxybenzylalcohol, 4-hydroxy-3-methoxy benzylalcohol, 3-hydroxy-4-methoxybenzylalcohol, homovanillyl alcohol, hydroxyphenethyl alcohol, and mixtures thereof.

17. An ink composition according to claim 1 wherein the additive is selected from the group consisting of 2,2'-methyliminodiethanol; N,N-bis(2-hydroxyethyl)-2-amino ethane sulfonic acid; 1-[N,N-bis(2-hydroxyethyl) isopropanolamine; 3-[bis(2-hydroxyethyl)amino]-2-hydroxy-1-propane sulfonic acid; 2,2'(phenylamino) diethanol; 2,2'-(tolylimino)diethanol; bis(2-hydroxypropyl) amine (di-isopropanol amine); bis(3-hydroxypropyl)amine; N,N'-bis(2-hydroxyethyl)ethylenediamine; N,N-bis(2-hydroxypropyl)ethanolamine; triethanol amine ethoxylate; 1-4-bis(2-hydroxyethyl)piperazine; 1-[2-(2-hydroxyethoxy) ethyl]-piperazine; bis[(2-hydroxyethoxy)ethyl]-piperazine; 1,4-bis(2-hydroxypropyl)piperazine; 1,4-bis(2-hydroxypropyl)2-methyl piperazine; bis(2-hydroxypropyl)-2,5-dimethyl-piperazine; 1-(2-N,N-bis(2-hydroxypropyl) amino)ethyl 4-(2-hydroxpropyl piperazine; N,N-bis(3-hydroxypropyl)homopiperazine; 4,4'-trimethylene bis(1-piperidine ethanol); and mixtures thereof.

18. An ink composition according to claim 1 wherein the additive is selected from the group consisting of pantothenic acid calcium salt hydrate; pantothenic acid sodium salt; 4-(2,3-dihydroxypropyl)-2-isononylsuccinate potassium salt; 4-(2,3-dihydroxypropyl)-2-(2-methylene-4,4-dimethylpentyl)succinate potassium salt; xylonic acid calcium salt; threonic acid calcium salt; and mixtures thereof.

19. An ink composition according to claim 1 wherein the additive is selected from the group consisting of 5,6-isopropylidene ascorbic acid; gluconic γ-lactone; α-glucoheptonic γ-lactone; α,β-gluco octanoic-γ-lactone; δ-gluconolactone; glucono-1,5-lactone; 1,2-O-isopropylidene-glucofuranose; 1,2-O-isopropylidene-xylofuranose; 1,2-O-isopropylidene-β-idofuranose; 2,5-O-methylene-mannitol; 3,4-O-isopropylidene-mannitol; 1,2,5, 6-di-O-isopropylidene-mannitol; 4,6-O-ethylidene-α-glucose; hydrindantin dihydrate; ellagic acid dihydrate; rutin trihydrate; amygdalin; melezitose dihydrate; raffinose pentahydrate; α-galactosyl-α-galactosyl-α-glucosyl-β-fructose; inulin; and mixtures thereof.

20. An ink jet process which comprises (1) incorporating into a thermal ink jet printing apparatus an ink composition which comprises an aqueous liquid vehicle, a colorant, and an additive material selected from the group consisting of (a) symmetric acetylenic bisester alcohols of the general formulae $8\ HO(CH_2)_3CCH_2OOC(R)_nC\!\!\equiv\!\!C(R)_nCOOCH_2C[(CH_2)OH]_3$  I.

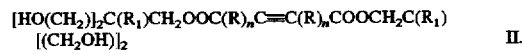

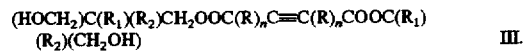

wherein R is $CH_2$, $CH_2OCH_2$, or $C_2H_5OC_2H_5$, $R_1$ and $R_2$ each, independently, are hydrogen atoms, alkyl groups, substituted alkyl groups, or alkoxy groups, and n is an integer of from 0 to 10; (b) symmetric acetylenic bisalkyl alcohols and acetylenic bisalkoxy alcohols of the general formula

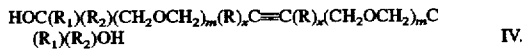

wherein R is a straight chain alkyl group or a substituted straight chain alkyl group, $R_1$ and $R_2$ each, independently of the other, are hydrogen atoms, alkyl groups, substituted alkyl groups, or alkoxy groups, x is an integer of 0 or 1, and m is on integer of from 1 to about 100; (c) symmetric acetylenic bisamido alcohols of the general formulae

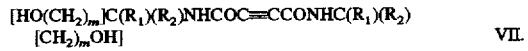

wherein $R_1$ and $R_2$ each, independently of the other, are hydrogen atoms, alkyl groups, substituted alkyl groups, or alkoxy groups, and m is an integer of from 1 to about 10; (d) symmetric bisamido alcohols of the general formulae

wherein R is a straight chain alkyl group or a substituted straight chain alkyl group, $R_1$ and $R_2$ each, independently of the other, are hydrogen atoms, alkyl groups, substituted alkyl groups, or alkoxy groups, and x is an integer of 0 or 1; (e) mono amido alcohols of the general formula $RCONR_1(CH_2)OH$  XI.

wherein R is an aryl group, a substituted aryl group, an arylalkyl group, a substituted arylalkyl group, a pyridine group, a substituted pyridine group, a piperidine group, a substituted piperidine group, a piperazine group, a substituted piperazine group, a quinoline group, a substituted quinoline group, a pyrrolidine group, a substituted pyrrolidine group, an imidazoline group, or a substituted imidazoline group, $R_1$ is H, $CH_2$, or $CH_2OCH_2$, and n is on integer of from 0 to about 5; (f) trialkylhydroxy compounds selected from the group consisting of N-[tris(hydroxymethyl)methyl] glycine, N-[tri(hydroxymethyl)methyl]acrylamide, 2-(bromomethyl)-2-(hydroxymethyl)-1,3-propane diol, 2-(nitro)-2-(hydroxymethyl)-1,3-propanediol, 1,3,5-tris(2-hydroxyethyl)cyanuric acid, nitromethane-trispropanol, amino tris propanol, and mixtures thereof; (g) derivatives of 1,2-diols and 1,3-diols selected from the group consisting of 1-phenyl-1,2-ethanediol; 1-(2-nitrophenyl)-1,2-ethanediol; 3-methoxy-1,2-propanediol; 3-ethoxy-1,2-propanediol; 3-phenoxy-1,2-propanediol; 3-(4-methoxy phenoxy)-1,2-propane diol; 3-(2-methyl phenoxy)-1,2-propanediol; 5-hexene-1,2-diol; 7-octene-1,2-diol; 2-phenyl-1,2-propanediol; 3-(diethylamino)-1,2-propanediol; 3-(diisopropyl amino)-1,2-propanediol; 3-(N-benzyl-N-methylamino)-1,2-propanediol; 3-pyrrolidine-1,2-propanediol; 3-piperidino-1,2-propanediol; 3-morpholino-1, 2-propanediol; 2,2-dimethyl-1-phenyl-1,3-propane diol; 2-benzyloxy-1,3-propanediol; 2-bromo-2-nitro-1,3-propanediol; and mixtures thereof; (h) thio diols selected from the group consisting of 2-hydroxyethyl disulfide; 3,6-dithia-1,8-octane diol; 2,2'-sulfonyl diethanol; 3,3'-thiodipropanol; bis(2-hydroxypropyl sulfide; bis(2- hydroxypropyl)disulfide; and mixtures thereof; (I) aromatic and heterocyclic diols selected from the group consisting of 2,5-furandimethanol, 3-cyclohexene-1-1-dimethanol, 2'-(phenylene dioxy)diethanol, 4-8-bis(hydroxymethyl) tricyclo[5.2.1.0$^{2,6}$]decane, 5-nitro-m-xylene-α,α'-diol, 2,3, 5,6-tetramethyl-p-xylene-α,α'-diol, 2-hydroxybenzyl alcohol, 3,5-dihydroxybenzylalcohol, 4-hydroxy-3-methoxy benzylalcohol, 3-hydroxy-4-methoxybenzylalcohol, homovanillyl alcohol, hydroxyphenethyl alcohol, and mixtures thereof; (j) imino alcohols selected from the group consisting of 2,2'methyliminodiethanol; N,N-bis(2-hydroxyethyl)-2-amino ethane sulfonic acid; 1-[N,N-bis(2-hydroxyethyl) isopropanolamine; 3-[bis(2-hydroxyethyl)amino]-2-hydroxy-1-propane sulfonic acid; 2,2'(phenylamino) diethanol; 2,2'-(tolylimino)diethanol; bis(2-hydroxypropyl) amine (di-isopropanol amine); bis(3-hydroxypropyl)amine; N,N'-bis(2-hydroxyethyl)ethylenediamine; N,N-bis(2-hydroxypropyl)ethanolamine; triethanol amine ethoxylate; 1-4-bis(2-hydroxyethyl)piperazine; 1-[2-(2-hydroxyethoxy) ethyl]-piperazine; bis[(2-hydroxyethoxy)ethyl]-piperazine; 1,4-bis(2-hydroxypropyl)piperazine; 1,4-bis(2-hydroxypropyl)2-methyl piperazine: bis(2-hydroxypropyl)-2,5-dimethyl-piperazine; 1-(2-N,N-bis(2-hydroxypropyl) amino)ethyl 4-(2-hydroxpropyl piperazine; N,N-bis(3-hydroxypropyl)homopiperazine; 4,4'-trimethylene bis(1-piperidine ethanol); and mixtures thereof; (k) salts of hydroxyl compounds selected from the group consisting of pantothenic acid calcium salt hydrate; pantothenic acid sodium salt; 4-(2,3-dihydroxypropyl)-2-isononylsuccinate potassium salt; 4-(2,3-dihydroxypropyl)-2-(2-methylene-4, 4-dimethylpentyl)succinate potassium salt; xylonic acid calcium salt; threonic acid calcium salt; and mixtures thereof; (l) saccharides and saccharide derivatives selected from the group consisting of 5,6-isopropylidene ascorbic acid; gluconic γ-lactone; α-glucoheptonic γ-lactone; α,β-gluco octanoic-γ-lactone; δ-gluconolactone; glucono-1,5-lactone; 1,2-O-isopropylidene-glucofuranose; 1,2-O-isopropylidenexylofuranose; 1,2-O-isopropylidene-β-idofuranose; 2,5-O-methylene-mannitol; 3,4-O-isopropylidene-mannitol; 1,2,5, 6-di-O-isopropylidene-mannitol; 4,6-O-ethylidene-α-glucose; hydrindantin dihydrate; ellagic acid dihydrate; rutin trihydrate; amygdalin; melezitose dihydrate; raffinose pentahydrate; α-galactosyl-α-galactosyl-α-glucosyl-β-fructose; inulin; and mixtures thereof; and (m) mixtures thereof; and (2) causing droplets of the ink to be ejected from the printing apparatus in an imagewise pattern onto a substrate, thereby generating images on the substrate.

21. An ink jet printing process which comprises (1) incorporating into a thermal ink jet printing apparatus an ink composition which comprises an aqueous liquid vehicle, a colorant, and an additive material selected from the group consisting of (a) symmetric acetylenic bisester alcohols of the general formulae

[HO(CH$_2$)]$_3$CCH$_2$OOC(R)$_n$C≡C(R)$_n$COOCH$_2$C[(CH$_2$)OH]$_3$   I.

[HO(CH$_2$)]$_2$C(R$_1$)CH$_2$OOC(R)$_n$C≡C(R)$_n$COOCH$_2$C(R$_1$)
[(CH$_2$OH)]$_2$   II.

(HOCH$_2$)C(R$_1$)(R$_2$)CH$_2$OOC(R)$_n$C≡C(R)$_n$COOC(R$_1$)(R$_2$)
(CH$_2$OH)   III.

wherein R is CH$_2$, CH$_2$OCH$_2$, or C$_2$H$_5$OC$_2$H$_5$, R$_1$ and R$_2$ each, independently, are hydrogen atoms, alkyl groups, substituted alkyl groups, or alkoxy groups, and n is an integer of from 0 to 10; (b) symmetric acetylenic bisalkyl alcohols and acetylenic bisalkoxy alcohols of the general formula HOC(R$_1$)(R$_2$)(CH$_2$OCH$_2$)$_m$(R)$_n$C≡C(R)$_n$(CH$_2$OCH$_2$)$_m$C
(R$_1$)(R$_2$)OH   IV.

wherein R is a straight chain alkyl group or a substituted straight chain alkyl group, R$_1$ and R$_2$ each, independently of the other, are hydrogen atoms, alkyl groups, substituted alkyl groups, or alkoxy groups, x is an integer of 0 or 1, and m is an integer of from 1 to about 100; (c) symmetric acetylenic bisamido alcohols of the general formulae

[HO(CH$_2$)$_m$]$_3$CNHCOC≡CCONHC[(CH$_2$)$_m$OH]$_3$   V.

[HO(CH$_2$)$_m$]$_2$C(R$_1$)NHCO≡CONHC(R$_1$)[(CH$_2$)$_m$OH]$_2$   VI.

[HO(CH$_2$)$_m$]C(R$_1$)(R$_2$)NHCOC≡CCONHC(R$_1$)
(R$_2$)[CH$_2$)$_m$OH]   VII.

wherein R$_1$ and R$_2$ each, independently of the other, are hydrogen atoms, alkyl groups, substituted alkyl groups, or alkoxy groups, and m is an integer of from 1 to about 10; (d) symmetric bisamido alcohols of the general formulae

[HO(CH$_2$)]$_3$CNHCO(R)$_x$CONHC[(CH$_2$)OH]$_3$   VIII.

[HO(CH$_2$)]$_2$C(R$_1$)NHCO(R)$_x$CONHC(R$_1$)[(CH$_2$)OH]$_2$   IX.

[HOCH]C(R$_1$)(R$_2$)NHCO(R)$_x$CONHC(R$_1$)(R$_2$)[CH$_2$OH]   X.

wherein R is a straight chain alkyl group or a substituted straight chain alkyl group, R$_1$ and R$_2$ each, independently of the other, are hydrogen atoms, alkyl groups, substituted alkyl groups, or alkoxy groups, and x is an integer of 0 or 1; (e) mono amido alcohols of the general formula RCONR$_1$(CH$_2$)$_n$OH   XI.

wherein R is an aryl group, a substituted aryl group, an arylalkyl group, a substituted arylalkyl group, a pyridine group, a substituted pyridine group, a piperidine group, a substituted piperidine group, a piperazine group, a substituted piperazine group, a quinoline group, a substituted quinoline group, a pyrrolidine group, a substituted pyrrolidine group, an imidazoline group, or a substituted imidazoline group, R$_1$ is H, CH$_2$, or CH$_2$OCH$_2$, and n is an integer of from 0 to about 5; (f) trialkylhydroxy compounds selected from the group consisting of N-[tris(hydroxymethyl)methyl] glycine, N-[tri(hydroxymethyl)methyl]acrylamide, 2-(bromomethyl)-2-(hydroxymethyl)-1,3-propane diol, 2-(nitro)-2-(hydroxymethyl)-1,3-propanediol, 1,3,5-tris(2-hydroxyethyl)cyanuric acid, nitromethane-trispropanol, amino tris propanol, and mixtures thereof; (g) derivatives of 1,2-diols and 1,3-diols selected from the group consisting of 1-phenyl-1,2-ethanediol; 1-(2-nitrophenyl)-1,2-ethanediol; 3-methoxy-1,2-propanediol; 3-ethoxy-1,2-propanediol; 3-phenoxy-1,2-propanediol; 3-(4-methoxy phenoxy)-1,2-propane diol; 3-(2-methyl phenoxy)-1,2-propanediol 5-hexene-1,2-diol; 7-octene-1,2-diol; 2-phenyl-1,2-propanediol; 3-(diethylamino)-1,2-propanediol; 3-(diisopropyl amino)-1,2-propanediol; 3-(N-benzyl-N-methylamino)-1,2-propanediol; 3-pyrrolidine-1,2-propanediol; 3-piperidino-1,2-propanediol; 3-morpholino-1, 2-propanediol; 2,2-dimethyl-1-phenyl-1,3-propane diol; 2-benzyloxy-1,3-propanediol; 2-bromo-2-nitro-1,3-propanediol; and mixtures thereof; (h) thio diols selected from the group consisting of 2-hydroxyethyl disulfide; 3,6-dithia-1,8-octane diol; 2,2'-sulfonyl diethanol; 3,3'-thiodipropanol; bis(2-hydroxypropyl sulfide; bis(2-hydroxypropyl)disulfide; and mixtures thereof; (i) aromatic and heterocyclic diols selected from the group consisting of 2,5-furandimethanol, 3-cyclohexene-1-1-dimethanol, 2'-(phenylene dioxy)diethanol, 4-8-bis(hydroxymethyl) tricyclo[5.2.1.0$^{2,6}$]decane, 5-nitro-m-xylene-α,α'-diol, 2,3, 5,6-tetramethyl-p-xylene-α,α'-diol, 2-hydroxybenzyl alcohol, 3,5-dihydroxybenzylalcohol, 4-hydroxy-3-methoxy benzylalcohol, 3-hydroxy-4-methoxybenzylalcohol, homovanillyl alcohol, hydroxyphenethyl alcohol, and mixtures thereof; (j) imino alcohols selected from the group consisting or 2,2'-methyliminodiethanol; N,N-bis(2-hydroxyethyl)-2-amino ethane sulfonic acid; 1-[N,N-bis(2-hydroxyethyl)isopropanolamine; 3-(bis(2-hydroxyethyl)amino]-2-hydroxy-1-propane sulfonic acid; 2,2'-(phenylamino)diethanol; 2,2'-(tolylimino)diethanol; bis(2-hydroxypropyl)amine (di-isopropanol amine); bis(3-hydroxypropyl)amine; N,N'-bis(2-hydroxyethyl)ethylenediamine N,N-bis(2-hydroxypropyl)ethanolamine; triethanol amine ethoxylate; 1-4-bis(2-hydroxyethyl)piperazine; 1-[2-(2-hydroxyethoxy)ethyl]-piperazine; bis[(2-hydroxyethoxy)ethyl]-piperazine; 1,4-bis(2-hydroxypropyl)piperazine; 1,4-bis(2-hydroxypropyl)2-methyl piperazine; bis(2-hydroxypropyl)-2,5-dimethyl-piperazine: 1-(2-N,N-bis(2-hydroxypropyl)amino)ethyl 4-(2-hydroxpropyl piperazine; N,N-bis(3-hydroxypropyl)homopiperazine; 4,4'-trimethylene bis(1-piperidine ethanol); and mixtures thereof; (k) salts of hydroxyl compounds selected from the group consisting of pantothenic acid calcium salt hydrate; pantothenic acid sodium salt; 4-(2,3-dihydroxypropyl)-2-isononylsuccinate potassium salt; 4-(2,3-dihydroxypropyl)-2-(2-methylene-4,4-dimethylpentyl)succinate potassium salt; xylonic acid calcium salt; threonic acid calcium salt;, and mixtures thereof; (l) saccharides and saccharide derivatives selected from the group consisting of 5,6-isopropylidene ascorbic acid; gluconic-γ-lactone; α-glucoheptonic γ-lactone; α,β-gluco octanoic-γ-lactone; δ-gluconolactone; glucono-1,5-lactone; 1,2-O-isopropylidene-glucofuranose; 1,2-O-isopropylidene-xylofuranose; 1,2-O-isopropylidene-β-idofuranose; 2,5-O-methylene-mannitol; 3,4-O-isopropylidene-mannitol; 1,2,5,6-di-O-isopropylidene-mannitol; 4,6-O-ethylidene-α-glucose; hydrindantin dihydrate; ellagic acid dihydrate; rutin trihydrate; amygdalin; melezitose dihydrate; raffinose pentahydrate; α-galactosyl-α-α-galactosyl-α-glucosyl-β-fructose; inulin; and mixtures thereof; and mixtures thereof; (2) causing droplets of the ink to be ejected from the printing apparatus in an imagewise pattern onto a substrate, thereby generating images on the substrate; and (3) exposing the substrate to microwave radiation, thereby drying the images on the substrate.

22. A process according to claim 21 wherein the aqueous vehicle comprises a material selected from the group consisting of dimethylamino ethanol, 2-(2-aminoethylamino)ethanol, 2-amino-2-methyl-1-propanol, 3-amino-1,2-propanediol, 3-morpholino-1,2-propanediol, 2-amino-3-methyl-1-butanol, 1,2,4-butanetriol, ethanol amine, triethanol amine, N-(3-aminopropyl)diethanolamine, 2,2'-thiodiethanol, 3,3'-thiodipropanol, 2-aminoethanethiol, 2,2'-sulfonyldiethanol, pantothenol, pantothenic acid calcium salt hydrate, 1,3,5-tris-(2-hydroxyethyl)cyanuric acid, 1,4-bis(2-hydroxyethoxy)-2-butyne, benzyl alcohol, 4-fluorobenzyl alcohol, 2-fluoropyridine, 4-fluoroaniline, 2,2,3,3-tetrafluoro-1-propanol, 1H,1H-pentafluoro propanol, hexafluoro isopropanol, 1H,1H,-perfluoro-1-heptanol, 1H,1H,2H,2H-perfluorooctanol, and mixtures thereof.

* * * * *